US009177523B2

(12) United States Patent
Hagood et al.

(10) Patent No.: US 9,177,523 B2
(45) **Date of Patent: *Nov. 3, 2015**

(54) CIRCUITS FOR CONTROLLING DISPLAY APPARATUS

(71) Applicant: Pixtronix, Inc., San Diego, CA (US)

(72) Inventors: Nesbitt W. Hagood, Gloucester, MA (US); Stephen R. Lewis, Reading, MA (US); Abraham McAllister, Annandale, VA (US); Roger W. Barton, South Aston, MN (US)

(73) Assignee: Pixtronix, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/975,841

(22) Filed: Aug. 26, 2013

(65) Prior Publication Data

US 2013/0342522 A1 Dec. 26, 2013

Related U.S. Application Data

(63) Continuation of application No. 11/978,829, filed on Oct. 29, 2007, now Pat. No. 8,519,945, which is a continuation-in-part of application No. 11/326,962, filed on Jan. 6, 2006, now Pat. No. 7,755,582.

(60) Provisional application No. 60/655,827, filed on Feb. 23, 2005, provisional application No. 60/676,053, filed on Apr. 29, 2005.

(51) Int. Cl.

| | |
|---|---|
| ***G09G 3/34*** | (2006.01) |
| ***G02B 26/00*** | (2006.01) |
| ***G09G 5/00*** | (2006.01) |

(52) U.S. Cl.

CPC ................ *G09G 5/001* (2013.01); *G09G 3/346* (2013.01); *G09G 2300/0838* (2013.01); *G09G 2300/0842* (2013.01); *G09G 2300/0852* (2013.01);

(Continued)

(58) Field of Classification Search

CPC .............. G09G 2300/0838; G09G 2300/0842; G09G 2300/0852; G09G 2300/0866; G09G 2300/0871; G09G 2310/0262; G09G 2360/18; G09G 3/346; G09G 5/001

USPC ............................ 345/84, 108, 204; 359/290

See application file for complete search history.

(56) References Cited

U.S. PATENT DOCUMENTS

| | | |
|---|---|---|
| 3,864,582 A | 2/1975 | Keeler |
| 4,067,043 A | 1/1978 | Perry |

(Continued)

FOREIGN PATENT DOCUMENTS

| | | |
|---|---|---|
| CA | 2241823 A1 | 8/1997 |
| CA | 2334403 A1 | 12/1999 |

(Continued)

OTHER PUBLICATIONS

Akimoto O. et al., "15.1: A 0.9-in UXGA/HDTV FLC Microdisplay," Society for Information Display, 2000, pp. 194-197.

(Continued)

*Primary Examiner* — Viet Pham

(74) *Attorney, Agent, or Firm* — Edward A. Gordon; Foley & Lardner LLP

(57) ABSTRACT

The invention relates to methods and apparatus for forming images on a display utilizing a control matrix to control the movement of MEMs-based light modulators.

20 Claims, 34 Drawing Sheets

(52) U.S. Cl.
CPC .................. *G09G2300/0866* (2013.01); *G09G 2300/0871* (2013.01); *G09G 2310/0262* (2013.01); *G09G 2360/18* (2013.01)

(56) References Cited

U.S. PATENT DOCUMENTS 4,074,253 A 2/1978 Nadir
4,421,381 A 12/1983 Ueda et al.
4,559,535 A 12/1985 Watkins et al.
4,563,836 A 1/1986 Woodruff et al.
4,564,836 A 1/1986 Vuilleumier et al.
4,582,396 A 4/1986 Bos et al.
4,673,253 A 6/1987 Tanabe et al.
4,728,936 A 3/1988 Guscott et al.
4,744,640 A 5/1988 Phillips
4,889,603 A 12/1989 DiSanto et al.
4,958,911 A 9/1990 Beiswenger et al.
4,991,941 A 2/1991 Kalmanash
5,005,108 A 4/1991 Pristash et al.
5,025,346 A 6/1991 Tang et al.
5,025,356 A 6/1991 Gawad
5,042,900 A 8/1991 Parker
5,044,734 A 9/1991 Sperl et al.
5,050,946 A 9/1991 Hathaway et al.
5,061,049 A 10/1991 Hornbeck
5,062,689 A 11/1991 Koehler
5,078,479 A 1/1992 Vuilleumier
5,093,652 A 3/1992 Bull et al.
5,096,279 A 3/1992 Hornbeck et al.
5,128,787 A 7/1992 Blonder
5,136,480 A 8/1992 Pristash et al.
5,136,751 A 8/1992 Coyne et al.
5,142,405 A 8/1992 Hornbeck
5,184,248 A 2/1993 De Vaan et al.
5,184,428 A 2/1993 Feldt et al.
5,198,730 A 3/1993 Vancil
5,202,950 A 4/1993 Arego et al.
5,233,385 A 8/1993 Sampsell
5,233,459 A 8/1993 Bozler et al.
5,245,454 A 9/1993 Blonder
5,266,612 A 11/1993 Kim et al.
5,278,652 A 1/1994 Urbanus et al.
5,280,277 A 1/1994 Hornbeck
5,319,061 A 6/1994 Ramaswamy
5,319,491 A 6/1994 Selbrede
5,339,116 A 8/1994 Urbanus et al.
5,339,179 A 8/1994 Rudisill et al.
5,359,345 A 10/1994 Hunter
5,379,135 A 1/1995 Nakagaki et al.
5,393,710 A 2/1995 Park et al.
5,396,350 A 3/1995 Beeson et al.
5,405,490 A 4/1995 Park et al.
5,416,631 A 5/1995 Yagi
5,440,197 A 8/1995 Gleckman
5,452,024 A 9/1995 Sampsell
5,461,411 A 10/1995 Florence et al.
5,465,175 A 11/1995 Woodgate et al.
5,467,104 A 11/1995 Furness, III
5,477,086 A 12/1995 Rostoker et al.
5,479,279 A 12/1995 Barbier et al.
5,491,347 A 2/1996 Allen et al.
5,493,439 A 2/1996 Engle
5,497,172 A 3/1996 Doherty et al.
5,497,258 A 3/1996 Ju et al.
5,499,127 A 3/1996 Tsubota et al.
5,504,389 A 4/1996 Dickey
5,504,614 A 4/1996 Webb et al.
5,510,824 A 4/1996 Nelson
5,517,341 A 5/1996 Kim et al.
5,517,347 A 5/1996 Sampsell
5,519,240 A 5/1996 Suzuki
5,519,565 A 5/1996 Kalt et al.
5,523,803 A 6/1996 Urbanus et al.
5,526,051 A 6/1996 Gove et al.
5,528,262 A 6/1996 McDowall et al.
5,548,301 A 8/1996 Kornher et al.
5,548,670 A 8/1996 Koike
5,552,925 A 9/1996 Worley
5,559,389 A 9/1996 Spindt et al.
5,568,964 A 10/1996 Parker et al.
5,578,185 A 11/1996 Bergeron et al.
5,579,035 A 11/1996 Beiswenger
5,579,240 A 11/1996 Buus
5,591,049 A 1/1997 Dohnishi
5,596,339 A 1/1997 Furness, III et al.
5,596,369 A 1/1997 Chau
5,613,751 A 3/1997 Parker et al.
5,618,096 A 4/1997 Parker et al.
5,619,266 A 4/1997 Tomita et al.
5,622,612 A 4/1997 Mihara et al.
5,629,784 A 5/1997 Abileah et al.
5,629,787 A 5/1997 Tsubota et al.
5,655,832 A 8/1997 Pelka et al.
5,655,838 A 8/1997 Ridley et al.
5,659,327 A 8/1997 Furness, III et al.
5,663,917 A 9/1997 Oka et al.
5,666,226 A 9/1997 Ezra et al.
5,677,749 A 10/1997 Tsubota et al.
5,684,354 A 11/1997 Gleckman
5,687,465 A 11/1997 Hinata et al.
5,691,695 A 11/1997 Lahiff
5,694,227 A 12/1997 Starkweather
5,724,062 A 3/1998 Hunter
5,731,802 A 3/1998 Aras et al.
5,745,193 A 4/1998 Urbanus et al.
5,745,203 A 4/1998 Valliath et al.
5,745,281 A 4/1998 Yi et al.
5,745,284 A 4/1998 Goldberg et al.
5,771,321 A 6/1998 Stern
5,781,331 A 7/1998 Carr et al.
5,781,333 A 7/1998 Lanzillotta et al.
5,784,189 A 7/1998 Bozler et al.
5,794,761 A 8/1998 Renaud et al.
5,798,746 A 8/1998 Koyama
5,801,792 A 9/1998 Smith et al.
5,808,800 A 9/1998 Handschy et al.
5,810,469 A 9/1998 Weinreich
5,815,134 A 9/1998 Nishi
5,835,255 A 11/1998 Miles
5,835,256 A 11/1998 Huibers
5,854,872 A 12/1998 Tai
5,867,302 A 2/1999 Fleming
5,876,107 A 3/1999 Parker et al.
5,884,872 A 3/1999 Greenhalgh
5,889,625 A 3/1999 Chen et al.
5,894,686 A 4/1999 Parker et al.
5,895,115 A 4/1999 Parker et al.
5,917,692 A * 6/1999 Schmitz et al. ............... 361/187
5,921,652 A 7/1999 Parker et al.
5,923,480 A 7/1999 Labeye
5,926,591 A 7/1999 Labeye et al.
5,936,596 A 8/1999 Yoshida et al.
5,943,223 A 8/1999 Pond
5,953,469 A 9/1999 Zhou
5,959,763 A 9/1999 Bozler et al.
5,963,367 A 10/1999 Aksyuk et al.
5,973,727 A 10/1999 McGrew et al.
5,975,711 A 11/1999 Parker et al.
5,986,628 A 11/1999 Tuenge et al.
5,986,796 A 11/1999 Miles
5,986,828 A 11/1999 Wood et al.
5,990,990 A 11/1999 Crabtree
5,994,204 A 11/1999 Young et al.
5,995,688 A 11/1999 Aksyuk et al.
6,008,781 A 12/1999 Furness, III
6,008,929 A 12/1999 Akimoto et al.
6,028,656 A 2/2000 Buhrer et al.
6,030,089 A 2/2000 Parker et al.
6,034,807 A 3/2000 Little et al.
6,040,796 A 3/2000 Matsugatani et al.
6,040,937 A 3/2000 Miles
6,046,836 A 4/2000 Tuchman
6,046,840 A 4/2000 Huibers
6,049,317 A 4/2000 Thompson et al.

(56) References Cited

U.S. PATENT DOCUMENTS

| | | | | |
|---|---|---|---|---|
| 6,055,090 | A | 4/2000 | Miles | |
| 6,069,676 | A | 5/2000 | Yuyama | |
| 6,079,838 | A | 6/2000 | Parker et al. | |
| 6,111,560 | A | 8/2000 | May | |
| 6,130,527 | A * | 10/2000 | Bontempo et al. | 323/280 |
| 6,130,735 | A | 10/2000 | Hatanaka et al. | |
| 6,137,313 | A | 10/2000 | Wong et al. | |
| 6,154,586 | A | 11/2000 | MacDonald et al. | |
| 6,158,867 | A | 12/2000 | Parker et al. | |
| 6,162,657 | A | 12/2000 | Schiele et al. | |
| 6,168,395 | B1 | 1/2001 | Quenzer et al. | |
| 6,172,657 | B1 | 1/2001 | Kamakura et al. | |
| 6,172,797 | B1 | 1/2001 | Huibers | |
| 6,174,064 | B1 | 1/2001 | Kalantar et al. | |
| 6,195,196 | B1 | 2/2001 | Kimura et al. | |
| 6,201,633 | B1 | 3/2001 | Peeters et al. | |
| 6,201,664 | B1 | 3/2001 | Le et al. | |
| 6,206,550 | B1 | 3/2001 | Fukushima et al. | |
| 6,215,536 | B1 | 4/2001 | Ebihara et al. | |
| 6,219,119 | B1 | 4/2001 | Nakai | |
| 6,225,991 | B1 | 5/2001 | McKnight | |
| 6,227,677 | B1 | 5/2001 | Willis | |
| 6,239,777 | B1 | 5/2001 | Sugahara et al. | |
| 6,249,169 | B1 | 6/2001 | Okada | |
| 6,249,269 | B1 | 6/2001 | Blalock et al. | |
| 6,249,370 | B1 | 6/2001 | Takeuchi et al. | |
| 6,266,240 | B1 | 7/2001 | Urban et al. | |
| 6,275,320 | B1 | 8/2001 | Dhuler et al. | |
| 6,282,951 | B1 | 9/2001 | Loga et al. | |
| 6,285,270 | B1 | 9/2001 | Lane et al. | |
| 6,288,824 | B1 | 9/2001 | Kastalsky | |
| 6,288,829 | B1 | 9/2001 | Kimura | |
| 6,295,054 | B1 | 9/2001 | McKnight | |
| 6,296,383 | B1 | 10/2001 | Henningsen | |
| 6,296,838 | B1 | 10/2001 | Bindra et al. | |
| 6,300,154 | B2 | 10/2001 | Clark et al. | |
| 6,300,294 | B1 | 10/2001 | Robbins et al. | |
| 6,317,103 | B1 | 11/2001 | Furness, III | |
| 6,323,834 | B1 | 11/2001 | Colgan et al. | |
| 6,329,967 | B1 | 12/2001 | Little et al. | |
| 6,329,971 | B2 | 12/2001 | McKnight | |
| 6,329,974 | B1 | 12/2001 | Walker et al. | |
| 6,360,033 | B1 | 3/2002 | Lee et al. | |
| 6,367,940 | B1 | 4/2002 | Parker et al. | |
| 6,388,661 | B1 | 5/2002 | Richards | |
| 6,392,736 | B1 | 5/2002 | Furukawa et al. | |
| 6,402,335 | B1 | 6/2002 | Kalantar et al. | |
| 6,402,355 | B1 | 6/2002 | Kinouchi | |
| 6,404,942 | B1 | 6/2002 | Edwards et al. | |
| 6,407,851 | B1 | 6/2002 | Islam et al. | |
| 6,411,423 | B2 | 6/2002 | Ham | |
| 6,424,329 | B1 | 7/2002 | Okita | |
| 6,424,388 | B1 | 7/2002 | Colgan et al. | |
| 6,428,173 | B1 | 8/2002 | Dhuler et al. | |
| 6,429,625 | B1 | 8/2002 | LeFevre et al. | |
| 6,429,628 | B2 | 8/2002 | Nakagawa | |
| 6,459,467 | B1 | 10/2002 | Hashimoto et al. | |
| 6,471,879 | B2 | 10/2002 | Hanson et al. | |
| 6,473,220 | B1 | 10/2002 | Clikeman et al. | |
| 6,476,886 | B2 | 11/2002 | Krusius et al. | |
| 6,483,613 | B1 | 11/2002 | Woodgate et al. | |
| 6,486,997 | B1 | 11/2002 | Bruzzone et al. | |
| 6,498,685 | B1 | 12/2002 | Johnson | |
| 6,504,985 | B2 | 1/2003 | Parker et al. | |
| 6,507,138 | B1 | 1/2003 | Rodgers et al. | |
| 6,508,563 | B2 | 1/2003 | Parker et al. | |
| 6,514,111 | B2 | 2/2003 | Ebihara et al. | |
| 6,523,961 | B2 | 2/2003 | Ilkov et al. | |
| 6,529,250 | B1 | 3/2003 | Murakami et al. | |
| 6,529,265 | B1 | 3/2003 | Henningsen | |
| 6,531,329 | B2 | 3/2003 | Asakura et al. | |
| 6,531,947 | B1 | 3/2003 | Weaver et al. | |
| 6,532,044 | B1 | 3/2003 | Conner et al. | |
| 6,535,256 | B1 | 3/2003 | Ishihara et al. | |
| 6,535,311 | B1 | 3/2003 | Lindquist | |
| 6,556,258 | B1 | 4/2003 | Yoshida et al. | |
| 6,556,261 | B1 | 4/2003 | Krusius et al. | |
| RE38,108 | E | 5/2003 | Chee et al. | |
| 6,559,827 | B1 | 5/2003 | Mangerson | |
| 6,567,063 | B1 | 5/2003 | Okita | |
| 6,567,138 | B1 | 5/2003 | Krusius et al. | |
| 6,574,033 | B1 | 6/2003 | Chui et al. | |
| 6,576,887 | B2 | 6/2003 | Whitney et al. | |
| 6,582,095 | B1 | 6/2003 | Toyoda | |
| 6,583,915 | B1 | 6/2003 | Hong et al. | |
| 6,589,625 | B1 | 7/2003 | Kothari et al. | |
| 6,591,049 | B2 | 7/2003 | Williams et al. | |
| 6,593,677 | B2 | 7/2003 | Behin et al. | |
| 6,600,474 | B1 | 7/2003 | Heines et al. | |
| 6,621,488 | B1 | 9/2003 | Takeuchi et al. | |
| 6,626,540 | B2 | 9/2003 | Ouchi et al. | |
| 6,633,301 | B1 | 10/2003 | Dallas et al. | |
| 6,639,570 | B2 | 10/2003 | Furness, III et al. | |
| 6,639,572 | B1 | 10/2003 | Little et al. | |
| 6,650,455 | B2 | 11/2003 | Miles | |
| 6,650,822 | B1 | 11/2003 | Zhou | |
| 6,664,779 | B2 | 12/2003 | Lopes et al. | |
| 6,666,561 | B1 | 12/2003 | Blakley | |
| 6,671,078 | B2 | 12/2003 | Flanders et al. | |
| 6,674,562 | B1 | 1/2004 | Miles | |
| 6,677,709 | B1 | 1/2004 | Ma et al. | |
| 6,677,936 | B2 | 1/2004 | Jacobsen et al. | |
| 6,678,029 | B2 | 1/2004 | Suzuki | |
| 6,680,792 | B2 | 1/2004 | Miles | |
| 6,687,040 | B2 | 2/2004 | Kimura | |
| 6,687,896 | B1 | 2/2004 | Royce et al. | |
| 6,690,422 | B1 | 2/2004 | Daly et al. | |
| 6,697,035 | B2 | 2/2004 | Sugahara et al. | |
| 6,698,348 | B1 | 3/2004 | Bloss | |
| 6,698,349 | B2 | 3/2004 | Komata | |
| 6,700,554 | B2 | 3/2004 | Ham et al. | |
| 6,701,039 | B2 | 3/2004 | Bourgeois et al. | |
| 6,707,176 | B1 | 3/2004 | Rodgers | |
| 6,710,008 | B2 | 3/2004 | Chang et al. | |
| 6,710,538 | B1 | 3/2004 | Ahn et al. | |
| 6,710,908 | B2 | 3/2004 | Miles et al. | |
| 6,710,920 | B1 | 3/2004 | Mashitani et al. | |
| 6,712,071 | B1 | 3/2004 | Parker | |
| 6,712,481 | B2 | 3/2004 | Ezell et al. | |
| 6,731,355 | B2 | 5/2004 | Miyashita | |
| 6,731,492 | B2 | 5/2004 | Goodwin-Johansson | |
| 6,733,354 | B1 | 5/2004 | Cathey et al. | |
| 6,738,177 | B1 | 5/2004 | Gutierrez et al. | |
| 6,741,377 | B2 | 5/2004 | Miles | |
| 6,746,886 | B2 | 6/2004 | Duncan et al. | |
| 6,749,312 | B2 | 6/2004 | Parker et al. | |
| 6,750,930 | B2 | 6/2004 | Yoshii et al. | |
| 6,752,505 | B2 | 6/2004 | Parker et al. | |
| 6,755,534 | B2 | 6/2004 | Veligdan et al. | |
| 6,755,547 | B2 | 6/2004 | Parker | |
| 6,760,081 | B2 | 7/2004 | Takagi | |
| 6,760,505 | B1 | 7/2004 | Street et al. | |
| 6,762,743 | B2 | 7/2004 | Yoshihara et al. | |
| 6,762,868 | B2 | 7/2004 | Liu et al. | |
| 6,764,796 | B2 | 7/2004 | Fries | |
| 6,774,964 | B2 | 8/2004 | Funamoto et al. | |
| 6,775,048 | B1 | 8/2004 | Starkweather et al. | |
| 6,778,162 | B2 | 8/2004 | Kimura et al. | |
| 6,778,228 | B2 | 8/2004 | Murakami et al. | |
| 6,778,248 | B1 | 8/2004 | Ootaguro et al. | |
| 6,785,454 | B2 | 8/2004 | Abe | |
| 6,787,969 | B2 | 9/2004 | Grade et al. | |
| 6,788,371 | B2 | 9/2004 | Tanada et al. | |
| 6,794,119 | B2 | 9/2004 | Miles | |
| 6,795,064 | B2 | 9/2004 | Walker et al. | |
| 6,796,668 | B2 | 9/2004 | Parker et al. | |
| 6,798,935 | B2 | 9/2004 | Bourgeois et al. | |
| 6,800,996 | B2 | 10/2004 | Nagai et al. | |
| 6,809,851 | B1 | 10/2004 | Gurcan | |
| 6,819,386 | B2 | 11/2004 | Roosendaal et al. | |
| 6,819,465 | B2 | 11/2004 | Clikeman et al. | |
| 6,822,734 | B1 | 11/2004 | Eidelman et al. | |
| 6,825,470 | B1 | 11/2004 | Bawolek et al. | |
| 6,825,499 | B2 | 11/2004 | Nakajima et al. | |

(56) References Cited

U.S. PATENT DOCUMENTS 6,827,456 B2 12/2004 Parker et al.
6,831,678 B1 12/2004 Travis
6,832,511 B2 12/2004 Samoto et al.
6,835,111 B2 12/2004 Ahn et al.
6,844,959 B2 1/2005 Huibers et al.
6,846,082 B2 1/2005 Glent-Madsen et al.
6,846,089 B2 1/2005 Stevenson et al.
6,847,425 B2 1/2005 Tanada et al.
6,847,428 B1 1/2005 Sekiguchi et al.
6,852,095 B1 2/2005 Ray
6,857,751 B2 2/2005 Penn et al.
6,859,625 B2 2/2005 Sawada
6,862,072 B2 3/2005 Liu et al.
6,863,219 B1 3/2005 Jacobsen et al.
6,864,618 B2 3/2005 Miller et al.
6,867,192 B1 3/2005 Armour et al.
6,867,896 B2 3/2005 Miles
6,873,311 B2 3/2005 Yoshihara et al.
6,879,307 B1 4/2005 Stern
6,886,956 B2 5/2005 Parker et al.
6,887,202 B2 5/2005 Currie et al.
6,888,678 B2 5/2005 Nishiyama et al.
6,889,565 B2 5/2005 DeConde et al.
6,893,677 B2 5/2005 Yamada et al.
6,897,164 B2 5/2005 Baude et al.
6,897,843 B2 5/2005 Ayres et al.
6,900,072 B2 5/2005 Patel et al.
6,906,847 B2 6/2005 Huibers et al.
6,911,891 B2 6/2005 Qiu et al.
6,911,964 B2 6/2005 Lee et al.
6,912,082 B1 6/2005 Lu et al.
6,919,981 B2 7/2005 Clikeman et al.
6,934,080 B2 8/2005 Saccomanno et al.
6,936,013 B2 8/2005 Pevoto
6,936,968 B2 8/2005 Cross et al.
6,939,013 B2 9/2005 Asao
6,940,631 B2 9/2005 Ishikawa
6,943,495 B2 9/2005 Ma et al.
6,947,107 B2 9/2005 Yoshii et al.
6,947,195 B2 9/2005 Ohtaka et al.
6,950,240 B2 9/2005 Matsuo
6,952,301 B2 10/2005 Huibers
6,953,375 B2 10/2005 Ahn et al.
6,961,167 B2 11/2005 Prins et al.
6,962,418 B2 11/2005 Utsumi et al.
6,962,419 B2 11/2005 Huibers
6,963,330 B2 11/2005 Sugahara et al.
6,965,375 B1 11/2005 Gettemy et al.
6,967,698 B2 11/2005 Tanoue et al.
6,967,763 B2 11/2005 Fujii et al.
6,969,635 B2 11/2005 Patel et al.
6,970,227 B2 11/2005 Kida et al.
6,972,889 B2 12/2005 Goodwin-Johansson et al.
6,977,710 B2 12/2005 Akiyama et al.
6,980,349 B1 12/2005 Huibers et al.
6,985,205 B2 1/2006 Chol et al.
6,992,375 B2 1/2006 Robbins et al.
6,996,306 B2 2/2006 Chen et al.
7,004,610 B2 2/2006 Yamashita et al.
7,004,611 B2 2/2006 Parker et al.
7,012,726 B1 3/2006 Miles
7,012,732 B2 3/2006 Miles
7,014,349 B2 3/2006 Shinohara et al.
7,019,809 B2 3/2006 Sekiguchi
7,026,821 B2 4/2006 Martin et al.
7,038,758 B2 5/2006 Suzuki
7,042,618 B2 5/2006 Selebrede et al.
7,042,643 B2 5/2006 Miles
7,046,221 B1 5/2006 Malzbender
7,046,905 B1 5/2006 Gardiner et al.
7,048,905 B2 5/2006 Paparatto et al.
7,050,035 B2 5/2006 Iisaka
7,050,141 B2 5/2006 Yokoue
7,050,219 B2 5/2006 Kimura
7,050,790 B2 5/2006 Yamaga
7,057,790 B2 6/2006 Selbrede
7,060,895 B2 6/2006 Kothari et al.
7,071,611 B2 7/2006 Yonekubo et al.
7,072,096 B2 7/2006 Holman et al.
7,075,702 B2 7/2006 Huibers et al.
7,092,142 B2 8/2006 Selebrede et al.
7,110,158 B2 9/2006 Miles
7,116,464 B2 10/2006 Osawa
7,119,944 B2 10/2006 Patel et al.
7,123,216 B1 10/2006 Miles
7,123,796 B2 10/2006 Steckl et al.
7,126,738 B2 10/2006 Miles
7,140,751 B2 11/2006 Lin
7,156,548 B2 1/2007 Teng et al.
7,161,094 B2 1/2007 Kothari et al.
7,164,250 B2 1/2007 Boscolo et al.
7,164,520 B2 1/2007 Palmateer et al.
7,180,677 B2 2/2007 Fujii et al.
7,184,202 B2 2/2007 Miles et al.
7,196,837 B2 3/2007 Sampsell et al.
7,198,982 B2 4/2007 Patel et al.
7,199,916 B2 4/2007 Faase et al.
7,215,459 B2 5/2007 Huibers et al.
7,217,588 B2 5/2007 Hartzell et al.
7,218,437 B2 5/2007 Selbrede
7,227,677 B2 6/2007 Ravnkilde et al.
7,233,304 B1 6/2007 Aratani et al.
7,271,945 B2 9/2007 Hagood et al.
7,274,416 B2 9/2007 Feenstra et al.
7,291,363 B2 11/2007 Miller
7,292,235 B2 11/2007 Nose
7,298,448 B2 11/2007 Wu
7,304,785 B2 12/2007 Hagood et al.
7,304,786 B2 12/2007 Hagood et al.
7,315,294 B2 1/2008 Richards
7,345,805 B2 3/2008 Chui
7,359,108 B2 4/2008 Hayes et al.
7,365,897 B2 4/2008 Hagood et al.
7,374,328 B2 5/2008 Kuroda et al.
7,391,493 B2 6/2008 Kim
7,391,552 B2 6/2008 Barton et al.
7,405,852 B2 7/2008 Hagood, IV et al.
7,417,735 B2 8/2008 Cummings et al.
7,417,782 B2 8/2008 Hagood et al.
7,420,725 B2 9/2008 Kothari
7,460,290 B2 12/2008 Hagood, IV et al.
7,463,227 B2 12/2008 Van Gorkom
7,463,398 B2 12/2008 Feenstra et al.
7,502,159 B2 3/2009 Hagood, IV et al.
7,529,012 B2 5/2009 Hayes et al.
7,551,344 B2 6/2009 Hagood et al.
7,573,547 B2 8/2009 Palmateer et al.
7,601,942 B2 10/2009 Underwood et al.
7,616,368 B2 11/2009 Hagood, IV
7,619,806 B2 11/2009 Hagood, IV et al.
7,636,189 B2 12/2009 Hagood, IV et al.
7,666,049 B2 2/2010 Saito et al.
7,675,665 B2 3/2010 Hagood et al.
7,715,080 B2 5/2010 Natarajan et al.
7,729,037 B2 6/2010 Hagood, IV et al.
7,742,016 B2 6/2010 Hagood et al.
7,742,215 B2 6/2010 Hagood, IV
7,746,529 B2 6/2010 Hagood et al.
7,755,582 B2 7/2010 Hagood et al.
7,826,127 B2 11/2010 Khonsari et al.
7,839,356 B2 11/2010 Hagood et al.
7,852,546 B2 12/2010 Fijol et al.
7,876,489 B2 1/2011 Gandhi et al.
7,898,714 B2 3/2011 Hagood, IV et al.
7,920,317 B2 4/2011 Lee et al.
7,927,654 B2 4/2011 Hagood et al.
7,975,665 B2 7/2011 Mori
7,999,994 B2 8/2011 Hagood, IV et al.
8,159,428 B2 4/2012 Hagood et al.
8,169,679 B2 5/2012 Wu et al.
8,310,442 B2 11/2012 Hagood et al.
8,482,496 B2 7/2013 Lewis
8,519,923 B2 8/2013 Hagood et al.
8,519,945 B2 8/2013 Hagood et al.

(56) References Cited

U.S. PATENT DOCUMENTS

| | | | |
|---|---|---|---|
| 8,526,096 B2 | 9/2013 | Steyn et al. | |
| 8,698,980 B2 | 4/2014 | Chao et al. | |
| 2001/0001260 A1 | 5/2001 | Parker et al. | |
| 2001/0028422 A1 | 10/2001 | Tsujimura et al. | |
| 2001/0028993 A1 | 10/2001 | Sanford | |
| 2001/0030488 A1 | 10/2001 | Jerman et al. | |
| 2001/0040538 A1 | 11/2001 | Quanrud | |
| 2001/0043177 A1 | 11/2001 | Huston et al. | |
| 2001/0043208 A1 | 11/2001 | Furness, III | |
| 2001/0048265 A1 | 12/2001 | Miller et al. | |
| 2001/0048431 A1 | 12/2001 | Laffargue et al. | |
| 2001/0050661 A1 | 12/2001 | Noda et al. | |
| 2001/0053075 A1 | 12/2001 | Parker et al. | |
| 2002/0000959 A1 | 1/2002 | Colgan et al. | |
| 2002/0001051 A1 | 1/2002 | Krusius et al. | |
| 2002/0009275 A1 | 1/2002 | Williams et al. | |
| 2002/0012159 A1 | 1/2002 | Tew | |
| 2002/0015215 A1 | 2/2002 | Miles | |
| 2002/0024641 A1 | 2/2002 | Ilkov et al. | |
| 2002/0024711 A1 | 2/2002 | Miles | |
| 2002/0030566 A1 | 3/2002 | Bozler et al. | |
| 2002/0047172 A1 | 4/2002 | Reid | |
| 2002/0051096 A1 | 5/2002 | Yamazaki et al. | |
| 2002/0054424 A1 | 5/2002 | Miles | |
| 2002/0054487 A1 | 5/2002 | Parker et al. | |
| 2002/0056900 A1 | 5/2002 | Liu et al. | |
| 2002/0063218 A1 | 5/2002 | Maydanich et al. | |
| 2002/0063661 A1 | 5/2002 | Comiskey et al. | |
| 2002/0070931 A1 | 6/2002 | Ishikawa | |
| 2002/0075555 A1 | 6/2002 | Miles | |
| 2002/0080598 A1 | 6/2002 | Parker et al. | |
| 2002/0093722 A1 | 7/2002 | Chan et al. | |
| 2002/0109903 A1 | 8/2002 | Kaeriyama | |
| 2002/0113281 A1 | 8/2002 | Cunningham et al. | |
| 2002/0118911 A1 | 8/2002 | Bourgeois et al. | |
| 2002/0126364 A1 | 9/2002 | Miles | |
| 2002/0126387 A1 | 9/2002 | Ishikawa et al. | |
| 2002/0132389 A1 | 9/2002 | Patel et al. | |
| 2002/0135553 A1 | 9/2002 | Nagai et al. | |
| 2002/0141174 A1 | 10/2002 | Parker et al. | |
| 2002/0149828 A1 | 10/2002 | Miles et al. | |
| 2002/0150698 A1 | 10/2002 | Kawabata | |
| 2002/0163482 A1 | 11/2002 | Sullivan | |
| 2002/0163484 A1 | 11/2002 | Furness, III et al. | |
| 2002/0163709 A1 | 11/2002 | Mirza | |
| 2002/0171327 A1 | 11/2002 | Miller et al. | |
| 2002/0181597 A1 | 12/2002 | Okada | |
| 2002/0185699 A1 | 12/2002 | Reid | |
| 2002/0191267 A1 | 12/2002 | Flanders et al. | |
| 2002/0195423 A1 | 12/2002 | Patel et al. | |
| 2002/0196522 A1 | 12/2002 | Little et al. | |
| 2003/0001815 A1 | 1/2003 | Cui | |
| 2003/0007344 A1 | 1/2003 | Parker | |
| 2003/0009898 A1 | 1/2003 | Slocum et al. | |
| 2003/0010894 A1 | 1/2003 | Yoshihara et al. | |
| 2003/0021004 A1 | 1/2003 | Cunningham et al. | |
| 2003/0023110 A1 | 1/2003 | Tam et al. | |
| 2003/0029705 A1 | 2/2003 | Qiu et al. | |
| 2003/0036215 A1 | 2/2003 | Reid | |
| 2003/0042157 A1 | 3/2003 | Mays | |
| 2003/0043157 A1 | 3/2003 | Miles | |
| 2003/0043337 A1 | 3/2003 | Takabayashi | |
| 2003/0048036 A1 | 3/2003 | Lemkin | |
| 2003/0048370 A1 | 3/2003 | Koyama | |
| 2003/0058543 A1 | 3/2003 | Sheedy et al. | |
| 2003/0063233 A1 | 4/2003 | Takagi | |
| 2003/0063234 A1 | 4/2003 | Oda et al. | |
| 2003/0067565 A1 | 4/2003 | Yamamura | |
| 2003/0068118 A1 | 4/2003 | Bourgeois et al. | |
| 2003/0071686 A1 | 4/2003 | Lemkin | |
| 2003/0072070 A1 | 4/2003 | Miles | |
| 2003/0076649 A1 | 4/2003 | Speakman | |
| 2003/0081315 A1 | 5/2003 | Kobayashi | |
| 2003/0081402 A1 | 5/2003 | Jeon et al. | |
| 2003/0085650 A1 | 5/2003 | Cathey et al. | |
| 2003/0085867 A1 | 5/2003 | Grabert | |
| 2003/0095081 A1 | 5/2003 | Furness, III | |
| 2003/0095398 A1 | 5/2003 | Parker et al. | |
| 2003/0102810 A1 | 6/2003 | Cross et al. | |
| 2003/0123245 A1 | 7/2003 | Parker et al. | |
| 2003/0123246 A1 | 7/2003 | Parker | |
| 2003/0123247 A1 | 7/2003 | Parker et al. | |
| 2003/0128218 A1 | 7/2003 | Struyk | |
| 2003/0128416 A1 | 7/2003 | Caracci et al. | |
| 2003/0133284 A1 | 7/2003 | Chipchase et al. | |
| 2003/0137499 A1 | 7/2003 | Iisaka | |
| 2003/0152872 A1 | 8/2003 | Miles | |
| 2003/0156422 A1 | 8/2003 | Tatewaki et al. | |
| 2003/0164814 A1* | 9/2003 | Starkweather et al. | 345/102 |
| 2003/0174422 A1 | 9/2003 | Miller et al. | |
| 2003/0174931 A1 | 9/2003 | Rodgers et al. | |
| 2003/0183008 A1 | 10/2003 | Bang et al. | |
| 2003/0184189 A1 | 10/2003 | Sinclair | |
| 2003/0190535 A1 | 10/2003 | Fries | |
| 2003/0190536 A1 | 10/2003 | Fries | |
| 2003/0196590 A1 | 10/2003 | Hartzell | |
| 2003/0202338 A1 | 10/2003 | Parker | |
| 2003/0210811 A1 | 11/2003 | Dubowsky et al. | |
| 2003/0218793 A1 | 11/2003 | Soneda et al. | |
| 2003/0231160 A1 | 12/2003 | Yoshihara et al. | |
| 2004/0001033 A1 | 1/2004 | Goodwin-Johansson et al. | |
| 2004/0012946 A1 | 1/2004 | Parker et al. | |
| 2004/0027636 A1 | 2/2004 | Miles | |
| 2004/0036668 A1 | 2/2004 | Nakanishi | |
| 2004/0051929 A1 | 3/2004 | Sampsell et al. | |
| 2004/0058532 A1 | 3/2004 | Miles et al. | |
| 2004/0076008 A1 | 4/2004 | Ikeda | |
| 2004/0080240 A1 | 4/2004 | Miller et al. | |
| 2004/0080484 A1 | 4/2004 | Heines et al. | |
| 2004/0080927 A1 | 4/2004 | Parker et al. | |
| 2004/0085608 A1 | 5/2004 | Theil et al. | |
| 2004/0085749 A1 | 5/2004 | Parker et al. | |
| 2004/0088629 A1 | 5/2004 | Ott | |
| 2004/0090144 A1 | 5/2004 | Miller et al. | |
| 2004/0090599 A1 | 5/2004 | Kowarz et al. | |
| 2004/0095739 A1 | 5/2004 | Parker et al. | |
| 2004/0100677 A1 | 5/2004 | Huibers et al. | |
| 2004/0113903 A1 | 6/2004 | Mikami et al. | |
| 2004/0114346 A1 | 6/2004 | Parker et al. | |
| 2004/0122328 A1 | 6/2004 | Wang et al. | |
| 2004/0125062 A1 | 7/2004 | Yamamoto et al. | |
| 2004/0125346 A1 | 7/2004 | Huibers | |
| 2004/0135273 A1 | 7/2004 | Parker et al. | |
| 2004/0135951 A1 | 7/2004 | Stumbo et al. | |
| 2004/0136204 A1 | 7/2004 | Asao | |
| 2004/0136680 A1 | 7/2004 | Medina et al. | |
| 2004/0141700 A1 | 7/2004 | Yang | |
| 2004/0145580 A1 | 7/2004 | Perlman | |
| 2004/0145793 A1 | 7/2004 | Barbour et al. | |
| 2004/0145854 A1 | 7/2004 | Tamura | |
| 2004/0156246 A1 | 8/2004 | Nakamura | |
| 2004/0157664 A1 | 8/2004 | Link | |
| 2004/0165372 A1 | 8/2004 | Parker | |
| 2004/0171206 A1 | 9/2004 | Rodgers | |
| 2004/0173872 A1 | 9/2004 | Park et al. | |
| 2004/0179146 A1 | 9/2004 | Nilsson | |
| 2004/0184710 A1 | 9/2004 | Kubby et al. | |
| 2004/0196215 A1 | 10/2004 | Duthaler et al. | |
| 2004/0196525 A1 | 10/2004 | Fujii et al. | |
| 2004/0207768 A1 | 10/2004 | Liu | |
| 2004/0207815 A1 | 10/2004 | Allen et al. | |
| 2004/0212759 A1 | 10/2004 | Hayashi | |
| 2004/0212907 A1 | 10/2004 | Mala et al. | |
| 2004/0217919 A1 | 11/2004 | Piehl et al. | |
| 2004/0218149 A1 | 11/2004 | Huibers | |
| 2004/0218154 A1 | 11/2004 | Huibers | |
| 2004/0218292 A1 | 11/2004 | Huibers | |
| 2004/0218293 A1 | 11/2004 | Huibers | |
| 2004/0223088 A1 | 11/2004 | Huibers | |
| 2004/0223240 A1 | 11/2004 | Huibers | |
| 2004/0227428 A1 | 11/2004 | Sinclair | |
| 2004/0233354 A1 | 11/2004 | Uehara et al. | |
| 2004/0233392 A1 | 11/2004 | Huibers | |
| 2004/0233498 A1 | 11/2004 | Starkweather et al. | |

(56) References Cited

U.S. PATENT DOCUMENTS

| | | | |
|---|---|---|---|
| 2004/0233503 | A1 | 11/2004 | Kimura |
| 2004/0240032 | A1 | 12/2004 | Miles |
| 2004/0240138 | A1 | 12/2004 | Martin et al. |
| 2004/0246275 | A1 | 12/2004 | Yoshihara et al. |
| 2004/0263076 | A1 | 12/2004 | De Zwart et al. |
| 2004/0263502 | A1 | 12/2004 | Dallas et al. |
| 2004/0263944 | A1 | 12/2004 | Miles et al. |
| 2005/0002082 | A1 | 1/2005 | Miles |
| 2005/0002086 | A1 | 1/2005 | Starkweather et al. |
| 2005/0007671 | A1 | 1/2005 | Onvlee |
| 2005/0007759 | A1 | 1/2005 | Parker |
| 2005/0012197 | A1 | 1/2005 | Smith et al. |
| 2005/0018322 | A1 | 1/2005 | Ben-Gad et al. |
| 2005/0024849 | A1 | 2/2005 | Parker et al. |
| 2005/0052681 | A1 | 3/2005 | Kogi |
| 2005/0052723 | A1 | 3/2005 | Watanabe et al. |
| 2005/0059184 | A1 | 3/2005 | Sniegowski et al. |
| 2005/0062708 | A1 | 3/2005 | Yoshihara et al. |
| 2005/0063037 | A1 | 3/2005 | Selebrede et al. |
| 2005/0072032 | A1 | 4/2005 | McCollum et al. |
| 2005/0073471 | A1 | 4/2005 | Selbrede |
| 2005/0088404 | A1 | 4/2005 | Heines et al. |
| 2005/0093465 | A1 | 5/2005 | Yonekubo et al. |
| 2005/0094240 | A1 | 5/2005 | Huibers et al. |
| 2005/0094418 | A1 | 5/2005 | Parker |
| 2005/0104804 | A1 | 5/2005 | Feenstra et al. |
| 2005/0111238 | A1 | 5/2005 | Parker |
| 2005/0111241 | A1 | 5/2005 | Parker |
| 2005/0116798 | A1 | 6/2005 | Bintoro et al. |
| 2005/0122560 | A1 | 6/2005 | Sampsell et al. |
| 2005/0122591 | A1 | 6/2005 | Parker et al. |
| 2005/0123243 | A1 | 6/2005 | Steckl et al. |
| 2005/0123249 | A1 | 6/2005 | Yun et al. |
| 2005/0123349 | A1 | 6/2005 | Koch |
| 2005/0128370 | A1 | 6/2005 | Moon |
| 2005/0134768 | A1 | 6/2005 | Sugiura et al. |
| 2005/0134805 | A1 | 6/2005 | Conner et al. |
| 2005/0139542 | A1 | 6/2005 | Dickensheets et al. |
| 2005/0140636 | A1 | 6/2005 | Chung et al. |
| 2005/0141076 | A1 | 6/2005 | Bausenwein et al. |
| 2005/0151940 | A1 | 7/2005 | Asao |
| 2005/0157365 | A1 | 7/2005 | Ravnkilde et al. |
| 2005/0157376 | A1 | 7/2005 | Huibers et al. |
| 2005/0168431 | A1 | 8/2005 | Chui |
| 2005/0168789 | A1 | 8/2005 | Glent-Madsen |
| 2005/0171408 | A1 | 8/2005 | Parker |
| 2005/0172625 | A1 | 8/2005 | Starkweather et al. |
| 2005/0179977 | A1 | 8/2005 | Chui et al. |
| 2005/0195467 | A1 | 9/2005 | Kothari et al. |
| 2005/0195468 | A1 | 9/2005 | Sampsell |
| 2005/0206991 | A1 | 9/2005 | Chui et al. |
| 2005/0207154 | A1 | 9/2005 | Parker |
| 2005/0207178 | A1 | 9/2005 | Parker |
| 2005/0212734 | A1 | 9/2005 | Kimura |
| 2005/0212738 | A1 | 9/2005 | Gally |
| 2005/0213183 | A9 | 9/2005 | Miles |
| 2005/0213322 | A1 | 9/2005 | Parker |
| 2005/0213323 | A1 | 9/2005 | Parker |
| 2005/0213349 | A1 | 9/2005 | Parker |
| 2005/0219676 | A1 | 10/2005 | Kimura et al. |
| 2005/0219679 | A1 | 10/2005 | Ishikawa |
| 2005/0219680 | A1 | 10/2005 | Ishikawa |
| 2005/0225501 | A1 | 10/2005 | Srinivasan et al. |
| 2005/0225519 | A1 | 10/2005 | Naugler, Jr. |
| 2005/0225732 | A1 | 10/2005 | Conner et al. |
| 2005/0225827 | A1 | 10/2005 | Kastalsky |
| 2005/0231790 | A1 | 10/2005 | Miles |
| 2005/0231791 | A1 | 10/2005 | Sampsell et al. |
| 2005/0236928 | A1 | 10/2005 | Kurozuka et al. |
| 2005/0237596 | A1 | 10/2005 | Selbrede |
| 2005/0242710 | A1 | 11/2005 | Yamazaki et al. |
| 2005/0243023 | A1 | 11/2005 | Reddy et al. |
| 2005/0244099 | A1 | 11/2005 | Pasch et al. |
| 2005/0244949 | A1 | 11/2005 | Miles |
| 2005/0245313 | A1 | 11/2005 | Yoshino et al. |
| 2005/0247477 | A1 | 11/2005 | Kothari et al. |
| 2005/0249966 | A1 | 11/2005 | Tung et al. |
| 2005/0253779 | A1 | 11/2005 | Feenstra et al. |
| 2005/0254115 | A1 | 11/2005 | Palmateer et al. |
| 2005/0258571 | A1 | 11/2005 | Dumond et al. |
| 2005/0259198 | A1 | 11/2005 | Lubart et al. |
| 2005/0263866 | A1 | 12/2005 | Wan |
| 2005/0265029 | A1 | 12/2005 | Epstein et al. |
| 2005/0275072 | A1 | 12/2005 | Haluzak et al. |
| 2005/0275930 | A1 | 12/2005 | Patel et al. |
| 2005/0285816 | A1 | 12/2005 | Glass |
| 2005/0286113 | A1 | 12/2005 | Miles |
| 2005/0286114 | A1 | 12/2005 | Miles |
| 2006/0001942 | A1 | 1/2006 | Chui et al. |
| 2006/0003676 | A1 | 1/2006 | Bernard et al. |
| 2006/0004928 | A1 | 1/2006 | Hess et al. |
| 2006/0007514 | A1 | 1/2006 | Desai |
| 2006/0007701 | A1 | 1/2006 | Schoellmann et al. |
| 2006/0012781 | A1 | 1/2006 | Fradkin et al. |
| 2006/0023287 | A1 | 2/2006 | Przybyla et al. |
| 2006/0028708 | A1 | 2/2006 | Miles |
| 2006/0028811 | A1 | 2/2006 | Ross et al. |
| 2006/0028817 | A1 | 2/2006 | Parker |
| 2006/0028840 | A1 | 2/2006 | Parker |
| 2006/0028841 | A1 | 2/2006 | Parker |
| 2006/0028843 | A1 | 2/2006 | Parker |
| 2006/0028844 | A1 | 2/2006 | Parker |
| 2006/0033676 | A1 | 2/2006 | Faase et al. |
| 2006/0033975 | A1 | 2/2006 | Miles |
| 2006/0038766 | A1 | 2/2006 | Morita |
| 2006/0038768 | A1 | 2/2006 | Sagawa et al. |
| 2006/0044246 | A1 | 3/2006 | Mignard |
| 2006/0044298 | A1 | 3/2006 | Mignard et al. |
| 2006/0044508 | A1 | 3/2006 | Mochizuki |
| 2006/0044928 | A1 | 3/2006 | Chui et al. |
| 2006/0061559 | A1 | 3/2006 | King |
| 2006/0066504 | A1 | 3/2006 | Sampsell et al. |
| 2006/0066540 | A1 | 3/2006 | Hewlett et al. |
| 2006/0066560 | A1 | 3/2006 | Gally et al. |
| 2006/0066598 | A1 | 3/2006 | Floyd |
| 2006/0066934 | A1 | 3/2006 | Selbrede |
| 2006/0066937 | A1 | 3/2006 | Chui |
| 2006/0077125 | A1 | 4/2006 | Floyd |
| 2006/0077153 | A1 | 4/2006 | Cummings et al. |
| 2006/0077533 | A1 | 4/2006 | Miles et al. |
| 2006/0092490 | A1 | 5/2006 | McCollum et al. |
| 2006/0104061 | A1 | 5/2006 | Lerner et al. |
| 2006/0132383 | A1 | 6/2006 | Gally et al. |
| 2006/0132404 | A1 | 6/2006 | Hayes et al. |
| 2006/0139734 | A1 | 6/2006 | Selebrede et al. |
| 2006/0146389 | A1 | 7/2006 | Selbrede |
| 2006/0152476 | A1 | 7/2006 | Van Gorkom et al. |
| 2006/0154078 | A1 | 7/2006 | Watanabe et al. |
| 2006/0172745 | A1 | 8/2006 | Knowles |
| 2006/0187190 | A1 | 8/2006 | Hagood et al. |
| 2006/0187191 | A1 | 8/2006 | Hagood et al. |
| 2006/0187290 | A1 | 8/2006 | Nakashima |
| 2006/0187528 | A1 | 8/2006 | Hagood et al. |
| 2006/0209000 | A1 | 9/2006 | Sumiyoshi et al. |
| 2006/0209012 | A1 | 9/2006 | Hagood, IV |
| 2006/0215540 | A1 | 9/2006 | Krishnamoorthi et al. |
| 2006/0238443 | A1 | 10/2006 | Derichs |
| 2006/0250325 | A1 | 11/2006 | Hagood et al. |
| 2006/0250676 | A1 | 11/2006 | Hagood, IV et al. |
| 2006/0256039 | A1 | 11/2006 | Hagood et al. |
| 2006/0262060 | A1 | 11/2006 | Amundson |
| 2006/0262380 | A1 | 11/2006 | Miles |
| 2006/0268386 | A1 | 11/2006 | Selbrede et al. |
| 2006/0268568 | A1 | 11/2006 | Oku et al. |
| 2006/0270179 | A1 | 11/2006 | Yang |
| 2006/0280319 | A1 | 12/2006 | Wang et al. |
| 2006/0291034 | A1 | 12/2006 | Patry et al. |
| 2006/0291771 | A1 | 12/2006 | Braunisch et al. |
| 2006/0291774 | A1 | 12/2006 | Schoellmann et al. |
| 2007/0002156 | A1 | 1/2007 | Hagood et al. |
| 2007/0002413 | A1 | 1/2007 | Psaltis et al. |
| 2007/0003055 | A1 | 1/2007 | Bark et al. |
| 2007/0007889 | A1 | 1/2007 | Bongaerts et al. |
| 2007/0024701 | A1 | 2/2007 | Prechtl et al. |

(56) References Cited

U.S. PATENT DOCUMENTS

| | | | |
|---|---|---|---|
| 2007/0030555 | A1 | 2/2007 | Barton et al. |
| 2007/0031097 | A1 | 2/2007 | Heikenfeld et al. |
| 2007/0035808 | A1 | 2/2007 | Amundson et al. |
| 2007/0040982 | A1 | 2/2007 | Nakano et al. |
| 2007/0047051 | A1 | 3/2007 | Selbrede et al. |
| 2007/0047887 | A1 | 3/2007 | Selbrede |
| 2007/0052636 | A1 | 3/2007 | Kalt et al. |
| 2007/0052660 | A1 | 3/2007 | Montbach et al. |
| 2007/0053652 | A1 | 3/2007 | Mignard et al. |
| 2007/0086078 | A1 | 4/2007 | Hagood et al. |
| 2007/0091011 | A1 | 4/2007 | Selbrede |
| 2007/0091038 | A1 | 4/2007 | Hagood, IV et al. |
| 2007/0103209 | A1 | 5/2007 | Lee |
| 2007/0127108 | A1 | 6/2007 | Hayes et al. |
| 2007/0132680 | A1 | 6/2007 | Kagawa et al. |
| 2007/0150813 | A1 | 6/2007 | Selebrede et al. |
| 2007/0159679 | A1 | 7/2007 | Hagood et al. |
| 2007/0172171 | A1 | 7/2007 | Van Ostrand et al. |
| 2007/0190265 | A1 | 8/2007 | Aoki et al. |
| 2007/0195026 | A1 | 8/2007 | Hagood et al. |
| 2007/0205969 | A1 | 9/2007 | Hagood, IV et al. |
| 2007/0216987 | A1 | 9/2007 | Hagood et al. |
| 2007/0217108 | A1 | 9/2007 | Ozawa et al. |
| 2007/0223080 | A1 | 9/2007 | Hagood et al. |
| 2007/0247401 | A1 | 10/2007 | Sasagawa et al. |
| 2007/0279727 | A1 | 12/2007 | Gandhi et al. |
| 2007/0297747 | A1 | 12/2007 | Biernath et al. |
| 2008/0014557 | A1 | 1/2008 | Kuhn et al. |
| 2008/0026066 | A1 | 1/2008 | Roser |
| 2008/0030827 | A1 | 2/2008 | Hagood et al. |
| 2008/0037104 | A1 | 2/2008 | Hagood, IV et al. |
| 2008/0043726 | A1 | 2/2008 | Herrero-Veron et al. |
| 2008/0062500 | A1 | 3/2008 | Hagood, IV et al. |
| 2008/0094853 | A1 | 4/2008 | Kim et al. |
| 2008/0123175 | A1 | 5/2008 | Hagood et al. |
| 2008/0129681 | A1 | 6/2008 | Hagood et al. |
| 2008/0145527 | A1 | 6/2008 | Hagood et al. |
| 2008/0158635 | A1 | 7/2008 | Hagood et al. |
| 2008/0158636 | A1 | 7/2008 | Hagood et al. |
| 2008/0165122 | A1 | 7/2008 | Duthaler et al. |
| 2008/0174532 | A1 | 7/2008 | Lewis |
| 2008/0278798 | A1 | 11/2008 | Hagood et al. |
| 2008/0279727 | A1 | 11/2008 | Haushalter |
| 2008/0283175 | A1 | 11/2008 | Hagood et al. |
| 2008/0297880 | A1 | 12/2008 | Steckl et al. |
| 2009/0034052 | A1 | 2/2009 | Hagood et al. |
| 2009/0091561 | A1 | 4/2009 | Koyama |
| 2009/0103164 | A1 | 4/2009 | Fijol et al. |
| 2009/0103281 | A1 | 4/2009 | Koh |
| 2009/0141335 | A1 | 6/2009 | Feenstra et al. |
| 2009/0195855 | A1 | 8/2009 | Steyn et al. |
| 2009/0284824 | A1 | 11/2009 | Feenstra et al. |
| 2010/0328608 | A1 | 12/2010 | Fujii et al. |
| 2011/0122474 | A1 | 5/2011 | Payne et al. |
| 2011/0148948 | A1 | 6/2011 | Gandhi et al. |
| 2011/0164067 | A1 | 7/2011 | Lewis et al. |
| 2011/0205259 | A1 | 8/2011 | Hagood, IV |
| 2011/0255146 | A1 | 10/2011 | Brosnihan et al. |
| 2011/0267668 | A1 | 11/2011 | Hagood, IV et al. |
| 2012/0133006 | A1 | 5/2012 | Hasselbach et al. |
| 2012/0169795 | A1 | 7/2012 | Hagood et al. |
| 2012/0200906 | A1 | 8/2012 | Wu et al. |
| 2012/0229226 | A1 | 9/2012 | Oja et al. |
| 2012/0280971 | A1 | 11/2012 | Hagood et al. |
| 2012/0320111 | A1 | 12/2012 | Hagood, IV et al. |
| 2012/0320112 | A1 | 12/2012 | Hagood, IV et al. |
| 2012/0320113 | A1 | 12/2012 | Hagood, IV et al. |
| 2013/0010341 | A1 | 1/2013 | Hagood et al. |
| 2013/0010342 | A1 | 1/2013 | Hagood, IV et al. |
| 2013/0010344 | A1 | 1/2013 | Hagood et al. |
| 2013/0335806 | A1 | 12/2013 | Steyn et al. |
| 2014/0085698 | A1 | 3/2014 | Wu et al. |
| 2014/0268293 | A1 | 9/2014 | Chleirigh et al. |

FOREIGN PATENT DOCUMENTS

| | | | |
|---|---|---|---|
| CN | 1206218 | A | 1/1999 |
| CN | 1309782 | A | 8/2001 |
| CN | 1390045 | A | 1/2003 |
| CN | 1402033 | A | 3/2003 |
| CN | 1476664 | A | 2/2004 |
| CN | 1491030 | A | 4/2004 |
| CN | 1498408 | A | 5/2004 |
| CN | 1541483 | A | 10/2004 |
| CN | 1542499 | A | 11/2004 |
| CN | 1555472 | A | 12/2004 |
| CN | 1573525 | A | 2/2005 |
| CN | 1584731 | A | 2/2005 |
| CN | 1599522 | A | 3/2005 |
| CN | 1623111 | A | 6/2005 |
| CN | 1898969 | A | 1/2007 |
| DE | 10332647 | A1 | 2/2005 |
| EP | 0366847 | A2 | 5/1990 |
| EP | 0438614 | A1 | 7/1991 |
| EP | 0359450 | B1 | 11/1994 |
| EP | 0495273 | B1 | 9/1996 |
| EP | 0415625 | B1 | 1/1997 |
| EP | 0757958 | A1 | 2/1997 |
| EP | 0786679 | A2 | 7/1997 |
| EP | 0884525 | A2 | 12/1998 |
| EP | 0889458 | A2 | 1/1999 |
| EP | 0751340 | B1 | 5/2000 |
| EP | 1022598 | | 7/2000 |
| EP | 1091342 | A2 | 4/2001 |
| EP | 1091343 | A2 | 4/2001 |
| EP | 1091842 | A1 | 4/2001 |
| EP | 1093142 | A2 | 4/2001 |
| EP | 1168051 | A1 | 1/2002 |
| EP | 1202096 | A2 | 5/2002 |
| EP | 1202244 | A1 | 5/2002 |
| EP | 1426190 | A1 | 6/2004 |
| EP | 1429310 | A2 | 6/2004 |
| EP | 1471495 | A2 | 10/2004 |
| EP | 1522883 | A1 | 4/2005 |
| EP | 1533853 | A2 | 5/2005 |
| EP | 1551002 | A2 | 7/2005 |
| EP | 1674893 | A1 | 6/2006 |
| EP | 1734502 | A1 | 12/2006 |
| EP | 1757958 | A1 | 2/2007 |
| EP | 2263968 | | 12/2010 |
| EP | 1858796 | | 1/2011 |
| EP | 2287110 | | 2/2011 |
| EP | 1640770 | | 4/2012 |
| EP | 2459777 | A1 | 6/2012 |
| FR | 2726135 | A1 | 4/1996 |
| GB | 2071896 | A | 9/1981 |
| GB | 2343980 | A | 5/2000 |
| JP | S56137386 | A | 10/1981 |
| JP | 57062028 | A | 4/1982 |
| JP | S5774730 | A | 5/1982 |
| JP | 57127264 | U | 8/1982 |
| JP | S5933077 | U | 2/1984 |
| JP | S62275230 | A | 11/1987 |
| JP | 3142409 | A | 6/1991 |
| JP | 4249203 | A | 9/1992 |
| JP | 5045648 | A | 2/1993 |
| JP | H06174929 | A | 6/1994 |
| JP | 6194649 | A | 7/1994 |
| JP | H06202009 | | 7/1994 |
| JP | H06222290 | | 8/1994 |
| JP | H06250593 | | 9/1994 |
| JP | H0836161 | A | 2/1996 |
| JP | H0895526 | | 4/1996 |
| JP | 8234158 | A | 9/1996 |
| JP | 8334752 | A | 12/1996 |
| JP | 9080386 | A | 3/1997 |
| JP | H09080386 | | 3/1997 |
| JP | 09189869 | A | 7/1997 |
| JP | 9198906 | A | 7/1997 |
| JP | H09189869 | | 7/1997 |
| JP | H09218360 | A | 8/1997 |
| JP | H09292576 | A | 11/1997 |
| JP | H1054916 | A | 2/1998 |

(56) References Cited

FOREIGN PATENT DOCUMENTS

| | | | |
|---|---|---|---|
| JP | H1054947 | A | 2/1998 |
| JP | 10282474 | A | 10/1998 |
| JP | H10282521 | | 10/1998 |
| JP | H10333145 | A | 12/1998 |
| JP | 11015393 | A | 1/1999 |
| JP | 11024038 | A | 1/1999 |
| JP | H1184419 | | 3/1999 |
| JP | H11126118 | | 5/1999 |
| JP | H11202325 | | 7/1999 |
| JP | H11095693 | | 9/1999 |
| JP | 2000028933 | | 1/2000 |
| JP | 2000028938 | | 1/2000 |
| JP | 2000057832 | A | 2/2000 |
| JP | 2000105547 | A | 4/2000 |
| JP | 2000111813 | A | 4/2000 |
| JP | 2000121970 | A | 4/2000 |
| JP | 2000214394 | | 4/2000 |
| JP | 2000131627 | A | 5/2000 |
| JP | 2000172219 | A | 6/2000 |
| JP | 2000214393 | A | 8/2000 |
| JP | 2000214395 | A | 8/2000 |
| JP | 2000214397 | A | 8/2000 |
| JP | 2000214831 | A | 8/2000 |
| JP | 2000235152 | A | 8/2000 |
| JP | 2000259116 | A | 9/2000 |
| JP | 2000321566 | A | 11/2000 |
| JP | 2001067010 | A | 3/2001 |
| JP | 2001075534 | A | 3/2001 |
| JP | 2001100121 | A | 4/2001 |
| JP | 2001125014 | A | 5/2001 |
| JP | 2001154642 | A | 6/2001 |
| JP | 2001175216 | A | 6/2001 |
| JP | 2001201698 | A | 7/2001 |
| JP | 2001201767 | A | 7/2001 |
| JP | 2001242826 | A | 9/2001 |
| JP | 2001281563 | A | 10/2001 |
| JP | 2001318377 | A | 11/2001 |
| JP | 2001331142 | A | 11/2001 |
| JP | 2001331144 | | 11/2001 |
| JP | 2001337649 | A | 12/2001 |
| JP | 2001356281 | A | 12/2001 |
| JP | 2001356327 | A | 12/2001 |
| JP | 2002040336 | A | 2/2002 |
| JP | 2002040337 | A | 2/2002 |
| JP | 2002139683 | A | 5/2002 |
| JP | 2002140038 | | 5/2002 |
| JP | 2002214543 | A | 7/2002 |
| JP | 2002279812 | A | 9/2002 |
| JP | 2002528763 | A | 9/2002 |
| JP | 2002287718 | A | 10/2002 |
| JP | 2002297085 | A | 10/2002 |
| JP | 2002318564 | A | 10/2002 |
| JP | 2002333619 | A | 11/2002 |
| JP | 2002341343 | A | 11/2002 |
| JP | 2002351431 | | 12/2002 |
| JP | 2002365650 | A | 12/2002 |
| JP | 2003029295 | A | 1/2003 |
| JP | 2003036057 | A | 2/2003 |
| JP | 2003506755 | | 2/2003 |
| JP | 2003084314 | | 3/2003 |
| JP | 2003086233 | A | 3/2003 |
| JP | 2003098984 | | 4/2003 |
| JP | 2003121824 | A | 4/2003 |
| JP | 2003162904 | A | 6/2003 |
| JP | 2003202519 | A | 7/2003 |
| JP | 2003248463 | A | 9/2003 |
| JP | 2003344785 | A | 12/2003 |
| JP | 2004004216 | A | 1/2004 |
| JP | 2004053839 | A | 2/2004 |
| JP | 2004069788 | A | 3/2004 |
| JP | 2004117833 | | 4/2004 |
| JP | 2004140800 | A | 5/2004 |
| JP | 2004151722 | | 5/2004 |
| JP | 2004163915 | | 6/2004 |
| JP | 2004191736 | A | 7/2004 |
| JP | 2004205973 | A | 7/2004 |
| JP | 2004212673 | A | 7/2004 |
| JP | 2004221051 | A | 8/2004 |
| JP | 2004287215 | A | 10/2004 |
| JP | 2004287431 | | 10/2004 |
| JP | 2004302270 | A | 10/2004 |
| JP | 2004317557 | A | 11/2004 |
| JP | 2004317785 | A | 11/2004 |
| JP | 2004325909 | A | 11/2004 |
| JP | 2004327025 | A | 11/2004 |
| JP | 2004534280 | A | 11/2004 |
| JP | 2004347982 | A | 12/2004 |
| JP | 2005010786 | A | 1/2005 |
| JP | 2005043674 | A | 2/2005 |
| JP | 2005043726 | A | 2/2005 |
| JP | 2005504355 | A | 2/2005 |
| JP | 2005512119 | A | 4/2005 |
| JP | 2005134896 | A | 5/2005 |
| JP | 2005309416 | A | 11/2005 |
| JP | 2006098990 | A | 4/2006 |
| JP | 2006522360 | A | 9/2006 |
| JP | 2007155983 | A | 6/2007 |
| JP | 2007517488 | | 6/2007 |
| JP | 2008015081 | A | 1/2008 |
| JP | 2008098984 | | 4/2008 |
| JP | 2008233898 | A | 10/2008 |
| JP | 2009111813 | A | 5/2009 |
| JP | 2012128451 | | 7/2012 |
| JP | 2012186782 | A | 9/2012 |
| JP | 2012230079 | A | 11/2012 |
| JP | 2013061658 | A | 4/2013 |
| WO | 9401716 | A1 | 1/1994 |
| WO | 9528035 | A1 | 10/1995 |
| WO | 9704436 | A1 | 2/1997 |
| WO | 9804950 | A1 | 2/1998 |
| WO | WO-9819201 | A1 | 5/1998 |
| WO | 9901696 | A1 | 1/1999 |
| WO | 0017695 | A1 | 3/2000 |
| WO | 0050807 | A1 | 8/2000 |
| WO | 0052674 | A1 | 9/2000 |
| WO | 0055916 | A1 | 9/2000 |
| WO | 0169584 | A1 | 9/2001 |
| WO | 0189986 | A1 | 11/2001 |
| WO | 0207482 | A2 | 1/2002 |
| WO | 03004836 | A1 | 1/2003 |
| WO | 03007049 | | 1/2003 |
| WO | 03008860 | A1 | 1/2003 |
| WO | 03029874 | | 4/2003 |
| WO | 03040802 | A2 | 5/2003 |
| WO | 03048836 | A2 | 6/2003 |
| WO | 03050448 | A1 | 6/2003 |
| WO | 03061007 | A1 | 7/2003 |
| WO | 03061329 | A2 | 7/2003 |
| WO | 03069593 | A2 | 8/2003 |
| WO | 03081315 | A1 | 10/2003 |
| WO | 03105198 | A1 | 12/2003 |
| WO | 2004008629 | A1 | 1/2004 |
| WO | 2004019120 | A1 | 3/2004 |
| WO | 2004034136 | A1 | 4/2004 |
| WO | 2004038496 | | 5/2004 |
| WO | 2004086098 | A2 | 10/2004 |
| WO | 2004088629 | A1 | 10/2004 |
| WO | 2004097506 | A2 | 11/2004 |
| WO | 2005001892 | A2 | 1/2005 |
| WO | 2005015287 | A1 | 2/2005 |
| WO | 2005062908 | A2 | 7/2005 |
| WO | 2005073950 | | 8/2005 |
| WO | 2005082908 | A1 | 9/2005 |
| WO | 2006017129 | A2 | 2/2006 |
| WO | 2006023077 | A2 | 3/2006 |
| WO | 2006039315 | A2 | 4/2006 |
| WO | 2006052755 | A2 | 5/2006 |
| WO | 2006091738 | A1 | 8/2006 |
| WO | 2006091791 | | 8/2006 |
| WO | 2006091860 | | 8/2006 |
| WO | 2006091904 | | 8/2006 |
| WO | 2007075832 | | 7/2007 |
| WO | 2007123173 | A1 | 11/2007 |
| WO | 2007145973 | | 12/2007 |

(56) References Cited

FOREIGN PATENT DOCUMENTS

| | | | |
|---|---|---|---|
| WO | 2008026066 A1 | 3/2008 | |
| WO | WO-2008091339 A2 | 7/2008 | |
| WO | WO-2009102471 A1 | 8/2009 | |
| WO | 2010062647 A2 | 6/2010 | |
| WO | WO-2013032865 A1 | 3/2013 | |

OTHER PUBLICATIONS

Alt P.M., et al., "A Gray-Scale Addressing Technique for Thin-Film-Transistor/Liquid Crystal Displays," IBM J. Res. Develop., 36 (1), Jan. 1992, pp. 11-22.

Birch et al, "31.1: SXGA Resolution FLC Microdisplays," SID 02 Digest, 954-957 (2002).

B.J. Feenstra et. al. "A Reflective Display Based on Electrowetting: Principle and Properties", International Display Research Conference Proceedings 2003, p. 322.

Blackstone, "Making MEMS Reliable," SPIE's OEMagazine, 32-34 (Sep. 2002).

"BLU, "Heesung Precision Ltd., http://www.hspr.co.kr/eng/product/blu.asp Retrieved on Aug. 3, 2006.

den Boer., "Active Matrix Liquid Crystal Displays", Elsevier Science & Technology Books, ISBN #0750678135, Aug. 2005.

Boeuf, J.P., "Plasma display panels: physics,recent deveopments and key issues," J. Phys. D: Appl. Phys. 36 (2003) R53-R79 (received Aug. 29, 2002: published Feb. 26, 2003).

Boucinha M., et al., "Air-gap amorphous silicon thin film transistors", Applied Physics Letters, AIP, American Institute of Physics, Melville, NY, US, vol. 73, No. 4, Jul. 27, 1998, pp. 502-504, XP012021821, ISSN: 0003-6951, DOI: 10.1063/1.121914.

Bozler et al, "Arrays of gated field-emitter cones having 0.32 mm tip-to-tip spacing," J. Vec. Sci. Technol. B, 12 (2): 629-632 (Mar./Apr. 1994).

Bryan-Brown, "Ultra Low Power Bistable LCDs," SID 00, 76-79 (2000).

Chino E. et al., "25.1: Invited Paper: Development of Wide-Color-Gamut Mobile Displays with Four-primary-color LCDs," Society for Information Display, 37 (2), 2006, pp. 1221-1224.

Clark N. A., et al., "FLC Microdisplays", Ferroelectrics, 246, 2000, pp. 97-110.

Conde, J.P., et. al., "Amorphous and microcrystalline silicon deposited by hot-wire chemical vapor deposition at low substrate temperatures: application to devices and thin-film microelectromechanical systems," Thin Solid Films 395: 105-111 (2001).

Conde, J.P., et al., "Low-temperature Thin-film Silicon MEMS", in Thin Solid Films 427, p. 181 (2003).

Davis, "Light Emitting Diode Source Modeling for Optical Design," Reflexite Display Optics (Oct. 2004).

Davis, "Microstructured Optics for LED Applications," Reflexite Display Optics (2002).

Doane, et al, "Display Technologies in Russia, Ukraine, and Belarus," World Technology Evaluation Center Panel Report (Dec. 1994) http://www.wtec.org/loyola/displays/toc.htm, retrieved on Nov. 22, 2005.

Doherty D. et al., "Pulse Width Modulation Control of DLP Projectors", TI Technical Journal, Jul.-Sep. 1998, No. 3, pp. 115-121.

"Electronic Display Lighting Tutorials," 3M Corporation,file//D:/Optical/Vikuiti Tutorial.htm. retrieved on Aug. 10, 2006.

Feenstra J. et al., "Electrowetting Displays", Liquavista BV, http://www.liquavista.com/documents/electrowetting_displays_whitepaper.pdf, Retrieved on Aug. 17, 2006, pp. 1-16.

Feng, et al, "Novel Integrated Light-Guide Plates for Liquid Crystal Display Backlight," Journal of optics a Pure and applied optics, 2005, 7, 111-117.

Feng, "High Quality Light Guide Plates that Can Control the Illumination Angle Based on Microprism Structures," Applied Physics Letters, 85 (24): 6016-6018 (Dec. 2004).

Flat Panel Display (FPD) Manufacturing Equipment that Cuts Production Costs by Half, Shibaura Mechatronics Corporation, product brochure for panel processing.

Foley, "NE04-21: Microstructured Plastic Optics for Display, Lighting, and Telecommunications Applications," Fresnel Optics (2001).

Funamoto et al, "Diffusive-sheetless Backlight System for Mobile Phone," IDW/AD, 1277--1280 (2005).

Funamoto et. al. "LED Backlight System with Double-Prism Pattern", Journal of the Society for Information Display v. 14, pp. 1045-1051 (2006).

Goddhue et al, "Bright-field analysis of field-emission cones using high-resolution tranmission electron microscopy and the effect of structural properties on current stability," J. Vac. Sci. Technol. B, 12 (2): 693-696 (Mar. Apr. 1994).

Hartman, "4.1: Invited paper: Two-Terminal Devices Technologies for AMLCDs," SID 95 Digest, 7-10 (1995).

Hewlett et al, "DLP CinemaTM projection: A hybrid frame-rate technique for flicker-free performance," Journ of the SID 9/3, 221-226 (2001).

Hornbeck J. "Digital Light Processing TM: A New MEMS-Based Display Technology," Technical Digest of the IEEJ 14th Sensor Symposium, Jun. 4-5 1996, pp. 297-304.

J. Heikenfeld et. al., "Contrast Enhancement in Black Dielectric Electroluminescent Devices", IEEE Transactions on Electron Devices, 49: 8, 1348-52 (2002).

Jepsen et al, "4.11: 0.9" SXGA Liquid Crystal on Silicon Panel with 450 Hz. Field Rate," SID MicroDisplay Corporation, pp. 106-109 (Sep. 2001).

Joaquirn, M., "Polyphenyl Ether Lubricants" Synthetic Lubricants and High-performance Functional Fluids, R. L. Rudnick and R. L. Shubkin, Eds., p. 239, Marcel Dekker, Inc., NY, 1999.

Johnstone et al, "Theoretical limits on the freestanding length of cantilevers produced by surface micromachining technology," J. Micromech. Microeng. 12: 855-861 (Published Oct. 3, 2002).

Jones et al, "29-1: Addressing TVmin Ferroelectric Liquid Crystal Displays," (1998).

Judy, et al, "Self-Adjusting Microstructures(SAMS)," Proceedings of the Workshop on Micro Electro Mechanical Systems, New York, Jan. 30, 1991, vol. Workshop 4, pp. 51-56.

Judy, M. W., "Micromechanisms Using Sidewall Beams," Dissertation, University of California at Berkeley, 1994.

Kalantar et al, "Optical Micro Deflector Based Functional Light-Guide Plate for Backlight Unit," SID 00 Digest, 1029-1031 (2000).

Kalantar, K., et al., "Backlight Unit with Double Surface Light Emission Using a Single Micro-structured Light-guide Plate," p. 1182, Society for Information Display Digest (2004).

Kalantar, "Modulation of viewing angle on an LCD surface through backlight optics," Journal of the SID, 11 (4): 647-652 (2003).

Kim, C.W., et al., "Manufacturing Technologies for the Next Generation a-Si TFT-LCD," Proceedings of the Intl. Display Mfg. Cnf. Seoul, Korea (2000).

Koden et al., "Ferroelectric Liquid Crystal Display," (Sep. 17, 1997).

Kuang et al., "Dynamic characteristics of shaped micro-actuators solved using the differential quadrature method," Journal of Micromechanics and Microengineering, 14: 647-655, (2004).

Kunzman A. et al., "10.3 White Enhancement for Color Sequential DLP", Society for Information Display, Digest of Technical Papers, 1998.

Lee, et al., "40.1: Distingusihed Contributed Paper: Integrated Amorphous Silicon Color Sensor on LCD Panel for LED Backlight Feedback Control System", Society for Information Display, Digest of Technical Papers, 2005, pp. 1376-1379.

Lee et al, "P-25: A LCOS Microdisplay Driver with Frame Buffering Pixels," SID 02 Digest, 292-295 (2002).

Legtenberg, et al., "Electrostatic Curved Electrode Actuators," Journal of Microelectromechanical Systems, 6 (3): 257-265 (Sep. 1997).

Li, J., et al., "DRIE-Fabricated Curved-Electrode Zipping Actuators with Low Pull-In Voltage," 12th International Conference on Solid State Sensors, Actuators and Microsystems, IEE, 480-483 (2003).

Liang et al, "Observation of electric field gradients near field-emission cathode arrays," Appl Phys. Lett., 66 (9): 1147-1149 (Feb. 27, 1995).

Liu et al, "Scaling Laws of Microactuators and Potential Applications of Electroactive Polymers in MEMS," SPIE, 3669: 345-354 (Mar. 1999).

(56) References Cited

OTHER PUBLICATIONS

"Low Temperature Polysilicon TFT Reflective Color LCD" by Techno World.
Maboudian et al., "Stiction reduction processes for surface micromachines," Tribology Letters, 3: 215-221 (1997).
Markandey V. et al., "Video Processing for DLP Display Systems," Texas Instruments Corporation, Mar. 13, 1996, pp. 21-32.
Mastrangelo et al, "Mechanical Stability and Adhesion of Microstructures Under Capillary Forces—Part I: Basic Theory," Journal of Microelectromechanical Systems, 2 (1): 33-43 (Mar. 1993).
Mastrangelo et al, "Mechanical Stability and Adhesion of Microstructures Under Capillary Forces—Part II: Experiments," Journal of Microelectromechanical Systems, 2 (1): 44-55 (Mar. 1993).
McLaughlin, "Progress in Projection and Large-Area Displays," Proceedings of the IEEE, 90 (4): 521-532 (Apr. 2002).
"MicroLensTm—Re-Inventing LCD Backlighting," Global Lighting Technologies Inc., http://www.glthome.com/tech.htm, 1-2; retrieved on Aug. 3, 2006.
"Microprism Technology for Luminaires," eflexite Corporation, Technical Publication RLO-181, Rev. 2 (2003).
"Nano TM Su-8 2000 Negative Tone Photoresist Formulations 2002-2025," Micro Che, Rev. 2/02, Product Brochure for Thick Polymer.
Okumura et al, "Highly-efficient backlight for liquid crystal display having no optical films," Applied Physics Letters, 83 (13): 2515-2517 (Sep. 29, 2003).
"Optical Design Tools for Backlight Displays," Light Tools, Optical Engineering, Publication of ROCOES, 81: 90-101; Optical Research Associates (Jun. 2003).
Park, Y.I., et al., "Active Matrix OLED Displays Using Simple Poly-Si TFT Process," Society of Information Display, Digest, pp. 487-489 (2003).
Partial European Search Report—EP11178527—Search Authority—Munich—Jan. 17. 2012.
Partial European Search Report—EP11178533—Search Authority—Munich—Jan. 30, 2012.
Pasricha S. et al., "Dynamic Backlight Adaptation for Low Power Handheld Devices" IEEE Design and Test v. 21, 2004, pp. 398.
Perregaux, G., et al, "Arrays of Addressable High-Speed Optical Microshutters," CSEM Swiss Center for Electronics and Microtechnology Inc., Microsystems Division, pp. 232-235 (2001).
"Prism Brightness Enhancement Films," 3M Corporation, http://products3.3m.com/catalog/us/en001/electronics_mfg/vikuiti/node_V6G78RBQ5Tbe/root_GST1T4S9TCgv/ vroot_S6Q2FD9X0Jge/gvel_GD378DOHGJgl/theme_us_vikuiti_3_0/command_AbcPageHandler/ output_html Retrieved on Aug. 3, 2006.
"Prism Sheet," Mitsubishi Rayon America Inc., http://www.mrany.com/data/HTML/29.htm Retrieved on Aug. 4, 2006.
Qiu et al, "A Curved-Beam Bistable Mechanism," Journal of Microelectromechanical Systems, 13 (2): 137-145 (Apr. 2004).
Qiu et al, "A High-Current Electrothermal Bistable MEMS Relay," Micro Electro Mechanical Systems, MEMS-03 Kyoto, pp. 64-67 (Jan. 19-23, 2003).
Ravnkilde J., et al., "Fabrication of Nickel Microshutter Arrays for Spatial Light Modulation", Mesomechanics, 2002, pp. 161-165. Also on their web site: http://www2.mic.dtu.dk/research/mems/publications/Papers/Dicon_Meso2002.pdf.
Roosendaal et al, "25.2: A Wide Gamut, High Aperture Mobile Spectrum Sequential Liquid Crystal Display," SID 05 Digest, 1116-1119 (2005).
Saeedi, et. al. "Molten-Alloy Driven Self-Assembly for Nano and Micro Scale System Integration" Fluid Dynamics and Materials Processing, vol. 2, No. 4, pp. 221-245 (2006).
Sato, "Research on Flexible Display Systems," Broadcast Technology, 21: 10-15 (Winter, 2005).
Sharp Specification No. LCP-03015 for Mobile Liquid Crystal Display Group, Sharp Corporation, Jun. 13, 2003.
Shikida et al, "Fabrication of an S-shaped Microactuator," Journal of Microelectromechanical Systems, 6 (1): 18-24 (Mar. 1997).
Sony Corporation, "ACX705AKM, 6.92cm Diagonal Reflective Color LCD Module".
Steyn, Lodewyck, "Electroquasistatic Zipper Actuators: A Technology Review", Dec. 2004.
Tagaya et al., "Thin Liquid-Crystal Display Backlight System with Highly Scattering Optical Transmission Polymers," Applied Optics, 40 (34): 6274-6280 (Dec. 2001).
Takatori, et al., "6.3: Field-Sequential Smectic LCD with TFT Pixel Amplifier," SID 01, 2001, Digest, pp. 48-51.
Tan et al "Soldering Technology for Optoelectronics Packaging", 1996 Electronic Components and Technology Conference, pp. 26-36 (1996).
Teijido, J.M., "Conception and Design of Illumination Light Pipes," Thesis No. 1498 for University of Neuchatel, http://www.unige.ch/cyberdocuments/unine/theses2000/TeijidoJM/these_front.htm 1: 1-99 Retrieved on Aug. 3, 2006.
Tien et al, "MEMS Actuators for Silicon Micro-Optical Elements," Proc. of SPIE, 4178: 256-269, (2000).
"Two Proprietary Technologies Supporting OMRON Backlight," OMRON Electronics Corporation, OMRON Electronics Components Web, www.omron.co.jp/ecb/products/bklight/english/genri/index.html, retrieved on Aug. 3, 2006.
Underwood, "A review of microdisplay technologies," SID © EID, (Nov. 21 to 23, 2000).
Underwood, "LCoS through the looking glass," SID (2001).
van de Biggelaar, et. al. "Passive and Active Matrix Addressed Polymer Light-emitting Diode Displays", Proc. SPIE vol. 4295, p. 134 (2001).
Vangbo et al, "A lateral symmetrically bistable buckled beam," J. Micromech. Microeng., 8: 29-32 (1998).
Wang et al., "A highly efficient system for automatic face region detection in MPEG video." IEEE Trans. on Circuits and Systems for Video Technology, vol. 7 Issue 4, Aug. 1997, pp. 615-628.
Wang K., et al., "Highly Space-Efficient Electrostatic Zigzag Transmissive Micro-Optic Switches for an Integrated MEMS Optical Display System", Transducers 03 Conference, Jun. 8-12, 2003, vol. 1, pp. 575-575.
Written Opinion—PCT/US2007/013277, International Search Authority—European Patent Office—May 16, 2008.
Yamada et al, "52.2: Invited Paper: Color Sequential LCD Based on OCB with an LED Backlight," SID 00 Digest, 1180-1183 (2000).
Yasumura et al, "Fluid Damping of an Electrostatic Actuator for Optical Switching Applications," Transducers Research Foundation (2002).
AZ Displays, Inc., "Complete LCD Solutions," ATM3224C-NC-FTH, pp. 1-15 (Oct. 2, 2003).
Bergquist et al., "Field Sequential Colour Display with Adaptive Gamut", Society for Information Display, Digest of Technical Papers, 2006, pp. 1594-1597.
Boer W. D., "AMLCD Electronics", Active Matrix Liquid Crystal Displays: Fundamentals and Applications, 2005 pp. 87-111, XP055089329, U.S.A, ISBN: 978-0-75-067813-1.
Boer W. D., "Improvement of Image Quality in AMLCDs", Active Matrix Liquid Crystal Displays: Fundamentals and Applications, 2005, pp. 139-177, XP055089313, U.S.A, ISBN: 978-0-75-067813-1.
Microchem "Nano SU 8 2000", product brochure for thick polymer, Rev. Feb. 2002.
"Microprism Technology for Luminaires," Reflexite Display Optics (2004).
Uchida T. et al., "Encyclopedia of Flat Panel Displays", Japan, Kogyo Chosakai Publishing Co., Ltd./Yukio Shimura, Dec. 25, 2001, pp. 617-619.

* cited by examiner

CIRCUITS FOR CONTROLLING DISPLAY APPARATUS

CROSS-REFERENCE TO RELATED APPLICATIONS

This application is a continuation of U.S. patent application Ser. No. 11/978,829, filed Oct. 29, 2007, which is a continuation-in-part of U.S. patent application Ser. No. 11/326,962, filed Jan. 6, 2006, now U.S. Pat. No. 7,755,582, granted Aug. 24, 2006, and claims the benefit of U.S. Provisional Application Nos. 60/676,053 and 60/655,827, filed Apr. 29, 2005 and Feb. 23, 2005, respectively. The contents of each of these applications are incorporated by reference herein in their entirety.

FIELD OF THE INVENTION

In general, the invention relates to the field of imaging displays, in particular, the invention relates to circuits for controlling light modulators incorporated into imaging displays.

BACKGROUND OF THE INVENTION

Displays built from mechanical light modulators are an attractive alternative to displays based on liquid crystal technology. Mechanical light modulators are fast enough to display video content with good viewing angles and with a wide range of color and grey scale. Mechanical light modulators have been successful in projection display applications. Direct-view displays using mechanical light modulators have not yet demonstrated sufficiently attractive combinations of brightness and low power. There is a need in the art for fast, bright, low-powered mechanically actuated direct-view displays. Specifically there is a need for direct-view displays that can be driven at high speeds and at low voltages for improved image quality and reduced power consumption.

SUMMARY OF THE INVENTION

According to one aspect, the invention relates to a direct-view display apparatus that includes voltage regulators that substantially limits variation in a voltage applied across the actuators in the display that would otherwise be caused by movement of portions of the actuators. In one embodiment, voltage variation is considered substantially limited if, during actuation of an actuator, the voltage across the actuator varies less than 20% from the voltage needed to initiate actuation of the actuator. In other embodiments, voltage variation is considered substantially limited if, during actuation of an actuator, the voltage across the actuator varies less than 10% from the voltage needed to initiate actuation of the actuator. In still another other embodiments, voltage variation is considered substantially limited if, during actuation of an actuator, the voltage across the actuator varies less than 5% from the voltage needed to initiate actuation of the actuator.

The direct-view display apparatus includes an array of pixels formed on a transparent substrate. Each pixel includes a MEMS-based light modulator. Suitable MEMS-based light modulators include shutter-based light modulators, light-tap based light modulators, and electrowetting-based light modulators. The MEMS-based light modulators include at least one electrostatic actuator for changing the state of the light modulator.

The direct-view display apparatus also includes a control matrix. The control matrix is connected to the substrate and includes, for each pixel, a write-enabling interconnect, a data voltage interconnect, and a data switch. The write-enable interconnect of a pixel enables the pixel to respond to a data voltage applied via the data voltage interconnect. The data switch of a pixel electrically connects to a corresponding data voltage interconnect. Voltages applied to the pixel's data voltage interconnect thereby control the state of the pixel's light modulator.

n one embodiment, for each pixel, the control matrix also includes a voltage inverter circuit. The voltage inverter circuit, in various implementations, is a p-mos inverter circuit, an n-mos inverter circuit, and a CMOS inverter circuit. The voltage inverter circuit, in some instances is a level shifting inverter. In other instances, the voltage inverter circuit is a transition sharpening inverter or a switching inverter. In another embodiment, the control matrix includes a cross-coupled inverter for each pixel. The cross-coupled inverter, in one embodiment electrically couples the first and second actuators to one another. In another embodiment, the cross-coupled inverter comprises a level shifting inverter.

In various embodiments, each pixel includes a flip flop circuit. In one embodiment, the flip flop electrically connects the first and second actuators of the pixel to one another. In another embodiment, the flip flop stores light modulator control instructions. Light modulator instructions, in some embodiments may also be stored by a cross-coupled inverter included in the control matrix for each pixel.

In one embodiment in which the light modulators are shutter-based, the first and second actuators force the shutters of the light modulators relative to an aperture. The aperture may be formed in a layer of material on the substrate. In an alternative embodiment, the layer of material in which the apertures are formed is a transparent substrate other than the substrate on which the light modulators are formed.

In another embodiment, the control matrix includes a global actuation interconnect that is electrically connected to pixels in at least two rows and at least two columns of the array of pixels. The global actuation interconnect causes substantially simultaneous actuation of the pixels to which it is connected. In one embodiment, the global actuation interconnect is electrically connected to, and thereby controls, a discharge transistor included in each pixel of the array.

In still another embodiment, the control matrix includes a first voltage actuation interconnect. The first voltage actuation interconnect is distinct from the data voltage interconnect and is electrically connected to the first actuator. The first actuation voltage interconnect provides a voltage sufficient to actuate the first actuator. In another embodiment, the control matrix includes another switch, other than the data switch for regulating the application of the voltage provided via the first actuation voltage interconnect, for each pixel in the array. The data switch, in certain embodiments, is a transistor that selectively controls the discharge of the voltage provided by the first actuation voltage interconnect. Each pixel may also have be electrically connected to a common voltage interconnect in the control matrix that provides a bias voltage to the pixels to which it is connected.

In a further embodiment, the control matrix includes a second actuation voltage interconnect. The second actuation voltage interconnect is distinct from both the data voltage interconnect and the first actuation voltage interconnect. The second actuation voltage interconnect provides a voltage sufficient to actuate the second actuators of the pixels to which it is connected. In one embodiment, the application of the voltage provided by the second actuation voltage interconnect to the second actuator of a pixel is controlled by the pixel's data switch. In another embodiment, the second actuation voltage interconnect directly connects a display drive to the second actuators of pixels in the array. In some embodiments, the voltage provided by the second actuation voltage interconnect is insufficient to actuate the second actuator if a voltage greater than a maintenance voltage is applied to the first actuator.

In another embodiment, the control matrix include an actuation voltage interconnect that is directly electrically connected to one of the actuators of pixels in multiple rows and in multiple columns of the array of pixels. The actuation voltage interconnect provides a voltage sufficient to actuate the actuators to which it is connecting barring an opposing voltage being applied to the actuators that oppose the actuators to which the shared actuation voltage interconnect connects.

In one embodiment, the voltage regulators are display drivers that include DC voltage sources. The display drivers are connected to light modulators in the array by actuation voltage interconnects that are distinct from the data voltage interconnects. In some embodiments, the actuation voltage interconnect electrically connects directly to pixel actuators. In other embodiments, the actuation voltage interconnect electrically connects to pixel actuators through a switch, other than the data switch, included in the control matrix for each pixel. In one embodiment, the actuation voltage interconnect provides a substantially constant voltage throughout operation of the display. In other embodiments, the voltage on the actuation voltage interconnect varies during operation as a result of variation in display driver output.

In another embodiment, each pixel includes its own voltage regulator. In one particular embodiment, the voltage regulator is a capacitor in electrical communication with the electrostatic actuator.

In a second aspect, the invention relates to a direct-view display apparatus that includes an array of MEMS-based light modulators formed on a transparent substrate. The display apparatus includes a control matrix formed on the substrate. The control matrix includes a CMOS circuit for each pixel in the display.

In a third aspect, the invention relates to a direct-view display apparatus that includes a bank-wise addressing feature. The display apparatus includes a transparent substrate, upon which an array of light modulators are formed. Suitable light modulators include, without limitation, shutter-based light modulators, electrowetting-based light modulators, and light-tap based light modulators. The array is organized into rows and columns. The rows are divided into at least two sets of rows. Each row in a set of rows is associated with a corresponding row in another set of rows. The associated rows are collectively referred to as a "group of associated rows." For each pixel in the array, the light modulators include an actuator for controlling the state of the light modulator.

The display apparatus also includes a control matrix connected to the substrate and the light modulators. For each group of associated rows in the array, the control matrix includes an electrical connection shared among the pixels of the group of associated rows that enables the group of associated rows to be actuated to an addressed state at substantially the same time. These electrical connections allow each group of associated rows to be actuated at a different times. In one embodiment, the control matrix includes, for each column in the array, a single write enable switch and a single data store capacitor per set of rows. In another embodiment, the display apparatus includes, for each group of associated rows, a second distinct electrical connection shared among the pixels of the associated rows. This second electrical connection provides an actuation voltage to the light modulators in the pixels to reset the pixels to an initial state. In still another embodiment, the display apparatus includes a charge interconnect that connects to pixels in multiple rows and in multiple columns. This charge interconnect provides an actuation voltage to the actuators in the pixels to drive the light modulators into the addressed state.

BRIEF DESCRIPTION OF THE DRAWINGS

The foregoing discussion will be understood more readily from the following detailed description of the invention with reference to the following drawings.

DESCRIPTION OF CERTAIN ILLUSTRATIVE EMBODIMENTS

To provide an overall understanding of the invention, certain illustrative embodiments will now be described, including apparatus and methods for displaying images. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

Figure 1A:
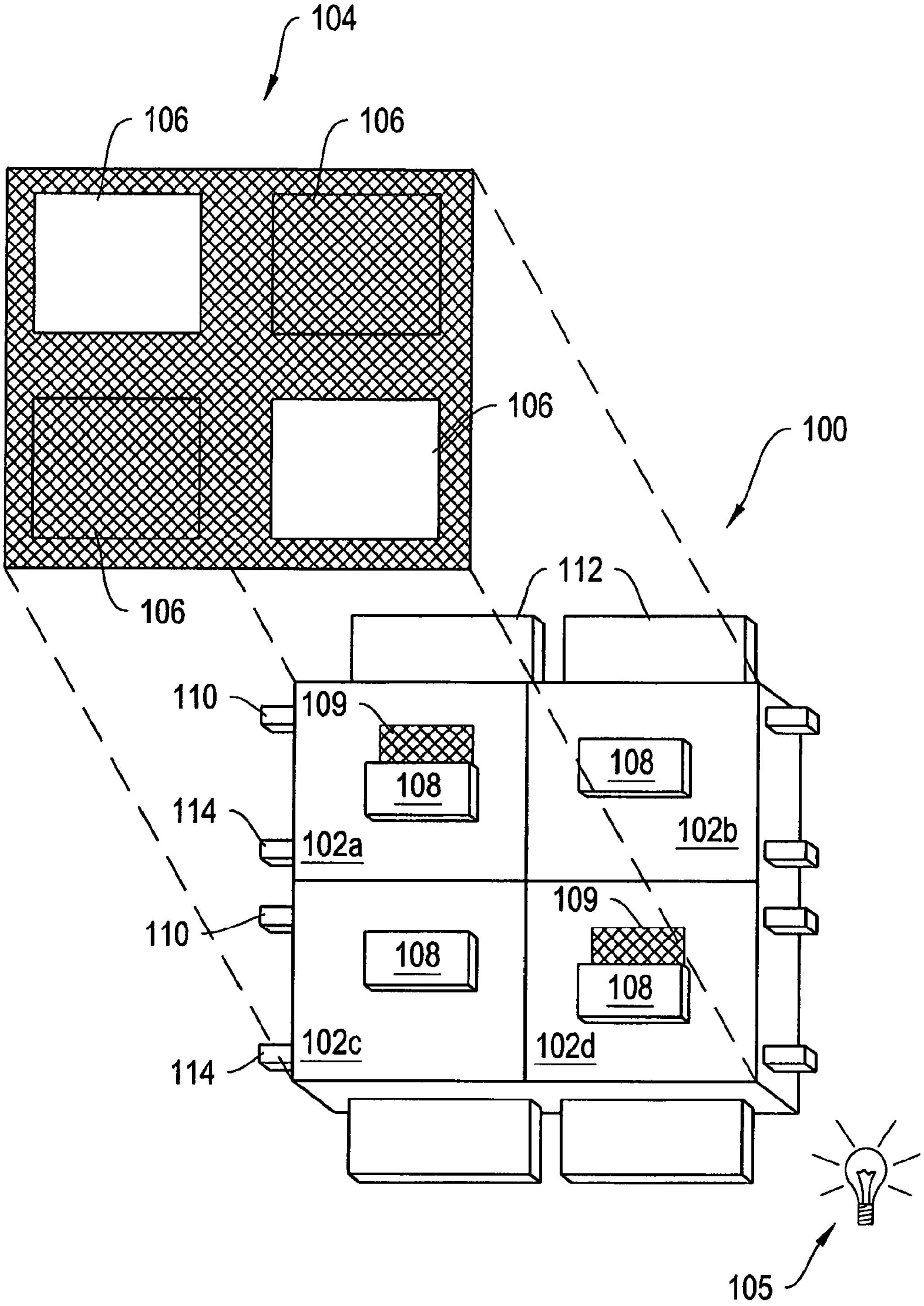
FIG. 1A is an isometric view of display apparatus, according to an illustrative embodiment of the invention.

FIG. 1A is an isometric view of a display apparatus 100, according to an illustrative embodiment of the invention. The display apparatus 100 includes a plurality of light modulators, in particular, a plurality of shutter assemblies 102*a*-102*d* (generally “shutter assemblies 102”) arranged in rows and columns. In the display apparatus 100, shutter assemblies 102*a* and 102*d* are in the open state, allowing light to pass. Shutter assemblies 102*b* and 102*c* are in the closed state, obstructing the passage of light. By selectively setting the states of the shutter assemblies 102*a*-102*d*, the display apparatus 100 can be utilized to form an image 104 for a projection or backlit display, if illuminated by lamp 105. In another implementation the apparatus 100 may form an image by reflection of ambient light originating from the front of the apparatus. Preferably, the display apparatus 100 is a direct-view display in which light modulated by the shutter assemblies 102 is introduced through a backlight and is directed to a viewer without projection onto an intervening screen.

In the display apparatus 100, each shutter assembly 102 corresponds to a pixel 106 in the image 104. In other implementations, the display apparatus 100 may utilize a plurality of shutter assemblies to form a pixel 106 in the image 104. For example, the display apparatus 100 may include three color-specific shutter assemblies 102. By selectively opening one or more of the color-specific shutter assemblies 102 corresponding to a particular pixel 106, the display apparatus 100 can generate a color pixel 106 in the image 104. In another example, the display apparatus 100 includes two or more shutter assemblies 102 per pixel 106 to provide grayscale in an image 104. With respect to an image, a “pixel” corresponds to the smallest picture element defined by the resolution of image. With respect to structural components of the display apparatus 100, the term “pixel” refers to the combined mechanical and electrical components utilized to modulate the light that forms a single pixel of the image.

Each shutter assembly 102 includes a shutter 108 and an aperture 109. To illuminate a pixel 106 in the image 104, the shutter 108 is positioned such that it allows light to pass through the aperture 109 towards a viewer. To keep a pixel 106 unlit, the shutter 108 is positioned such that it obstructs the passage of light through the aperture 109. The aperture 109 is defined by an opening patterned through a reflective or light-absorbing material in each shutter assembly 102.

The display apparatus also includes a control matrix connected to the substrate and to the shutter assemblies for controlling the movement of the shutters. The control matrix includes a series of electrical interconnects (e.g., interconnects 110, 112, and 114), including at least one write-enable interconnect 110 (also referred to as a “scan-line interconnect”) per row of pixels, one data interconnect 112 for each column of pixels, and one common interconnect 114 providing a common voltage to all pixels, or at least pixels from both multiple columns and multiples rows in the display apparatus 100. In response to the application of an appropriate voltage (the "write-enabling voltage, $V_{we}$"), the write-enable interconnect 110 for a given row of pixels prepares the pixels in the row to accept new shutter movement instructions. The data interconnects 112 communicate the new movement instructions in the form of data voltage pulses. The data voltage pulses applied to the data interconnects 112, in some implementations, directly contribute to an electrostatic movement of the shutters. In other implementations, the data voltage pulses control switches (also referred to as "data switches"), e.g., transistors or other non-linear circuit elements that control the application of separate actuation voltages, which are typically higher in magnitude than the data voltages, to the shutter assemblies 102. The application of these actuation voltages then results in the electrostatic movement of the shutters 108.

Figure 1B:
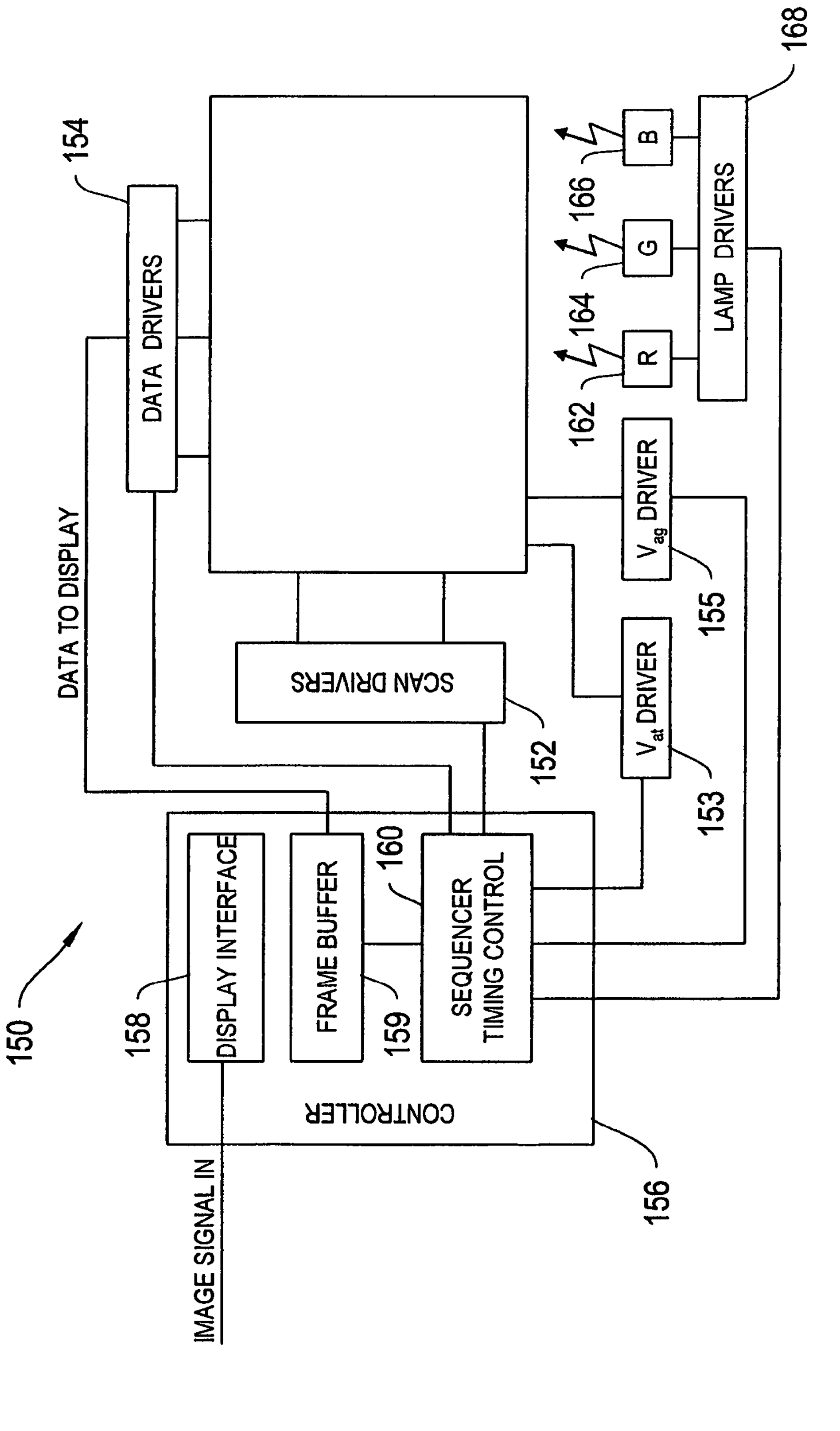
FIG. 1B is a block diagram of the a display apparatus, according to an illustrative embodiment of the invention.

FIG. 1B is a block diagram 150 of the display apparatus 100. In addition to the elements of the display apparatus 100 described above, as depicted in the block diagram 150, the display apparatus 100 includes a plurality of scan drivers 152 (also referred to as "write enabling voltage sources") and a plurality of data drivers 154 (also referred to as "data voltage sources"). The scan drivers 152 apply write enabling voltages to scan-line interconnects 110. The data drivers 154 apply data voltages to the data interconnects 112. In some embodiments of the display apparatus, the data drivers 154 are configured to provide analog data voltages to the shutter assemblies, especially where the gray scale of the image 104 is to be derived in analog fashion. In analog operation the shutter assemblies 102 are designed such that when a range of intermediate voltages is applied through the data interconnects 112 there results a range of intermediate open states in the shutters 108 and therefore a range of intermediate illumination states or gray scales in the image 104.

In other cases the data drivers 154 are configured to apply only a reduced set of 2, 3, or 4 digital voltage levels to the control matrix. These voltage levels are designed to set, in digital fashion, either an open state or a closed state to each of the shutters 108.

The scan drivers 152 and the data drivers 154 are connected to digital controller circuit 156 (also referred to as the "controller 156"). The controller includes a display interface 158 which processes incoming image signals into a digital image format appropriate to the spatial addressing and the gray scale capabilities of the display. The pixel location and gray scale data of each image is stored in a frame buffer 159 so that the data can be fed out as needed to the data drivers 154. The data is sent to the data drivers 154 in mostly serial fashion, organized in predetermined sequences grouped by rows and by image frames. The data drivers 154 can include series to parallel data converters, level shifting, and for some applications digital to analog voltage converters.

All of the drivers (e.g., scan drivers 152, data drivers 154, actuation driver 153 and global actuation driver 155) for different display functions are time-synchronized by a timing-control 160 in the controller 156. Timing commands coordinate the illumination of red, green and blue lamps 162, 164, and 166 via lamp drivers 168, the write-enabling and sequencing of specific rows of the array of pixels, the output of voltages from the data drivers 154, and for the output of voltages that provide for shutter actuation.

The controller 156 determines the sequencing or addressing scheme by which each of the shutters 108 in the array can be re-set to the illumination levels appropriate to a new image 104. New images can 104 be set at periodic intervals. For instance, for video displays, the color images 104 or frames of the video are refreshed at frequencies ranging from 10 to 300 Hertz. In some embodiments the setting of an image frame is synchronized with the illumination of a backlight such that alternate image frames are illuminated with an alternating series of colors, such as red, green, and blue. The image frames for each respective color is referred to as a color sub-frame. In this method, referred to as the field sequential color method, if the color sub-frames are alternated at frequencies in excess of 20 Hz, the human brain will average the alternating frame images into the perception of an image having a broad and continuous range of colors.

If the display apparatus 100 is designed for the digital switching of shutters 108 between open and closed states, the controller 156 can control the addressing sequence and/or the time intervals between image frames to produce images 104 with appropriate gray scale. The process of generating varying levels of grayscale by controlling the amount of time a shutter 108 is open in a particular frame is referred to as time division gray scale. In one embodiment of time division gray scale, the controller 156 determines the time period or the fraction of time within each frame that a shutter 108 is allowed to remain in the open state, according to the illumination level or gray scale desired of that pixel. In another embodiment of time division gray scale, the frame time is split into, for instance, 15 equal time-duration sub-frames according to the illumination levels appropriate to a 4-bit binary gray scale. The controller 156 then sets a distinct image into each of the 15 sub-frames. The brighter pixels of the image are left in the open state for most or all of the 15 sub-frames, and the darker pixels are set in the open state for only a fraction of the sub-frames. In another embodiment of time-division gray scale, the controller circuit 156 alters the duration of a series of sub-frames in proportion to the bit-level significance of a coded gray scale word representing an illumination value. That is, the time durations of the sub-frames can be varied according to the binary series 1, 2, 4, 8 . . . . The shutters 108 for each pixel are then set to either the open or closed state in a particular sub-frame according to the bit value at a corresponding position within the binary word for its intended gray level.

A number of hybrid techniques are available for forming gray scale which combine the time division techniques described above with the use of either multiple shutters 108 per pixel or via the independent control of backlight intensity. These techniques are described further below.

Addressing the control matrix, i.e., supplying control information to the array of pixels, is, in one implementation, accomplished by a sequential addressing of individual lines, sometimes referred to as the scan lines or rows of the matrix. By applying $V_{we}$ to the write-enable interconnect 110 for a given scan line and selectively applying data voltage pulses $V_d$ to the data interconnects 112 for each column, the control matrix can control the movement of each shutter 108 in the write-enabled row. By repeating these steps for each row of pixels in the display apparatus 100, the control matrix can complete the set of movement instructions to each pixel in the display apparatus 100.

In one alternative implementation, the control matrix applies $V_{we}$ to the write-enable interconnects 110 of multiple rows of pixels simultaneously, for example, to take advantage of similarities between movement instructions for pixels in different rows of pixels, thereby decreasing the amount of time needed to provide movement instructions to all pixels in the display apparatus 100. In another alternative implementation, the rows are addressed in a non-sequential, e.g., in a pseudo-randomized order, in order to minimize visual artifacts that are sometimes produced, especially in conjunction with the use of a coded time division gray scale.

In alternative embodiments, the array of pixels and the control matrices that control the pixels incorporated into the array may be arranged in configurations other than rectangular rows and columns. For example, the pixels can be arranged in hexagonal arrays or curvilinear rows and columns. In general, as used herein, the term scan-line shall refer to any plurality of pixels that share a write-enabling interconnect.

Shutter Assemblies

Figure 2:
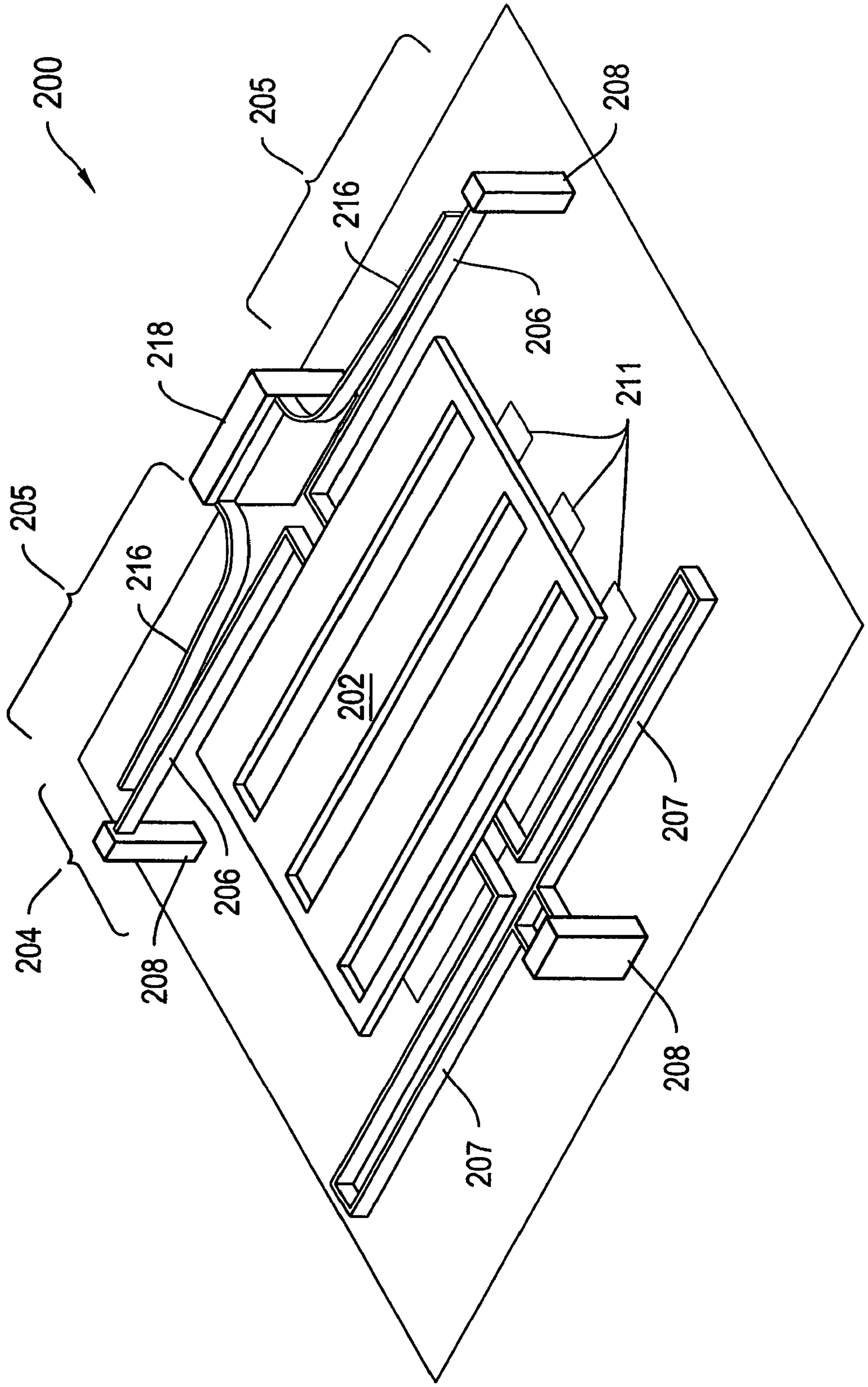
FIG. 2 is an isometric view of a shutter assembly suitable for inclusion in the display apparatus of FIG. 1, according to an illustrative embodiment of the invention.

FIG. 2 is diagram of an illustrative shutter assembly 200 suitable for incorporation into the display apparatus 100 of FIG. 1. The shutter assembly 200 includes a shutter 202 coupled to an actuator 204. The actuator 204 is formed from two separate compliant electrode beam actuators 205, as described in U.S. patent application Ser. No. 11/251,035, filed on Oct. 14, 2005. The shutter 202 couples on one side to the actuators 205. The actuators 205 move the shutter transversely over a surface in a plane of motion which is substantially parallel to the surface. The opposite side of the shutter couples to a spring 207 which provides a restoring force opposing the forces exerted by the actuator 204.

Each actuator 205 includes a compliant load beam 206 connecting the shutter 202 to a load anchor 208. The load anchors 208 along with the compliant load beams 206 serve as mechanical supports, keeping the shutter 202 suspended proximate to the surface. The surface includes one or more apertures 211 for admitting the passage of light. The load anchors 208 physically connect the compliant load beams 206 and the shutter 202 to the surface and electrically connect the load beams 206 to a bias voltage, in some instances, ground.

Each actuator 204 also includes a compliant drive beam 216 positioned adjacent to each load beam 206. The drive beams 216 couple at one end to a drive beam anchor 218 shared between the drive beams 216. The other end of each drive beam 216 is free to move. Each drive beam 216 is curved such that it is closest to the load beam 206 near the free end of the drive beam 216 and the anchored end of the load beam 206.

In operation, a display apparatus incorporating the shutter assembly 200 applies an electric potential to the drive beams 216 via the drive beam anchor 218. A second electric potential may be applied to the load beams 206. The resulting potential difference between the drive beams 216 and the load beams 206 pulls the free ends of the drive beams 216 towards the anchored ends of the load beams 206, and pulls the shutter ends of the load beams 206 toward the anchored ends of the drive beams 216, thereby driving the shutter 202 transversely towards the drive anchor 218. The compliant members 206 act as springs, such that when the voltage across the beams 206 and 216 potential is removed, the load beams 206 push the shutter 202 back into its initial position, releasing the stress stored in the load beams 206.

A shutter assembly, such as shutter assembly 200, that incorporates a passive restoring force mechanism is generally referred to herein as an elastic shutter assembly. A number of elastic restoring mechanisms can be built into or in conjunction with electrostatic actuators, the compliant beams illustrated in shutter assembly 200 providing just one example. Elastic shutter assemblies can be constructed such that in an unactivated, or relaxed state, the shutters are either opened or closed. For illustrative purposes, it is assumed below that the elastic shutter assemblies described herein are constructed to be closed in their relaxed state.

As described in U.S. patent application Ser. No. 11/251,035, referred to above, depending on the curvature of the drive beams 216 and load beams 206, the shutter assembly may either be controlled in a analog or digital fashion. When the beams have a strongly non-linear or divergent curvature (beams diverging with more than a second order curvature) the application of an analog actuation voltage across drive beams 216 and the load beams 206 results in a predetermined incremental displacement of the shutter 202. Thus, the magnitude of shutter 202 displacement can be varied by applying different magnitude voltages across the drive beams 216 and the load beams 206. Shutter assemblies 200 including more curved beams are therefore used to implement analog gray scale processes.

For shutter assemblies with less curved beams (beams diverging with second order curvature or less), the application of a voltage across the drive beams 216 and the load beams 206 results in shutter displacement if the voltage is greater than a threshold voltage ($V_{at}$). Application of a voltage equaling or exceeding $V_{at}$ results in the maximum shutter displacement. That is, if the shutter 202 is closed absent the application of a voltage equaling or exceeding the threshold, application of any voltage equaling or exceeding $V_{at}$ fully opens the shutter. Such shutter assemblies are utilized for implementing time division and/or digital area division gray scale processes in various embodiments of the display apparatus 100.

Figure 3B:
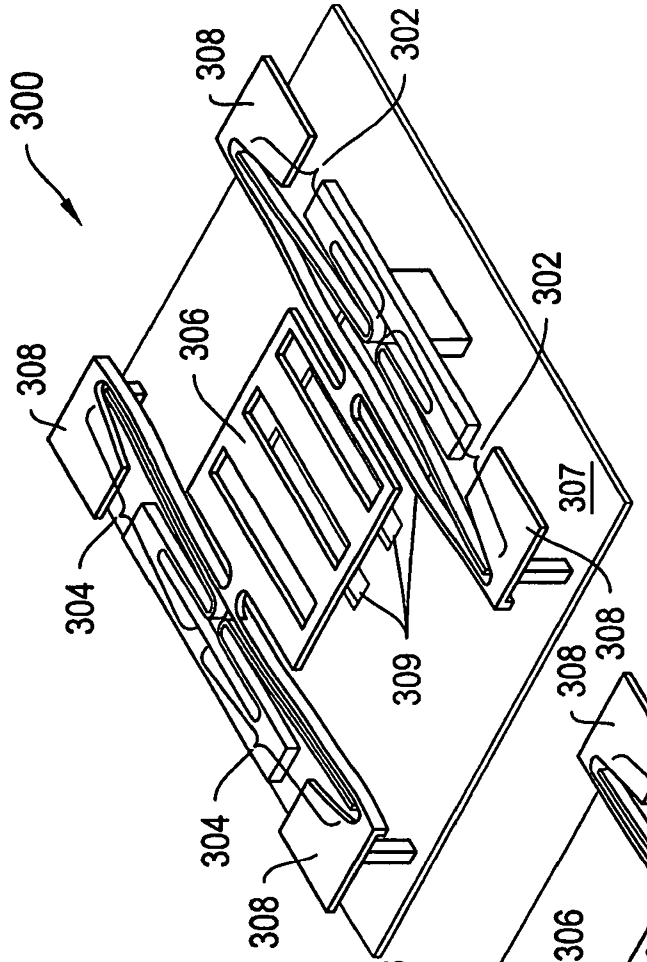
FIGS. 3A and 3B are isometric views of a dual-actuated shutter assembly suitable for inclusion in the display apparatus of FIG. 1, according to an illustrative embodiment of the invention.
Figure 3A:
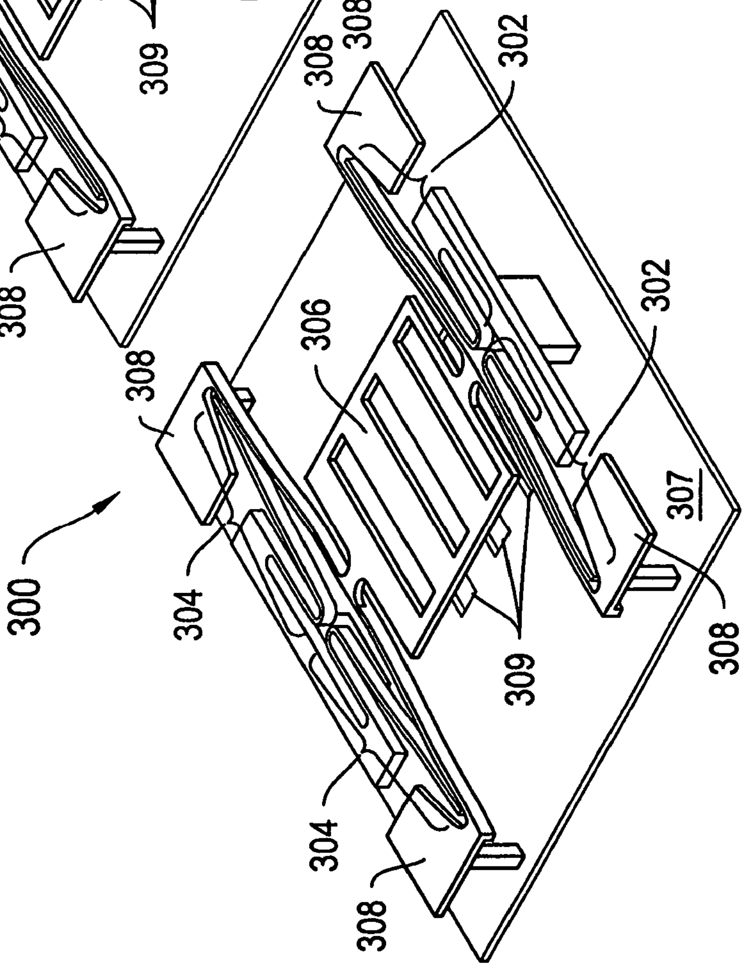

FIGS. 3A and 3B are isometric views of a second shutter assembly 300 suitable for use in the display apparatus 100. FIG. 3A is a view of the second shutter assembly 300 in an open state. FIG. 3B is a view of the second shutter assembly 300 in a closed state. Shutter assembly 300 is described in further detail in U.S. patent application Ser. No. 11/251,035, referenced above. In contrast to the shutter assembly 200, shutter assembly 300 includes actuators 302 and 304 on either side of a shutter 306. Each actuator 302 and 304 is independently controlled. A first actuator, a shutter-open actuator 302, serves to open the shutter 306. A second actuator, the shutter-close actuator 304, serves to close the shutter 306. Both actuators 302 and 304 are preferably compliant beam electrode actuators. The actuators 302 and 304 open and close the shutter 306 by driving the shutter 306 substantially in a plane parallel to a surface 307 over which the shutter is suspended. The shutter 306 is suspended over the surface at via anchors 308 attached to the actuators 302 and 304. The inclusion of supports attached to both ends of the shutter 306 along its axis of movement reduces out of plane motion of the shutter 306 and confines the motion substantially to the desired plane of motion. The surface 307 includes at least one aperture 309 for admitting the passage of light through the surface 307.

Figure 4A:
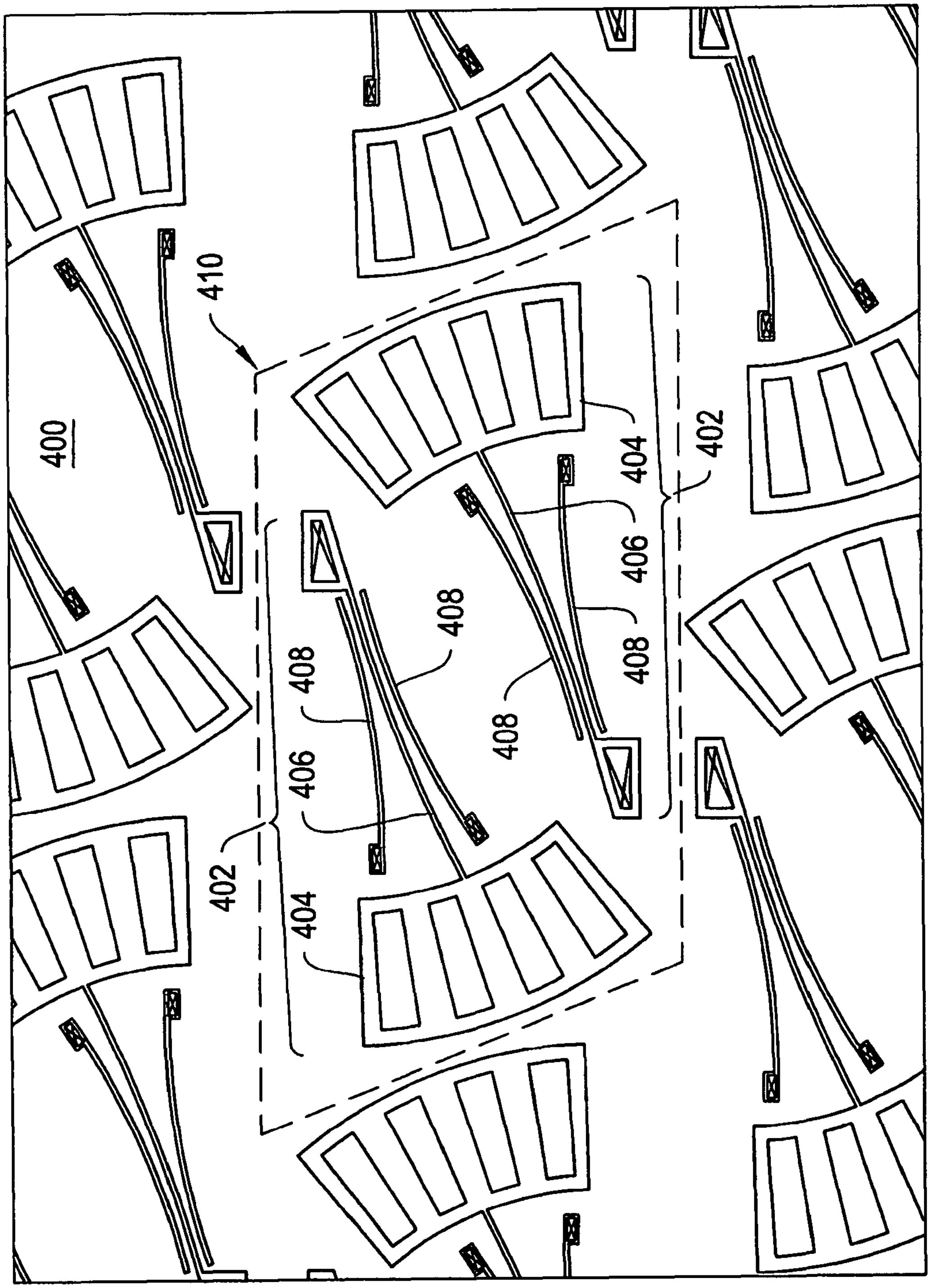
FIG. 4A is a top view of an array of shutter assemblies suitable for inclusion in the display apparatus of FIG. 1, according to an illustrative embodiment of the invention.

FIG. 4A is a top view of an array 400 of shutter assemblies 402 suitable for inclusion in the display apparatus 100. Each shutter assembly 402 includes a shutter 404, a load beam 406, and two drive beams 408. As with the shutter assemblies 200 and 300 described above, the shutter assemblies 402 modulate light by transversely driving their corresponding shutters 404 such that the shutters 404 selectively interfere with light passing through apertures in a surface over which the shutters 404 are driven.

To drive one of the shutters in one of the shutter assemblies, a voltage is applied across the load beam 406 and one of the drive beams 408. To generate the voltage, a first electric potential is applied to the selected drive beam and a second electric potential is applied to the load beam 406 and to the shutter 404. The first and second electric potentials may be of the same polarity or they may be of opposite polarities. They also may have the same magnitude or they may have different magnitudes. Either potential may also be set to ground. In order for the shutter assembly to actuate (i.e., for the shutter to change its position) the difference between the first and second potentials must equal or exceed an actuation threshold voltage $V_{at}$.

In most embodiments, $V_{at}$ is reached by applying voltages of substantially different magnitudes to the selected drive beam and the load beam. For example, assuming $V_{at}$ is 40V, the display apparatus 100 may apply 30V to the drive beam and −10V to the load beam, resulting in a potential difference of 40V. For purposes of controlling power dissipation, however, it is also important to consider and control the absolute voltage applied to each electrode with respect to the ground or package potential of the display. The power required to apply electric potentials to an array of actuators is proportional to the capacitance seen by the voltage source ($P=\frac{1}{2}fCV^2$), where f is the frequency of the drive signal, V is the voltage of the source and C is the total capacitance seen by the source. The total capacitance has several additive components, including the capacitance that exists between the load beam and drive beam, the source-drain capacitance of transistors along an interconnect line between the voltage source and the actuator (particularly for those transistors whose gates are closed), the capacitance between the interconnect line and its surroundings, including neighboring shutter assemblies and/or crossover lines, and the capacitance between the load or drive beams and their surroundings, including neighboring shutter assemblies or the display package. Since the load beam 406 is electrically coupled to the shutter 404, the capacitance of the load beam 406 includes the capacitance of the shutter 404. Since the shutter comprises typically a large fraction of area of the pixel, the capacitance between the load beam and its surroundings can represent a significant fraction of the total capacitance seen by the voltage source. Furthermore, because of the difference in area of the combined load beam 406 and shutter 404 and the area of the drive beam 408 is significant, the capacitance between the load beam and its surroundings is typically much larger than that between the drive beam and its surroundings. As a result, the $CV^2$ power loss experienced by voltage sources connected to either the drive or the load beams will be significantly different even if the range of their voltage excursions were to be the same. For this reason, it is generally advantageous to connect the higher capacitance end of the actuator, i.e., the load beam, to a voltage source that either does not change in voltage significantly with respect to ground or package potential, or to a voltage source that does not change voltage with the highest frequencies required by the drive system. For example, if a 40 volt difference is required between the load beam 406 and the drive beam 408 to actuate the actuator, it will be advantageous if the voltage difference between the drive beam and the ground or case potential represents at least half if not most of the 40 volts.

The dashed line overlaid on the shutter assembly array 400 depicts the bounds of a single pixel 410. The pixel 410 includes two shutter assemblies 402, each of which may be independently controlled. By having two shutter assemblies 402 per pixel 410, a display apparatus incorporating the shutter assembly array 400 can provide three levels of gray scale per pixel using area division gray scale. More particularly, the pixel could be driven into the following states: both shutter assemblies closed; one shutter assembly opened and one shutter assembly closed; or both shutter assemblies open. Thus, the resulting image pixel can be off, at half brightness, or at full brightness. By having each shutter assembly 402 in the pixel 410 have different sized apertures, a display apparatus could provide yet another level of gray scale using only area division gray scale. The shutter assemblies 200, 300 and 402 of FIGS. 2, 3 and 4A can be made bi-stable. That is, the shutters can exist in at least two equilibrium positions (e.g. open or closed) with little or no power required to hold them in either position. More particularly, the shutter assembly 300 can be mechanically bi-stable. Once the shutter of the shutter assembly 300 is set in position, no electrical energy or holding voltage is required to maintain that position. The mechanical stresses on the physical elements of the shutter assembly 300 can hold the shutter in place.

The shutter assemblies 200, 300, and 402 can also be made electrically bi-stable. In an electrically bi-stable shutter assembly, there exists a range of voltages below the actuation voltage of the shutter assembly, which if applied to a closed actuator (with the shutter being either open or closed), hold the actuator closed and the shutter in position, even if an opposing force is exerted on the shutter. The opposing force may be exerted by a spring attached to an opposite end of the shutter, such as spring 207 in shutter assembly 200, or the opposing force may be exerted by an opposing actuator. The minimum voltage needed to maintain a shutter's position against such an opposing force is referred to as a maintenance voltage $V_m$.

Electrical bi-stability arises from the fact that the electrostatic force across an actuator is a strong function of position as well as voltage. The beams of the actuators in the shutter assemblies 200, 300, and 402 act as capacitor plates. The force between capacitor plates is proportional to $1/d^2$ where d is the local separation distance between capacitor plates. In a closed actuator, the local separation between actuator beams is very small. Thus, the application of a small voltage can result in a relatively strong force between the actuator beams. As a result, a relatively small voltage, such as $V_m$, can keep the actuator closed, even if other elements exert an opposing force on the actuator.

In shutter assemblies, such as 300, that provide for two separately controllable actuators (for the purpose of opening and closing the shutter respectively), the equilibrium position of the shutter will be determined by the combined effect of the voltage differences across each of the actuators. In other words, the electrical potentials of all three terminals (the shutter open drive beam, the shutter close drive beam, and the shutter/load beams), as well as shutter position, must be considered to determine the equilibrium forces on the shutter.

For an electrically bi-stable system, a set of logic rules can describe the stable states, and can be used to develop reliable addressing or digital control schemes for the shutter. These logic rules are as follows:

Let $V_s$ be the electrical potential on the shutter or load beam. Let $V_o$ be the electrical potential on the shutter-open drive beam. Let $V_c$ be the electrical potential on the shutter-close drive beam. Let the expression $/V_o-V_s/$ refer to the absolute value of the voltage difference between the shutter and the shutter-open drive beam. Let $V_a$, be the maintenance voltage. Let $V_{at}$ be the actuation threshold voltage, i.e., the voltage necessary to actuate an actuator absent the application of $V_m$ to an opposing drive beam. Let $V_{max}$ be the maximum allowable potential for $V_o$ and $V_c$. Let $V_m<V_{at}<V_{max}$. Then, assuming $V_o$ and $V_c$ remain below $V_{max}$:

1. If $/V_o-V_s/<V_m$ and $/V_c-V_s/<V_m$

Then the shutter will relax to the equilibrium position of its mechanical spring.

2. If $/V_o-V_s/>V_m$ and $/V_c-V_s/>V_m$

Then the shutter will not move, i.e. it will hold in either the open or the closed state, whichever position was established by the last actuation event.

3. If $/V_o-V_s/>V_{at}$ and $/V_c-V_s/<V_m$

Then the shutter will move into the open position.

4. If $/V_o-V_s/<V_m$ and $/V_c-V_s/>V_{at}$

Then the shutter will move into the closed position.

Following rule 1, with voltage differences on each actuator near to zero, the shutter will relax. In many shutter assemblies the mechanically relaxed position is only partially open or closed, and so this voltage condition is preferably avoided in an addressing scheme.

The condition of rule 2 makes it possible to include a global actuation function into an addressing scheme. By maintaining a shutter voltage which provides beam voltage differences that are at least the maintenance voltage, the absolute values of the shutter open and shutter closed potentials can be altered or switched in the midst of an addressing sequence over wide voltage ranges (even where voltage differences exceed $V_{at}$) with no danger of unintentional shutter motion.

The condition of rules 3 and 4 are those that are generally targeted during the addressing sequence to ensure the bi-stable actuation of the shutter.

The maintenance voltage difference, $V_m$, can be designed or expressed as a certain fraction of the actuation threshold voltage, $V_{at}$. For systems designed for a useful degree of bi-stability the maintenance voltage can exist in a range between 20% and 80% of $V_{at}$. This helps ensure that charge leakage or parasitic voltage fluctuations in the system do not result in a deviation of a set holding voltage out of its maintenance range—a deviation which could result in the unintentional actuation of a shutter. In some systems an exceptional degree of bi-stability or hysteresis can be provided, with $V_m$ existing over a range of 2% to 98% of $V_{at}$. In these systems, however, care must be taken to ensure that an electrode voltage condition of $V<V_m$ can be reliably obtained within the addressing and actuation time available.

Alternative MEMS-Based Light Modulators

Figure 4B:
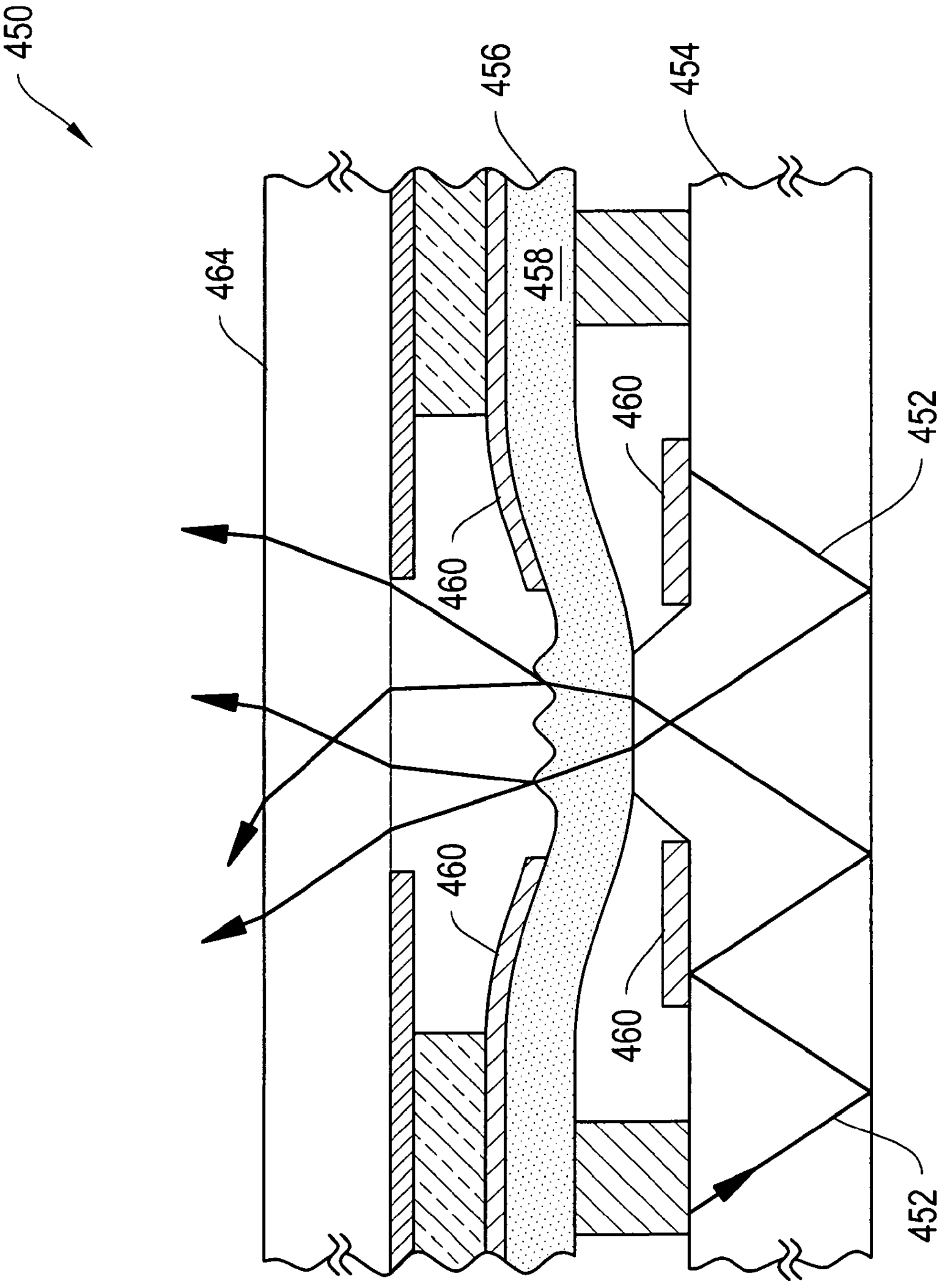
FIG. 4B is a cross sectional view of an illustrative non-shutter-based light modulator suitable for inclusion in various embodiments of the invention.

The control matrices described herein are not limited to controlling shutter-based MEMS light modulators, such as the light modulators described above. For example, FIG. 4B is a cross sectional view of a light tap-based light modulator 450, suitable for inclusion in various ones of the control matrices described below. As described further in U.S. Pat. No. 5,771,321, entitled "Micromechanical Optical Switch and Flat Panel Display," the entirety of which is incorporated herein by reference, a light tap works according to a principle of frustrated total internal reflection. That is, light 452 is introduced into a light guide 454, in which, without interference, light 452 is for the most part unable to escape the light guide 454 through its front or rear surfaces due to total internal reflection. The light tap 450 includes a tap element 456 that has a sufficiently high index of refraction that, in response to the tap element 456 contacting the light guide 454, light 452 impinging on the surface of the light guide adjacent the tap element 456 escapes the light guide 454 through the tap element 458 towards a viewer, thereby contributing to the formation of an image.

In one embodiment, the tap element 456 is formed as part of beam 458 of flexible, transparent material. Electrodes 460 coat portions one side of the beam 458. Opposing electrodes 460 are disposed on a cover plate 464 positioned adjacent the layer 458 on the opposite side of the light guide 454. By applying a voltage across the electrodes 460, the position of the tap element 456 relative to the light guide 454 can be controlled to selectively extract light 452 from the light guide 454.

The light tap 450 is only one example of a non-shutter-based MEMS modulator suitable for control by the control matrices described herein. Other forms of non-shutter-based MEMS modulators could likewise be controlled by various ones of the control matrices described herein without departing from the scope of the invention.

Figure 4C:
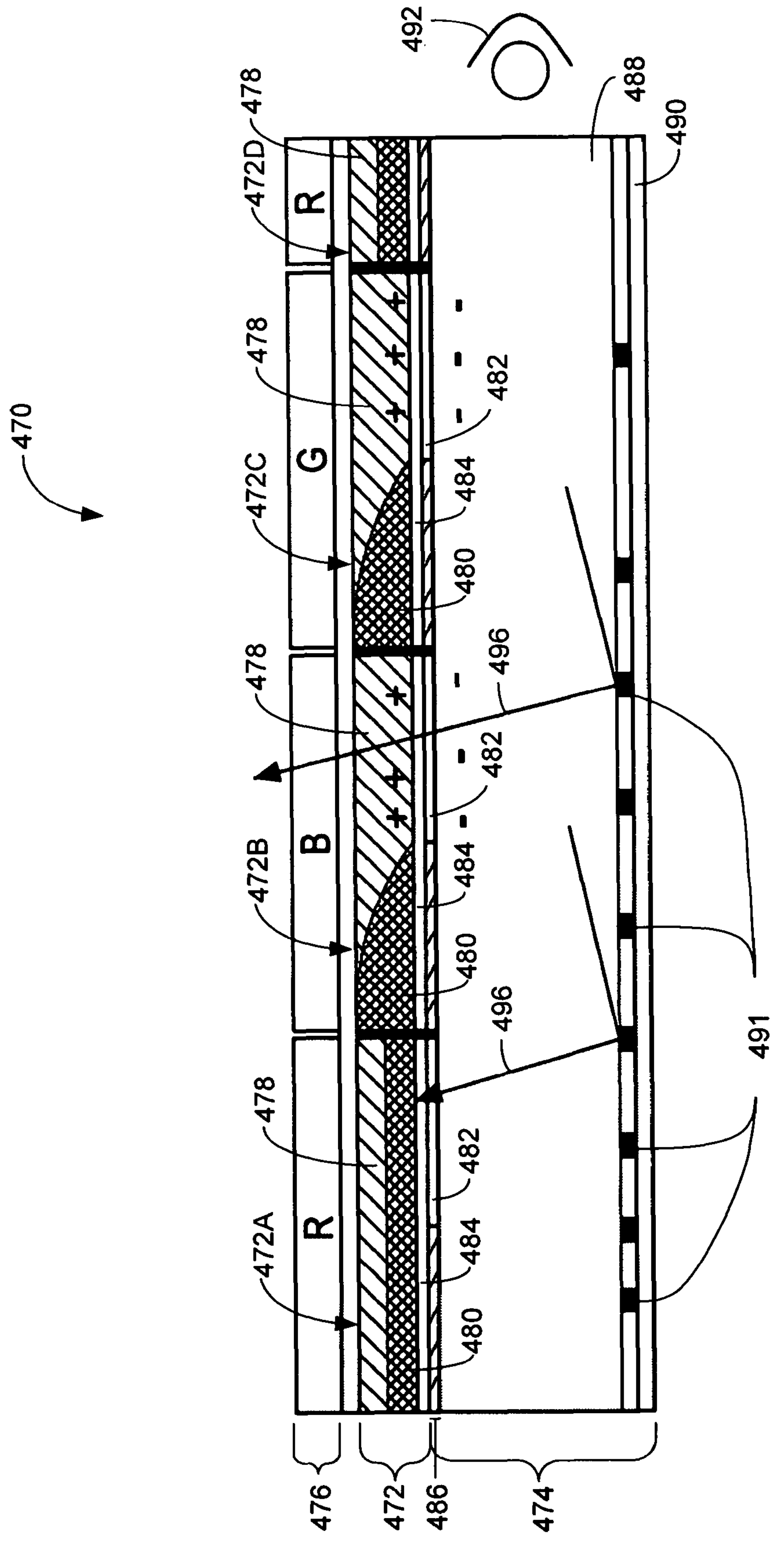
FIG. 4C is a cross sectional view of a second illustrative non-shutter-based light modulator suitable for inclusion in various embodiments of the invention.

FIG. 4C is a cross sectional view of a second illustrative non-shutter-based light modulator suitable for inclusion in various embodiments of the invention Specifically, FIG. 4C is a cross sectional view of an electrowetting-based light modulation array 470. The light modulation array 470 includes a plurality of electrowetting-based light modulation cells 472*a*-472*d* (generally "cells 472") formed on an optical cavity 474. The light modulation array 470 also includes a set of color filters 476 corresponding to the cells 472.

Each cell 472 includes a layer of water (or other transparent conductive or polar fluid) 478, a layer of light absorbing oil 480, a transparent electrode 482 (made, for example, from indium-tin oxide) and an insulating layer 484 positioned between the layer of light absorbing oil 480 and the transparent electrode 482. Illustrative implementation of such cells are described further in U.S. Patent Application Publication No. 2005/0104804, published May 19, 2005 and entitled "Display Device." In the embodiment described herein, the electrode takes up a portion of a rear surface of a cell 472.

The remainder of the rear surface of a cell 472 is formed from a reflective aperture layer 486 that forms the front surface of the optical cavity 474. The reflective aperture layer 486 is formed from a reflective material, such as a reflective metal or a stack of thin films forming a dielectric mirror. For each cell 472, an aperture is formed in the reflective aperture layer 486 to allow light to pass through. The electrode 482 for the cell is deposited in the aperture and over the material forming the reflective aperture layer 486, separated by another dielectric layer.

The remainder of the optical cavity 474 includes a light guide 488 positioned proximate the reflective aperture layer 486, and a second reflective layer 490 on a side of the light guide 488 opposite the reflective aperture layer 486. A series of light redirectors 491 are formed on the rear surface of the light guide, proximate the second reflective layer. The light redirectors 491 may be either diffuse or specular reflectors. One of more light sources 492 inject light 494 into the light guide 488.

In an alternative implementation, an additional transparent substrate is positioned between the light guide 490 and the light modulation array 470. In this implementation, the reflective aperture layer 486 is formed on the additional transparent substrate instead of on the surface of the light guide 490.

In operation, application of a voltage to the electrode 482 of a cell (for example, cell 472*b* or 472*c*) causes the light absorbing oil 480 in the cell to collect in one portion of the cell 472. As a result, the light absorbing oil 480 no longer obstructs the passage of light through the aperture formed in the reflective aperture layer 486 (see, for example, cells 472*b* and 472*c*). Light escaping the backlight at the aperture is then able to escape through the cell and through a corresponding color (for example, red, green, or blue) filter in the set of color filters 476 to form a color pixel in an image. When the electrode 482 is grounded, the light absorbing oil 480 covers the aperture in the reflective aperture layer 486, absorbing any light 494 attempting to pass through it.

The area under which oil 480 collects when a voltage is applied to the cell 472 constitutes wasted space in relation to forming an image. This area cannot pass light through, whether a voltage is applied or not, and therefore, without the inclusion of the reflective portions of reflective apertures layer 486, would absorb light that otherwise could be used to contribute to the formation of an image. However, with the inclusion of the reflective aperture layer 486, this light, which otherwise would have been absorbed, is reflected back into the light guide 490 for future escape through a different aperture.

Control Matrices and Methods of Operation Thereof

Figure 5A:
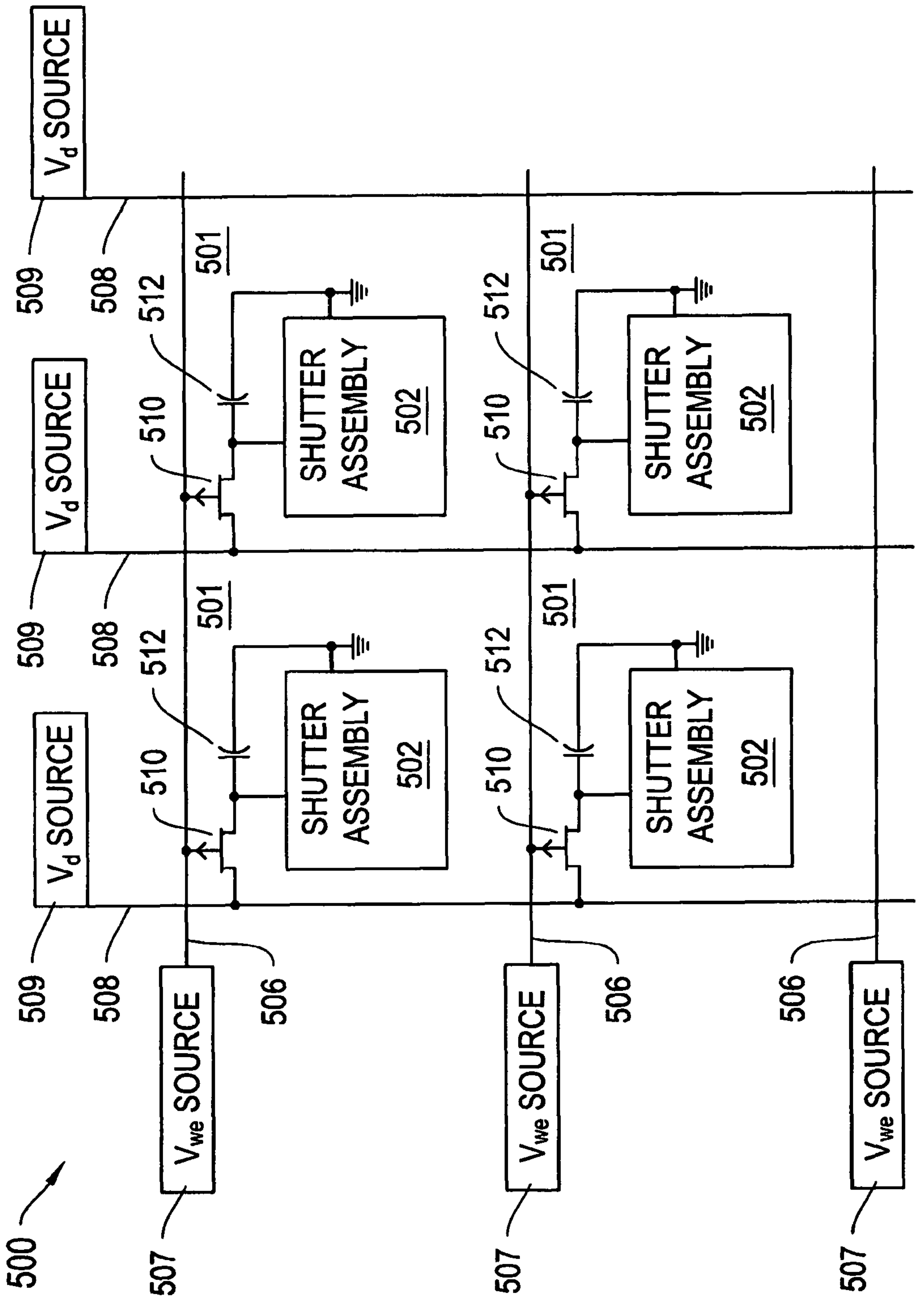
FIG. 5A is a conceptual diagram of a control matrix suitable for controlling the shutter assemblies of the display apparatus of FIG. 1, according to an illustrative embodiment of the invention.
Figure 5B:
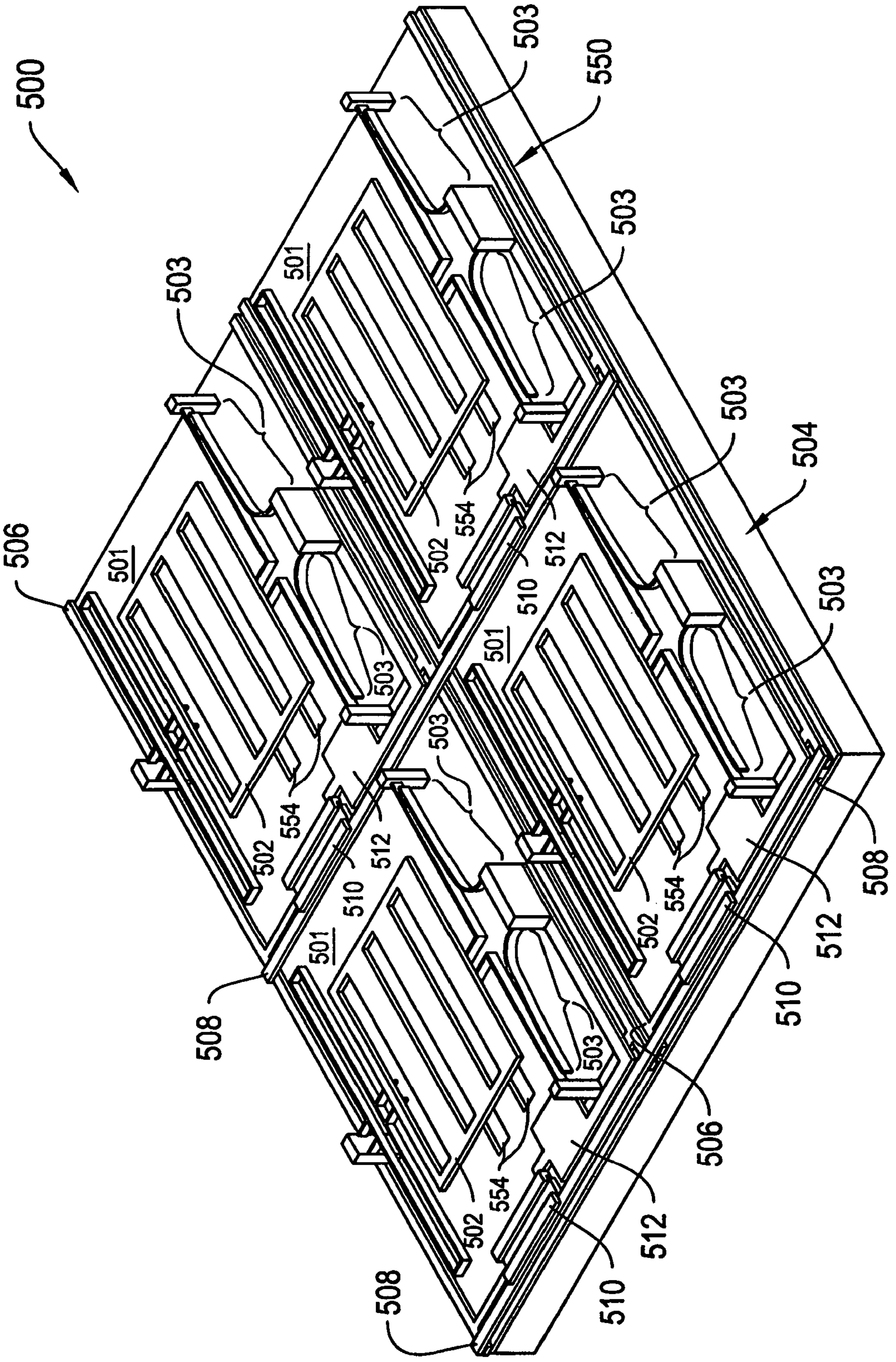
FIG. 5B is an isometric view of an array of pixels incorporating the control matrix of FIG. 5A and the shutter assemblies of FIG. 2, according to an illustrative embodiment of the invention.

FIG. 5A is a conceptual diagram of a control matrix 500 suitable for inclusion in the display apparatus 100 for addressing an array of pixels. FIG. 5B is an isometric view of a portion of an array of pixels including the control matrix 500. Each pixel 501 includes an elastic shutter assembly 502, such as shutter assembly 200, controlled by an actuator 503.

The control matrix 500 is fabricated as a diffused or thin-film-deposited electrical circuit on the surface of a substrate 504 on which the shutter assemblies 502 are formed. The control matrix 500 includes a scan-line interconnect 506 for each row of pixels 501 in the control matrix 500 and a data-interconnect 508 for each column of pixels 501 in the control matrix 500. Each scan-line interconnect 506 electrically connects a write-enabling voltage source 507 to the pixels 501 in a corresponding row of pixels 501. Each data interconnect 508 electrically connects an data voltage source, ("Vd source") 509 to the pixels 501 in a corresponding column of pixels. In control matrix 500, the data voltage $V_d$ provides the majority of the energy necessary for actuation. Thus, the data voltage source 509 also serves as an actuation voltage source.

For each pixel 501 or for each shutter assembly in the array, the control matrix 500 includes a transistor 510 and a capacitor 512. The gate of each transistor is electrically connected to the scan-line interconnect 506 of the row in the array in which the pixel 501 is located. The source of each transistor 510 is electrically connected to its corresponding data interconnect 508. The shutter assembly 502 includes an actuator with two electrodes. The two electrodes have significantly different capacitances with respect to the surroundings. The transistor connects the data interconnect 508 to the actuator electrode having the lower capacitance. More particularly the drain of each transistor 510 is electrically connected in parallel to one electrode of the corresponding capacitor 512 and to the lower capacitance electrode of the actuator. The other electrode of the capacitor 512 and the higher capacitance electrode of the actuator in shutter assembly 502 are connected to a common or ground potential. In operation, to form an image, the control matrix 500 write-enables each row in the array in sequence by applying $V_{we}$ to each scan-line interconnect 506 in turn. For a write-enabled row, the application of $V_{we}$ to the gates of the transistors 510 of the pixels 501 in the row allows the flow of current through the data interconnects 508 through the transistors to apply a potential to the actuator of the shutter assembly 502. While the row is write-enabled, data voltages $V_d$ are selectively applied to the data interconnects 508. In implementations providing analog gray scale, the data voltage applied to each data interconnect 508 is varied in relation to the desired brightness of the pixel 501 located at the intersection of the write-enabled scan-line interconnect 506 and the data interconnect 508. In implementations providing digital control schemes, the data voltage is selected to be either a relatively low magnitude voltage (i.e., a voltage near ground) or to meet or exceed $V_{at}$ (the actuation threshold voltage). In response to the application of $V_{at}$ to a data interconnect 508, the actuator in the corresponding shutter assembly 502 actuates, opening the shutter in that shutter assembly 502. The voltage applied to the data interconnect 508 remains stored in the capacitor 512 of the pixel even after the control matrix 500 ceases to apply $V_{we}$ to a row. It is not necessary, therefore, to wait and hold the voltage $V_{we}$ on a row for times long enough for the shutter assembly 502 to actuate; such actuation can proceed after the write-enabling voltage has been removed from the row. The voltage in the capacitors 510 in a row remain substantially stored until an entire video frame is written, and in some implementations until new data is written to the row.

The control matrix 500 can be manufactured through use of the following sequence of processing steps:

First an aperture layer 550 is formed on a substrate 504. If the substrate 504 is opaque, such as silicon, then the substrate 504 serves as the aperture layer 550, and aperture holes 554 are formed in the substrate 504 by etching an array of holes through the substrate 504. If the substrate 504 is transparent, such as glass, then the aperture layer 550 may be formed from the deposition of a light blocking layer on the substrate 504 and etching of the light blocking layer into an array of holes. The aperture holes 554 can be generally circular, elliptical, polygonal, serpentine, or irregular in shape. As described in U.S. patent application Ser. No. 11/218,690, filed on Sep. 2, 2005, if the light blocking layer is also made of a reflective material, such as a metal, then the aperture layer 550 can act as a mirror surface which recycles non-transmitted light back into an attached backlight for increased optical efficiency. Reflective metal films appropriate for providing light recycling can be formed by a number of vapor deposition techniques including sputtering, evaporation, ion plating, laser ablation, or chemical vapor deposition. Metals that are effective for this reflective application include, without limitation, Al, Cr, Au, Ag, Cu, Ni, Ta, Ti, Nd, Nb, Si, Mo and/or alloys thereof. Thicknesses in the range of 30 nm to 1000 nm are sufficient.

Second, an intermetal dielectric layer is deposited in blanket fashion over the top of the aperture layer metal 550.

Third, a first conducting layer is deposited and patterned on the substrate. This conductive layer can be patterned into the conductive traces of the scan-line interconnect 506. Any of the metals listed above, or conducting oxides such as indium tin oxide, can have sufficiently low resistivity for this application. A portion of the scan line interconnect 506 in each pixel is positioned to so as to form the gate of a transistor 510.

Fourth, another intermetal dielectric layer is deposited in blanket fashion over the top of the first layer of conductive interconnects, including that portion that forms the gate of the transistor 510. Intermetal dielectrics sufficient for this purpose include $SiO_2$, $Si_3N_4$, and $Al_2O_3$ with thicknesses in the range of 30 nm to 1000 nm.

Fifth, a layer of amorphous silicon is deposited on top of the intermetal dielectric and then patterned to form the source, drain and channel regions of a thin film transistor active layer. Alternatively this semiconducting material can be polycrystalline silicon.

Sixth, a second conducting layer is deposited and patterned on top of the amorphous silicon. This conductive layer can be patterned into the conductive traces of the data interconnect 508. The same metals and/or conducting oxides can be used as listed above. Portions of the second conducting layer can also be used to form contacts to the source and drain regions of the transistor 510.

Capacitor structures such as capacitor 512 can be built as plates formed in the first and second conducting layers with the intervening dielectric material.

Seventh, a passivating dielectric is deposited over the top of the second conducting layer.

Eighth, a sacrificial mechanical layer is deposited over the top of the passivation layer. Vias are opened into both the sacrificial layer and the passivation layer such that subsequent MEMS shutter layers can make electrical contact and mechanical attachment to the conducting layers below.

Ninth, a MEMS shutter layer is deposited and patterned on top of the sacrificial layer. The MEMS shutter layer is patterned with shutters 502 as well as actuators 503 and is anchored to the substrate 504 through vias that are patterned into the sacrificial layer. The pattern of the shutter 502 is aligned to the pattern of the aperture holes 554 that were formed in the first aperture layer 550. The MEMS shutter layer may be composed of a deposited metal, such as Au, Cr or Ni, or a deposited semiconductor, such as polycrystalline silicon or amorphous silicon, with thicknesses in the range of 300 nanometers to 10 microns.

Tenth, the sacrificial layer is removed such that components of the MEMS shutter layer become free to move in response to voltages that are applied across the actuators 503.

Eleventh, the sidewalls of the actuator 503 electrodes are coated with a dielectric material to prevent shorting between electrodes with opposing voltages.

Many variations on the above process are possible. For instance the reflective aperture layer 550 of step 1 can be combined into the first conducting layer. Gaps are patterned into this conducting layer to provide for electrically conductive traces within the layer, while most of the pixel area remains covered with a reflective metal. In another embodiment, the transistor 510 source and drain terminals can be placed on the first conducting layer while the gate terminals are formed in the second conducting layer. In another embodiment the semiconducting amorphous or polycrystalline silicon is placed directly below each of the first and second conducting layers. In this embodiment vias can be patterned into the intermetal dielectric so that metal contacts can be made to the underlying semiconducting layer.

In an alternative implementation, the shutter assembly 502, along with the control matrix 500, can be fabricated on a separate substrate from the one on which the aperture layer 550 is formed. In such an implementation, the substrate on which the control matrix 500 and shutter assembly 500 are formed is aligned with the substrate 504 on which the aperture layer 550 is formed such that the shutters align with their corresponding aperture holes 554.

Figure 6:
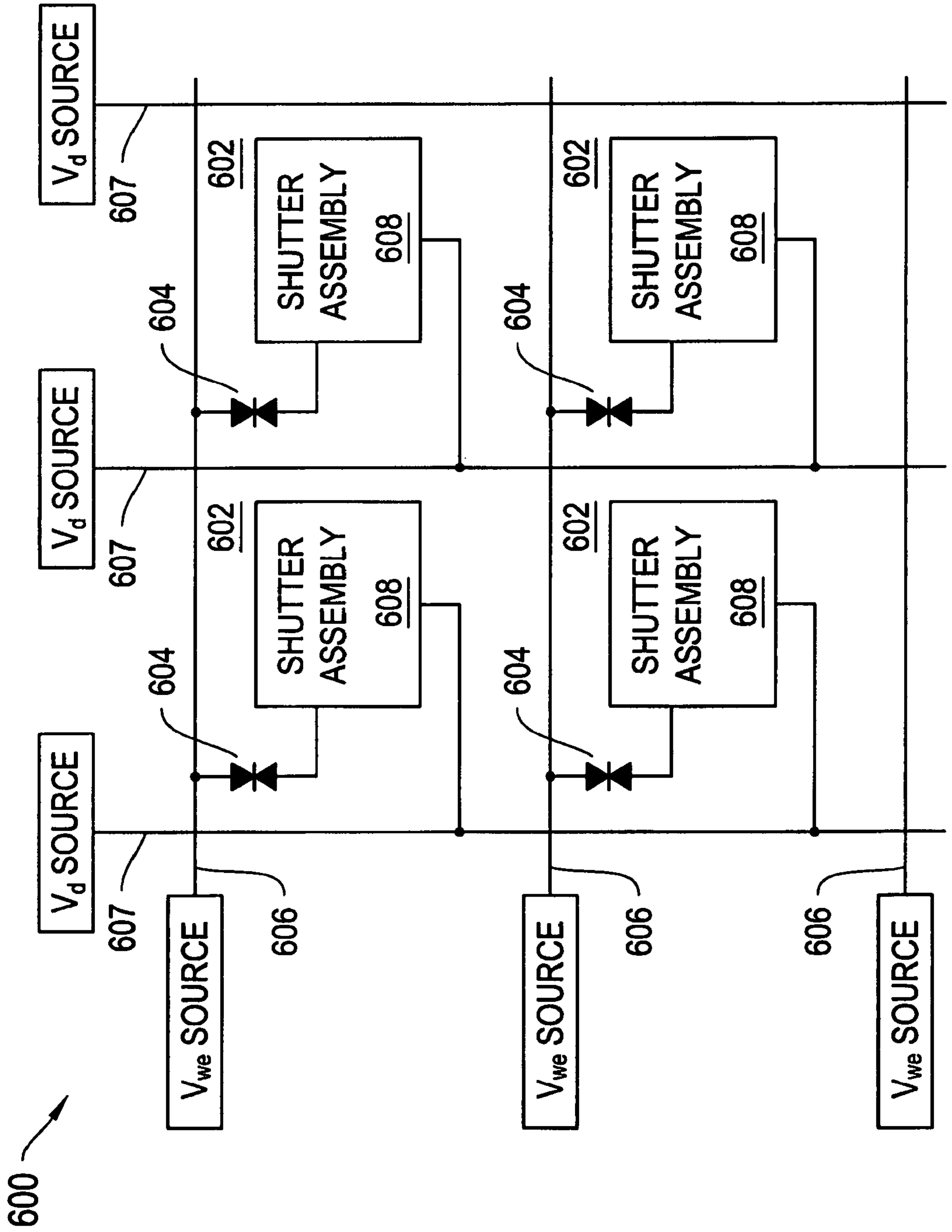
FIG. 6 is a diagram of a second control matrix suitable for controlling the shutter assemblies of the display apparatus of FIG. 1 according to an illustrative embodiment of the invention.

FIG. 6 is a diagram of a second control matrix 600 suitable for inclusion in the display apparatus 100 for addressing an array of pixels 602. The pixels 602 in the control matrix 600 forgo the use of a transistor and capacitor, as are included in control matrix 500, in favor of a metal-insulator-metal ("MIM") diode 604. The control matrix 600 includes a scan-line interconnect 606 for each row of pixels 602 in the control matrix 600 and a data interconnect 607 for each column of pixels in the control matrix 600. Each scan-line interconnect 606 electrically connects to one terminal of the MIM diode 604 of each pixel 602 in its corresponding row of pixels 602. The other terminal of the MIM diode 604 in a pixel 602 electrically connects to one of the two electrodes of a shutter assembly 608, such as shutter assembly 200, in the pixel 602.

In operation the MIM diode 604 acts as a non-linear switch element which prevents current from flowing to the shutter assembly 609 unless the voltage presented between the scan line interconnect 606 and the data line interconnect 607 exceeds a threshold voltage $V_{diode}$. Therefore, if voltage pulses provided by the data line interconnect 607 do not exceed $V_{diode}$, such data pulses will not effect that actuation of shutter assemblies 608 connected along the data line. If, however, a write-enabling voltage $V_{we}$, is applied to a scan line interconnect 606 such that a voltage difference in excess of $V_{diode}$ appears between the scan line interconnect 606 and any of the several data line interconnects 607 that cross the scan line interconnect 606, then the shutters at the intersection of the that scan line interconnect 606 and those data line interconnects 607 will receive their charge and can be actuated. In implementations providing analog gray scale, the data voltage applied to each data interconnect 607 is varied in relation to the desired brightness of the pixel 602 located at the intersection of the write-enabled scan-line interconnect 606 and the data interconnect 607. In implementations providing a digital control schemes, the data voltage is selected to be either close to $V_{we}$ (i.e., such that little or no current flows through the diode 604) or high enough such that $V_{we}-V_{diode}$ will meet or exceed $V_{at}$ (the actuation threshold voltage).

In other implementations the MIM diode 604 can be placed between the shutter assembly 608 and the data line interconnect 607. The method of operation is the same as described above. In other implementations, two MIM diodes are employed, each connected to a separate and adjacent scan line. One electrode of the shutter assembly is connected to each of the MIM diodes on the side opposite of their respective scan lines such that the voltage appearing on the shutter electrode is almost ½ of the voltage difference between the two scan lines. In this fashion it is easier to fix the potential of one of the electrodes of the actuator to a known zero or common potential.

The two electrodes of the shutter assembly 608 in the pixel 602 have significantly different capacitances with respect to the ground or case potential. Of these two electrodes, the higher capacitance electrode is preferably connected to the scan line interconnect 606 (optionally, as shown, with a diode connected between shutter 608 and the scan line interconnect 606), since the scan line typically requires smaller voltage changes (with respect to ground) than are typically required of the data line interconnect 607. The data interconnect 607 electrically connects to the lower-capacitance electrode of the shutter assembly 608.

Figure 7:
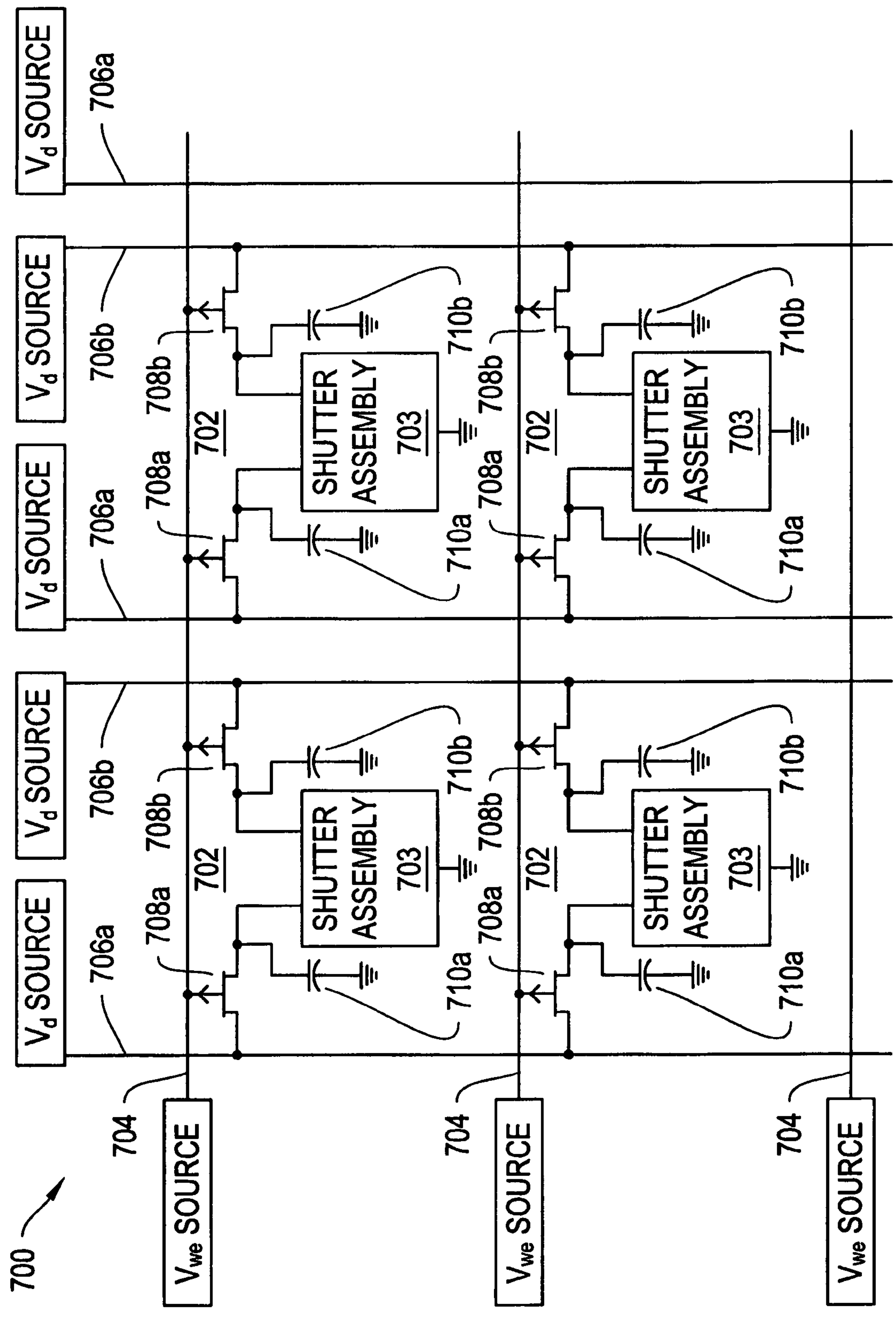
FIG. 7 is a diagram of a third control matrix suitable for controlling the shutter assemblies of the display apparatus of FIG. 1, according to an illustrative embodiment of the invention.

FIG. 7 is a diagram of a third control matrix 700 for controlling pixels 702 incorporating shutter assemblies 703 with both open and close actuators, such as shutter assemblies 300 and 402. The control matrix 700 includes scan-line interconnect 704 per row of pixels 702 in the control matrix 700 and two data interconnects 706*a* and 706*b* addressing each column of pixels 702 in the control matrix 700. One of the data interconnects is a shutter-open interconnect 706*a* and the other data interconnect is a shutter-close interconnect 706*b*.

For a given pixel 702 in the control matrix 700, the pixel 702 includes two transistor-capacitor pairs, one pair for each data-interconnect 706*a* and 706*b* addressing the pixel. The gates of both transistors in the pixel 702 electrically couple to the scan-line interconnect 704 corresponding to the row of the control matrix 700 in which the pixel 702 is located. The source of one of the transistors, the shutter-open transistor 708*a*, electrically connects to the shutter-open data-interconnect 706*a* of the column in which the pixel 702 is located. The drain of the shutter-open transistor 708*a* electrically connects, in parallel, to one electrode of one of the capacitors, the shutter-open capacitor 710*a*, and to one electrode of the shutter-open actuator of the shutter assembly 703 of the pixel. The other electrode of the shutter-open capacitor 710*a* electrically connects to ground or to a bias interconnect set to a common voltage among the pixels 702.

Similarly, the source of the other transistor in the pixel 702, the shutter-close transistor 708*b*, electrically connects to the shutter-close data interconnect 706*b* of the column in which the pixel 702 is located. The drain of the shutter-close transistor 708*b* electrically connects, in parallel, to the other of the capacitors in the pixel, the shutter-close capacitor 710*b*, and to one of the electrodes of the shutter-close actuator of the shutter assembly 703.

Both the shutter-open actuator and the shutter-close actuator of the shutter assembly 703 include two electrodes. One electrode in each actuator has a significantly higher capacitance than the other. The drains of the shutter-open and the shutter-close transistors electrically connect to the lower-capacitance electrodes of their corresponding actuators. The ground or bias interconnect, if any, electrically connects to the higher-capacitance electrode.

The control matrix of FIG. 7 employs n-channel transistors. Other embodiments are possible that employ p-channel MOS transistors. In other implementations, the transistors 708*a* and 708*b* can be replaced by MIM diodes or other non-linear circuit elements or switches. In other implementations the capacitors 710*a* and 710*b* can be removed altogether, their function replaced by the effective capacitance of the shutter-open and shutter-closed actuators.

In the case where multiple shutters are to be actuated within each pixel, a separate pair of shutter-open data interconnects and shutter-closed data interconnects, along with associated transistors and capacitors, can be provided for each shutter within the pixel.

Figure 8:
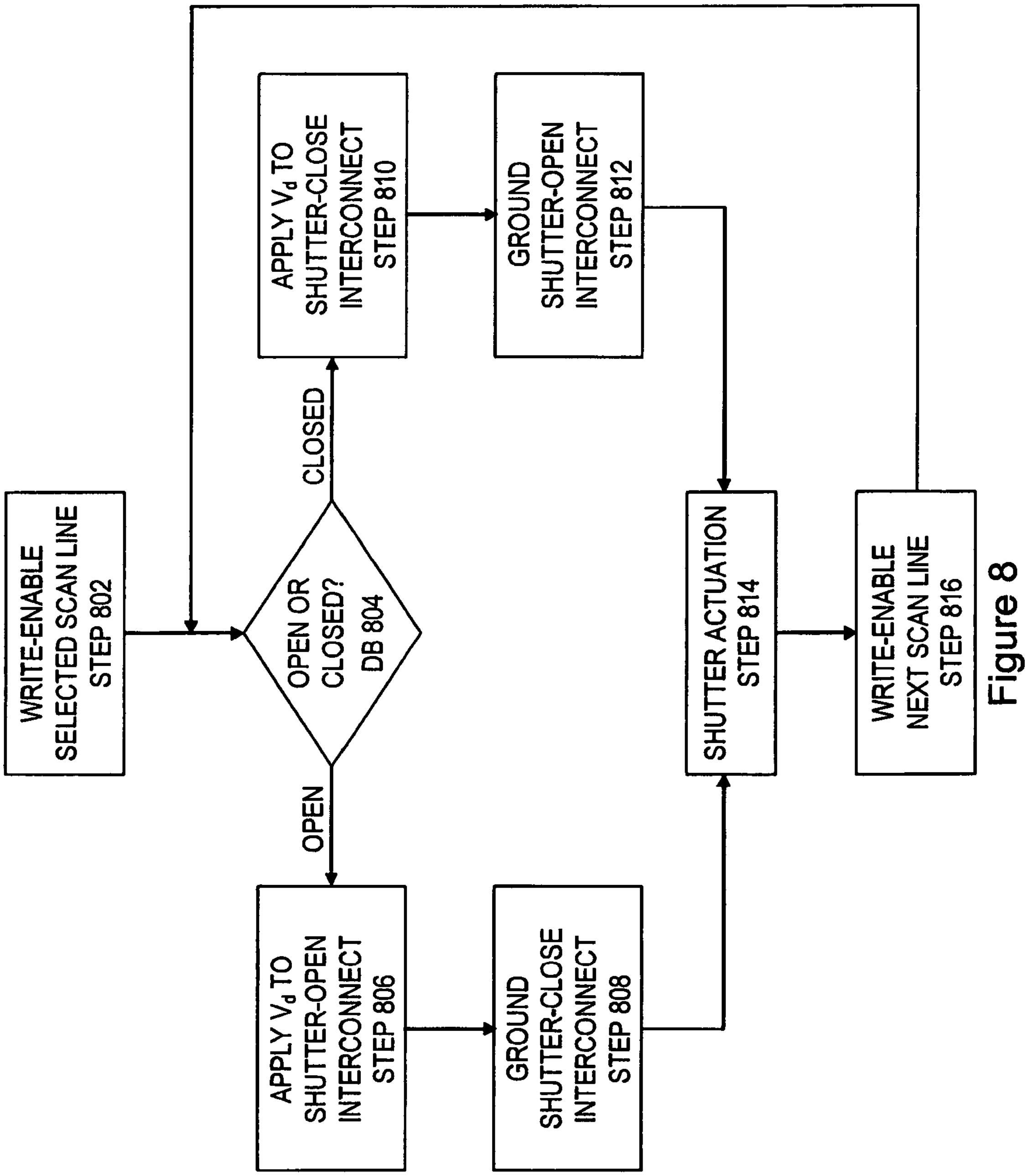
FIG. 8 is a flow chart of a method of addressing the pixels of the control matrix of FIG. 7, according to an illustrative embodiment of the invention.

FIG. 8 is flow chart of a method 800 of addressing the pixels 702 controlled by the control matrix 700 of FIG. 7 to form an image frame. The steps carried out to address a single image frame are referred to collectively as a "frame addressing cycle." The method begins by write-enabling the first scan line in the display (step 802). To do so, the control matrix 700 applies $V_{we}$, (e.g., +45V for nMOS transistors or −45V for pMOS transistors), to the scan line interconnect 704 in the control matrix 700 corresponding to the first row in the control matrix and grounds the other scan-line interconnects 704.

The control matrix 700 then writes data to each pixel 702 in the write-enabled scan line (decision block 804 to step 812). The data corresponds to the desired states of the shutter assemblies 703 in those pixels 702. For ease of understanding, the data writing process (decision block 804 to step 812) is described below in relation to a single pixel 702 in a selected column in the write-enabled scan line. At the same time data is written to this single pixel 702, the control matrix 700 also writes data in the same fashion to the remaining pixels 702 in the write-enabled scan line.

To write data to a pixel 702 at the intersection of a selected column of the control matrix 700 and the write-enabled scan line first, at decision block 804, it is determined if the shutter assembly 703 in question is to be open in the next image frame or closed. If the shutter assembly 703 is to be open, the control matrix 700 applies a data voltage, $V_d$, to the shutter-open interconnect 706*a* of the selected column (step 806). $V_d$ is selected to raise the voltage across the electrodes of the shutter-open actuator in the shutter assembly 703 to equal or exceed the voltage necessary for actuation, $V_{at}$. At about the same time that the control matrix 700 applies $V_d$ to the shutter-open interconnect 706*a* of the selected column (step 806), the control matrix 700 grounds the shutter-close interconnect 706*b* of the column (step 808).

If, at decision block 804, it is determined that the shutter assembly 703 is to be closed, the control matrix 700 applies the data voltage $V_d$ to the shutter-close interconnect 706*b* (step 810) and grounds the shutter-open interconnect 706*a* of the column (step 812). Once the voltage across the electrodes of the desired actuator builds up to $V_{at}$, the actuator, if not previously in the desired position, actuates (step 814), moving the shutter in the shutter assembly 703 to the desired position.

After the data is written to the pixels 702 in the scan line in steps 806-812, the control matrix 700 grounds the scan-line interconnect 704 (step 814) and write-enables the next scan line (step 816). The process repeats until all pixels 702 in the control matrix 700 are addressed. In one implementation, before addressing the first scan line in the control matrix 700, a backlight to which the control matrix is affixed is turned off. Then, after all scan lines in the control matrix 700 have been addressed, the backlight is turned back on. Synchronizing the switching of the backlight off and on with the beginning and end of a period during which a frame is addressed improves the color purity of the resultant image since then the backlight is on only when all pixels are already set to their correct image state.

An actuation event is determined by noting the voltage differences that appear across the shutter-open actuator and the shutter closed actuator. For consistent actuation, generally one of these voltage differences will be kept close to zero, or at least below a certain maintenance voltage $V_m$, while the absolute value of the other voltage difference will exceed the actuation voltage. Consistent with the actuation conditions described with respect to FIGS. 2, 3, and 4A, the polarities of applied voltages, such as $V_d$, can be either negative or positive, and the voltage applied to the common potential (indicated as "ground" in FIG. 7 or at step 812), can be any voltage either positive or negative.

In some implementations, it is advantageous to periodically or occasionally reverse the sign of the voltages that appear across the actuators of shutter assembly 703 without otherwise altering the method 800 of addressing the pixels. In one case, polarity reversal can be accomplished by maintaining the common electrode of all shutters 703 at a potential close to zero while reversing the polarity of the data voltage, $V_d$. In another case polarity reversal can be accomplished by setting the common voltage to $V_{common}$, where $V_{common}$ is equal to or greater than $V_{at}$, and then providing a voltage source such that the data voltage either alternates between $V_{common}$ and $2*V_{at}$ or between zero and $V_{common}$.

Similar advantageous use of polarity reversals and the use of non-zero common voltages can be applied to the control matrices 500 and 600.

The flow chart of method 800 is drawn for the case where only digital information is written into an image frame, i.e. where the shutters are intended to be either open or closed. A similar method of image frame addressing can be employed for the provision of gray scale images built upon loading analog data through data interconnects 706*a* and 706*b*. In this case, intermediate voltages are intended to produce only partial openings of the shutters 703. The voltages applied across the shutter-open actuators will tend to move the shutters in directions opposite to the motion induced by voltages across the shutter-closed actuators. There will exist, however, pairs of complementary voltages that, when applied simultaneously across these two actuators, will result in controlled and pre-determined states of partial shutter opening.

The complementary nature of the voltages supplied to either the shutter-open interconnect 706*a* or the shutter-closed interconnect 706*b* can be used to advantage if the voltage source electronics are also designed with capability for charge recycling. Taking as an example method 800, which is designed for the loading of digital information to the image frame: voltages loaded into the interconnects at steps 806 or 810 are complementary. That is, if $V_d$ is loaded into one of the interconnects, then the other interconnect is usually grounded. Changing the state of the shutter assembly 703 (e.g. from closed to open) is conceptually, then, a matter of transferring the charge stored on one actuator over to its opposing actuator. If the energy lost on each of these transitions is $Q*V_d$, where Q is the charge stored on an actuator, then considerable power savings can be derived if the stored charge is not simply dissipated as waste energy in the voltage source electronics at each transition but is instead recycled for use on the other actuator. While complete charge recycling is difficult, methods for partial recycling are available. For example, the frame addressing method 800 can provide a step where the data line interconnects 706*a* and 706*b* are shorted together within the voltage source electronics for a brief period between steps 802 and 804. For the brief period in which these interconnects are shorted they will share the stored charge, so at least a fraction of the previous charge becomes available on whichever of the data line interconnects is to be brought back into its fully charged state.

Figure 9:
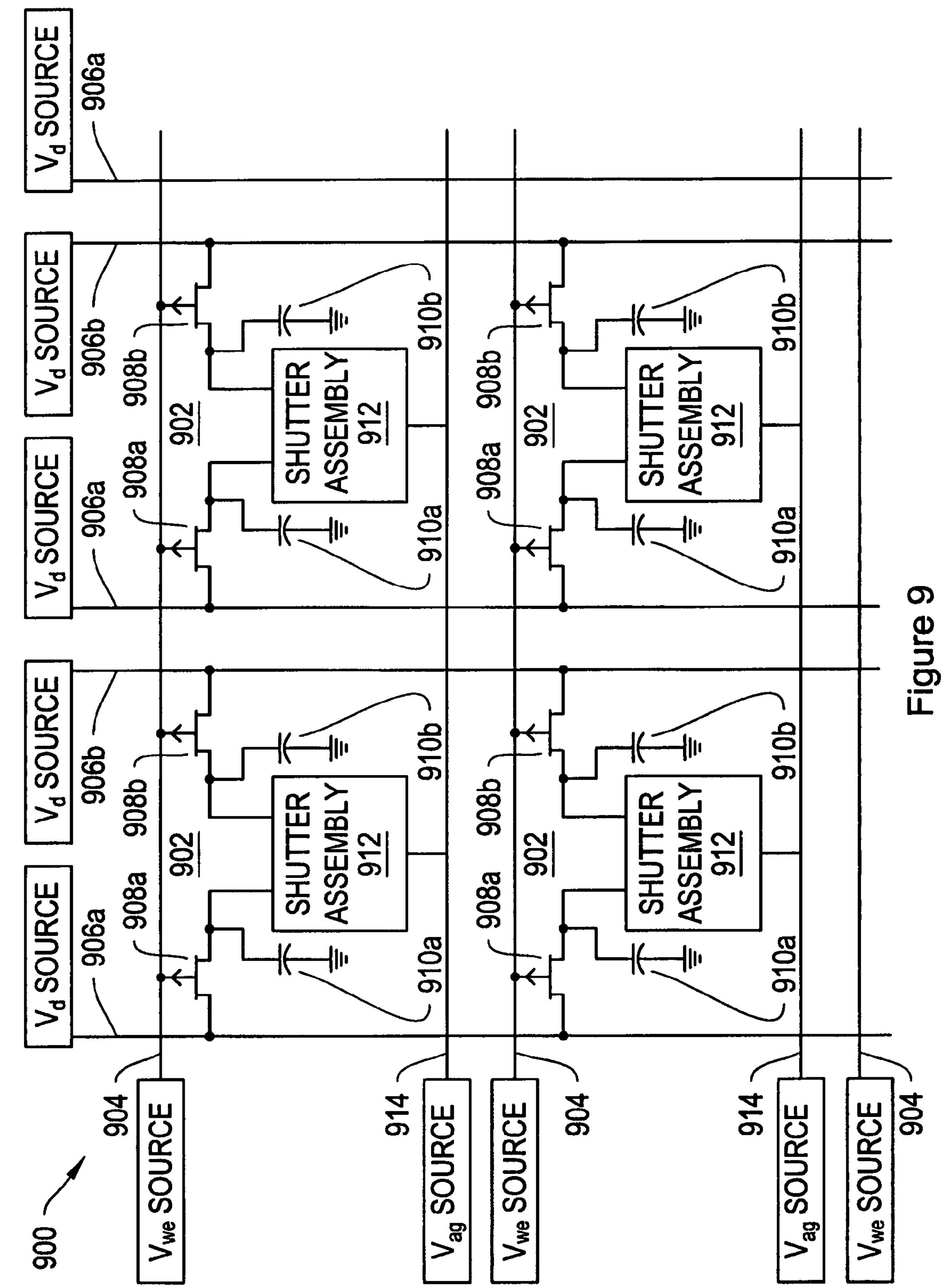
FIG. 9 is a diagram of a fourth control matrix suitable for controlling the shutter assemblies of the display apparatus of FIG. 1, according to an illustrative embodiment of the invention.

FIG. 9 is another illustrative control matrix 900 suitable for addressing an array of pixels in display device 100. The control matrix 900 is similar to the control matrix 700. That is, the control matrix 900 includes a scan-line interconnect 904 for each row of pixels in the control matrix 900 and two data interconnects, a shutter-open interconnect 906*a* and a shutter-close interconnect 906*b*, for each column of pixels 902 in the control matrix. In addition, each pixel in the control matrix 900 includes a shutter open-transistor (or optionally a diode or varistor) 908*a*, a shutter-close transistor (or optionally a diode or varistor) 908*b*, a shutter-open capacitor 910*a*, a shutter-close actuator 910*b*, and a shutter assembly 912. The shutter assembly is either mechanically and/or electrically bi-stable. The control matrix 900, however, includes an additional controllable interconnect, a global actuation interconnect 914. The global actuation interconnect 914 substantially simultaneously provides about the same voltage (a "common voltage") to pixels 902 in at least two rows and two columns of the control matrix 900. In one implementation, the global actuation interconnect 914 provides a common voltage to all pixels 902 in the control matrix 900. The higher capacitance electrode of the actuators of the shutter assemblies 912 in each pixel 902 in the control matrix 900 electrically connect to the global actuation interconnect 914 instead of to ground.

The inclusion of the global actuation interconnect 914 enables the near simultaneous actuation of pixels 902 in multiple rows of the control matrix 900. As a result, all actuators that actuate to set a given image frame (e.g., all shutters that move) can be actuated at the same time, as opposed to a row by row actuation method as described in method 800. The use of a global actuation process temporally decouples the writing of data to a pixel 902 from the actuation the shutter assembly 912 in the pixel 902.

The global actuation feature incorporated into the control matrix 900 takes advantage of the bi-stability of the shutter assemblies 912 in the control matrix 900. Actuating an electrically bi-stable shutter assembly requires that two conditions be satisfied simultaneously, that the absolute value of voltage across one electrode exceeds $V_{at}$, while the absolute value of the voltage across the other electrode is less than a maintenance voltage $V_m$. Thus, for control matrix 900, when a voltage in excess of $V_m$ is applied to one actuator of a shutter assembly 912, applying $V_{at}$ to the opposing shutter assembly is insufficient to cause the actuator to actuate.

For example, assume that the shutter-open actuator of an electrically bi-stable shutter assembly has a $V_{at}$ of 40V. At the same time, the application of 10V maintenance voltage across the electrodes of the shutter-close actuator may keep the shutter of the shutter assembly in a closed position even when 60V is applied across the electrodes of the shutter-open actuator. If a −10V bias potential is applied between the higher-capacitance electrodes of all shutter assemblies and ground via the global common interconnect, while the ground potential is applied to one of the actuation electrodes, then a data voltage of +40V can be applied to the lower-capacitance electrodes of selected actuators in the shutter assemblies, thereby yielding a +50V potential difference across those actuators, without causing the actuators to actuate. Then, by grounding the global common interconnect, the voltage across the electrodes of the selected actuators is reduced to +40V while the voltage across the opposing actuator is removed. As +40V still equals the actuation voltage of the actuator and no maintenance voltage is keeping the opposing actuator in position, the selected actuators all move in concert. Another example is described in further detail below in relation to FIG. 10.

Figure 10:
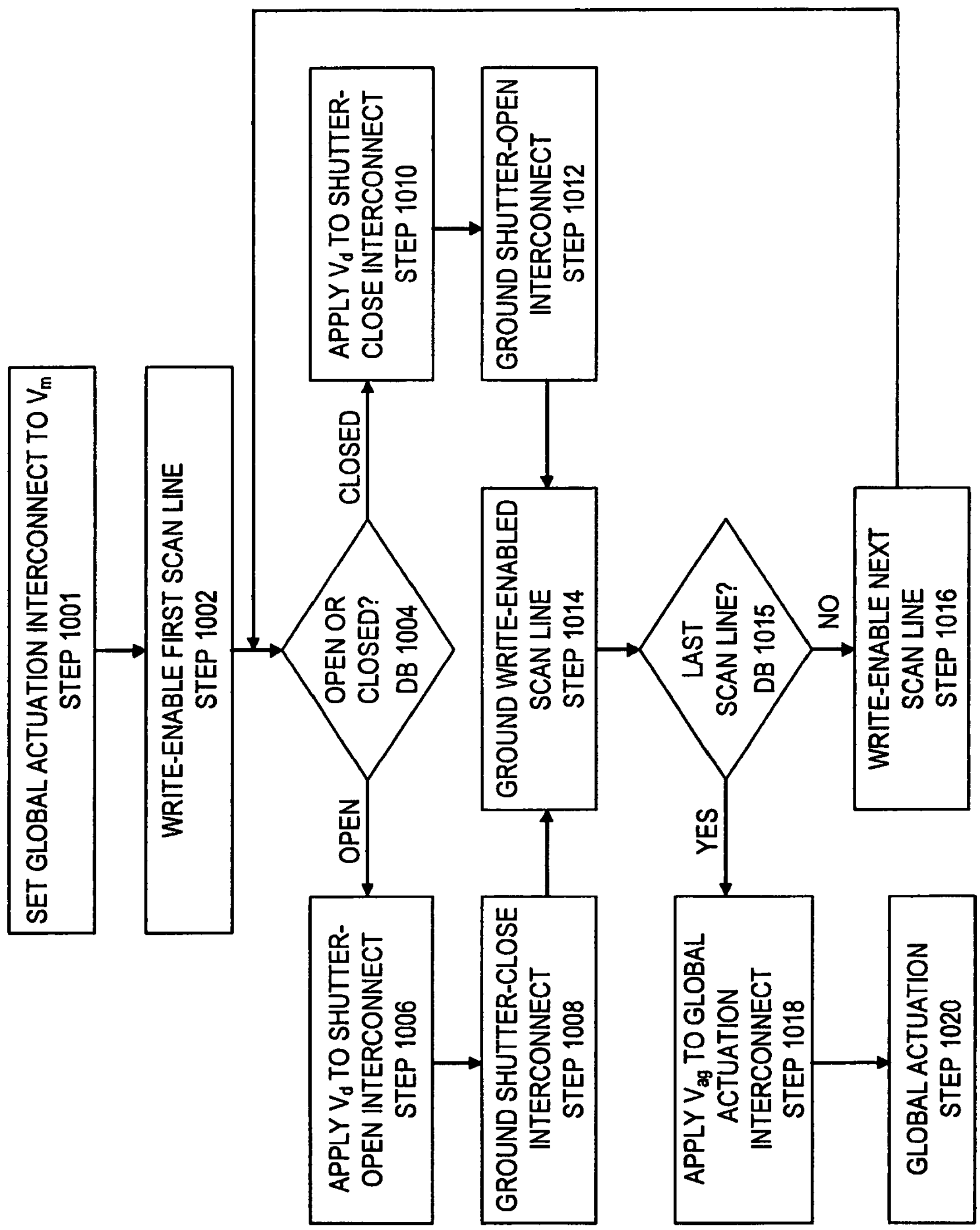
FIG. 10 is a flow chart of a method of addressing the pixels of the control matrix of FIG. 9, according to an illustrative embodiment of the invention.

FIG. 10 is flow chart of a method 1000 of addressing an image frame using the control matrix 900 of FIG. 9. The method begins by setting the global common interconnect 914 to a maintenance voltage $V_m$, e.g., ½ $V_{at}$ (step 1001) with respect to ground. Then, the control matrix 900 write-enables the first scan line in the display (step 1002). To do so, the control matrix 900 applies $V_{we}$, e.g., +45V, to a first scan-line interconnect 904 in the control matrix 900 and grounds the other scan-line interconnects 904.

The control matrix 900 then writes data to each pixel 902 in the write-enabled scan line corresponding to the desired states of those pixels in the next image frame (decision block 1004 to step 1012). The data writing process is described below in relation to a single pixel 902 in a selected column in the write-enabled scan line. At the same time that data is written to this single pixel 902, the control matrix 900 also writes data in the same fashion to the remaining pixels 902 in the write-enabled scan line.

To write data to a pixel 902, at decision block 1004, it is determined if the shutter of the shutter assembly 912 in the pixel 902 is to be in the open position in the next image frame or in the closed position. If the shutter is to be in the open position, the control matrix 900 applies a data voltage, $V_d$, to the shutter-open interconnect of the selected column (step 1006). $V_d$ is selected such that before the application of a global actuation voltage, $V_{ag}$, to the global common interconnect 914, the voltage across the shutter-open actuator in the pixel 902 remains insufficient to overcome the bias applied to the shutter-close actuator, but such that after the application of $V_{ag}$ to the global common interconnect 914, the voltage across the electrodes of the shutter-open actuator is sufficient for the shutter-open actuator to actuate. For example, if $V_{at}$ equals 40V, $V_m$ equals 20V, and $V_{ag}$ equals ground, then $V_d$ is selected to be greater than or equal to 40V, but less than the potential that would overcome $V_m$. At the same time that the control matrix 900 applies $V_d$ to the shutter-open interconnect 906*a* of the selected column (step 1006), the control matrix 900 grounds the shutter-close interconnect 906*b* of the column (step 1008).

If at decision block 1004, it is determined that the shutter is to be in the off position, the control matrix 900 applies the data voltage $V_d$ to the shutter-close interconnect 906*b* (step 1010) and grounds the shutter-open interconnect 906*a* of the column (step 1012).

After the control matrix 900 writes data to the pixels 902 in the write-enabled scan line in steps 1006-1012, the control matrix 900 grounds the currently write-enabled scan-line interconnect 904 (step 1014) and write-enables the next scan line (step 1016). The process repeats until all pixels 902 in the control matrix 900 are addressed (see decision block 1015). After all pixels in the control matrix 900 are addressed (see decision block 1015), the control matrix 900 applies the global common voltage $V_{ag}$ to the global common interconnect (step 1018), thereby resulting in a near simultaneous global actuation of the shutter assemblies 912 in the control matrix 900. Thus, for such implementations, the global common interconnect serves as a global actuation interconnect.

As with the method 800, the method 1000 may also include the synchronization of a backlight with shutter actuation.

However, by using the global actuation process described above, the backlight can be kept on for a larger percentage of the time a display is in operation, therefore yielding a brighter display for the same level of driving power in a backlight. In one embodiment, a backlight is synchronized such that it is off when ever the shutters in one row of a control matrix are set for one image frame while shutters in other rows of the control matrix are set for a different image frame. In control matrices that do not employ global actuation, for every frame of video, the backlight is turned off during the entire data writing process (approximately 500 microseconds to 5 milliseconds), as each row of pixels actuates as it is addressed. In contrast, in control matrices using global actuation, the backlight can remain on while the data writing process takes place because no pixels change state until after all the data has been written. The backlight is only turned off (if at all), during the much shorter time beginning after the last scan line is written to, and ending a sufficient time after the global actuation voltage is applied for the pixels to have changed states (approximately 10 microseconds to 500 microseconds).

An actuation event in the method 1000 is determined by noting the voltage differences that appear across the shutter-open actuator and the shutter closed actuator. Consistent with the actuation conditions described with respect to FIGS. 2, 3, and 4A, the polarities of applied voltages, such as $V_d$, can be either negative or positive, and the voltage applied to the global common interconnect can be any voltage either positive or negative.

In other implementations it is possible to apply the method 1000 of FIG. 10 to a selected portion of a whole array of pixels, since it may be advantageous to update different areas or groupings of rows and columns in series. In this case a number of different global actuation interconnects 914 could be routed to selected portions of the array for selectively updating and actuating different portions of the array.

In some implementations it is advantageous to periodically or occasionally reverse the sign of the voltages that appear across the actuators of shutter assembly 912 without otherwise altering the method 1000 of addressing the pixels. In one such case polarity reversal can be accomplished by reversing the signs of most of the potentials employed in Method 1000, with the exception of the write-enable voltage. In another cases voltages similar to those used in Method 1000 can be applied but with a complementary logic. Table 1 shows the differences between the nominal voltage assignments as described above for method 1000 and the voltages which could be applied in order to achieve polarity reversal on the electrodes of the shutter assemblies. In the first case, called Polarity Reversal Method 1, the voltages which appear across actuator electrodes are merely reversed in sign. Instead of applying $V_d$ to the shutter-open electrode, for instance, $-V_d$ would be applied. For the case where nMOS transistors are employed for the transistors 908*a* and 908*b*, however, a voltage shift should be employed (both gate voltages shifting down by an amount $V_d$). These gate voltage shifts ensure that the nMOS transistors operate correctly with the new voltages on the data interconnects.

TABLE 1

| Action: "Close the Shutter" | Method 1000 | Polarity Reversal Method 1 | Polarity Reveral Method 2 |
|---|---|---|---|
| Non-Enabled Row Voltage | ground | $-V_d$ | ground |
| Write-Enable Voltage | $V_{we}$ | $-V_d + V_{we}$ | $V_{we}$ |
| Voltage on shutter-closed interconnect | $V_d$ | $-V_d$ | ground |
| Voltage on shutter-open interconnect | ground | ground | $V_d$ |
| Maintenance Voltage | $V_m$ | $-V_m$ | $V_m$ |
| Global Actuation Voltage | $V_{ag}$ (near ground) | $-V_{ag}$ (near ground) | $V_d$ |

Table 1 also shows a second method, Polarity Reversal Method 2, which allows the use of similar voltages (without having to reverse signs on any interconnect drivers), but still achieves polarity reversal across all actuators. This is accomplished by driving the global actuation interconnect to the higher voltage, $V_d$, instead of toward ground as in Method 1000 in order to move selected shutters. The sequence of voltage changes in Polarity Reversal Method 2 is similar to that of Method 1000, except that a complementary logic is now employed at step 1004 when assigning voltages to the actuators of each pixel. In this Method 2, if the shutter is to be closed, then the shutter-open interconnect would be brought up to the potential $V_d$, while the shutter-closed interconnect would be grounded. In this example, after the global actuation interconnect is brought from its maintenance potential $V_m$ up to the actuation potential $V_d$, the potential across the shutter-open actuator would be near to zero (certainly less than $V_m$), while the potential across the shutter-closed actuator would be $-V_d$, sufficient to actuate the shutter to the closed position and with a polarity that is the reverse of what was applied in Method 1000. Similarly if, at step 1004, the shutter is to be opened then the shutter-closed interconnect would be brought up to the potential Vd while the shutter-open interconnect is grounded.

The control matrix 900 can alternate between the voltages used in Method 1000 and that used with the above Polarity Reversal Methods in every frame or on some other periodic basis. Over time, the net potentials applied across the actuators on shutter assemblies 1408 by the charge interconnect 1406 and the global actuation interconnect 1416 average out to about 0V.

Actuation methods, similar to method 1000, can also be applied to single-sided or elastic shutter assemblies, such as with shutter assemblies 502 in control matrix 500. Such single-sided applications will be illustrated in conjunction with FIG. 14 below.

Figure 11:
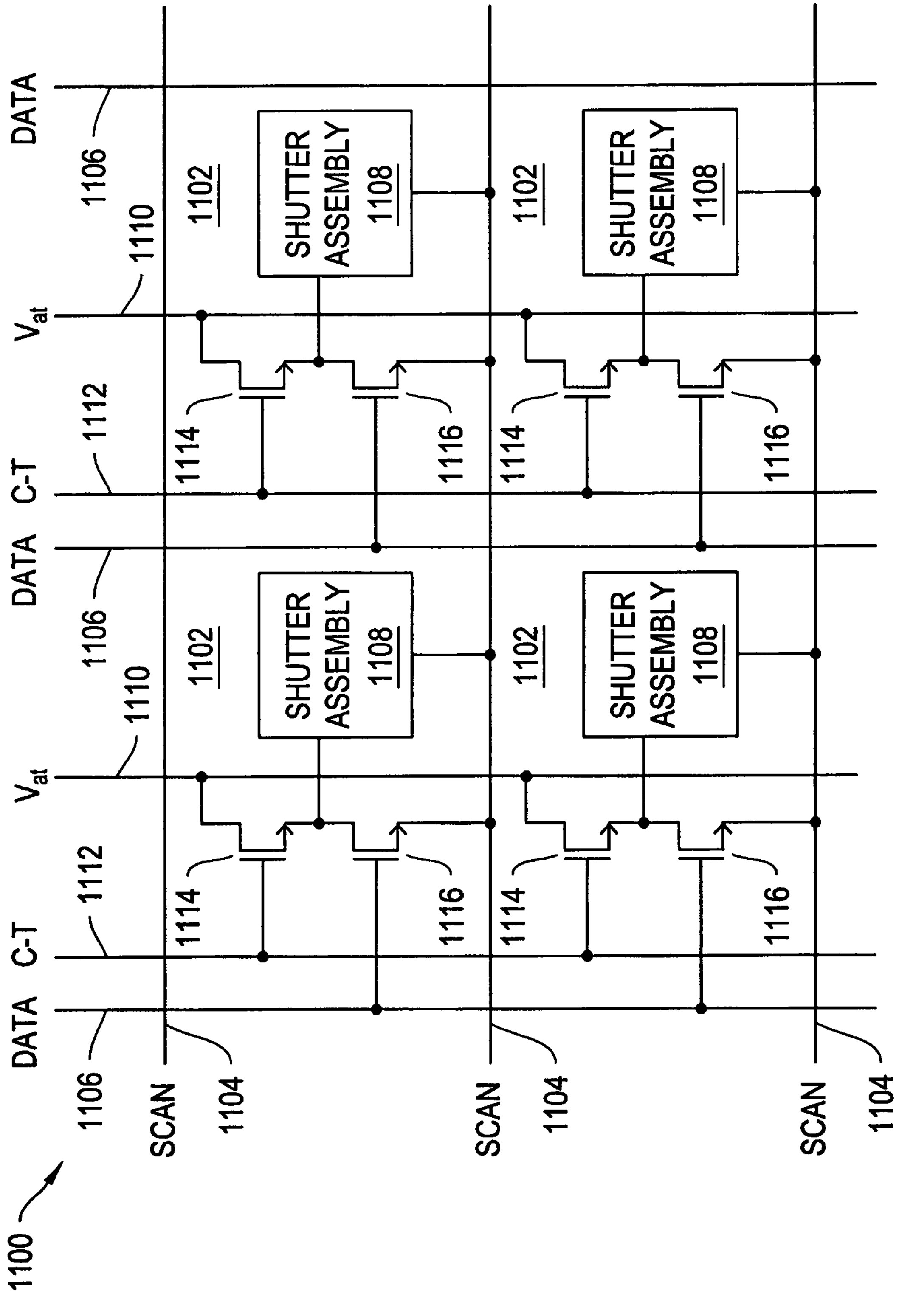
FIG. 11 is a diagram of a fifth control matrix suitable for controlling the shutter assemblies of the display apparatus of FIG. 1, according to an illustrative embodiment of the invention.

FIG. 11 is a diagram of another control matrix 1100 suitable for inclusion in the display apparatus 100. As with control matrices 700 and 900, the control matrix 1100 includes a series of scan-line interconnects 1104, with one scan-line interconnect 1104 corresponding to each row of pixels 1102 in the control matrix 1100. The control matrix 1100 includes a single data interconnect 1106 for each column of pixels 1102 in the control matrix. As such, the control matrix 1100 is suitable for controlling elastic shutter assemblies 1108, such as shutter assembly 200. As with actuator in shutter assembly 200, the actuators in the shutter assemblies 1108 in the control matrix 1100 have one higher-capacitance electrode and one lower-capacitance electrode.

In addition to the scan-line and data-interconnects 1104 and 1106, the control matrix 1100 includes a charge interconnect 1110 (also labeled as V(at)) and a charge trigger interconnect 1112 (also labeled as C-T). The charge interconnect 11100 and the charge trigger interconnect 1112 may be shared among all pixels 1102 in the control matrix 1100, or some subset thereof. For example, each column of pixels 1100 may share a common charge interconnect 1110 and a common charge trigger interconnect 1112. The following description assumes the incorporation of a globally shared charge interconnect 1110 and a globally common charge trigger interconnect 1112.

Each pixel 1102 in the control matrix 1100 includes two transistors, a charge trigger switch transistor 1114 and a discharge switch transistor 1116. The gate of the charge trigger switch transistor 1114 is electrically connected to the charge trigger interconnect 1112 of the control matrix 1100. The drain of the charge trigger switch transistor 1114 is electrically connected to the charge interconnect 1110. The charge interconnect 1110 receives a DC voltage sufficient to actuate the actuators of the shutter assembly 1108 in each pixel 1102, absent the application of any bias voltage to the scan line interconnect 1104. The source of the charge trigger switch transistor 1114 is electrically connected to the lower capacitance electrode of the actuator in the shutter assembly 1108 in the pixel 1102 and to the drain of the discharge switch transistor 1116. The gate of the discharge switch transistor 1116 is electrically connected to the data interconnect 1106 of the column of the control matrix 1100 in which the pixel 1102 is located. The source of the discharge switch transistor 1116 is electrically connected to the scan-line interconnect 1104 of the row of the control matrix 1100 in which the pixel 1102 is located. The higher-capacitance electrode of the actuator in the shutter assembly 1108 is also electrically connected to the scan-line interconnect 1104 of row corresponding to the pixel. Alternately, the higher capacitance electrode can be connected to a separate ground or common electrode.

Figure 12:
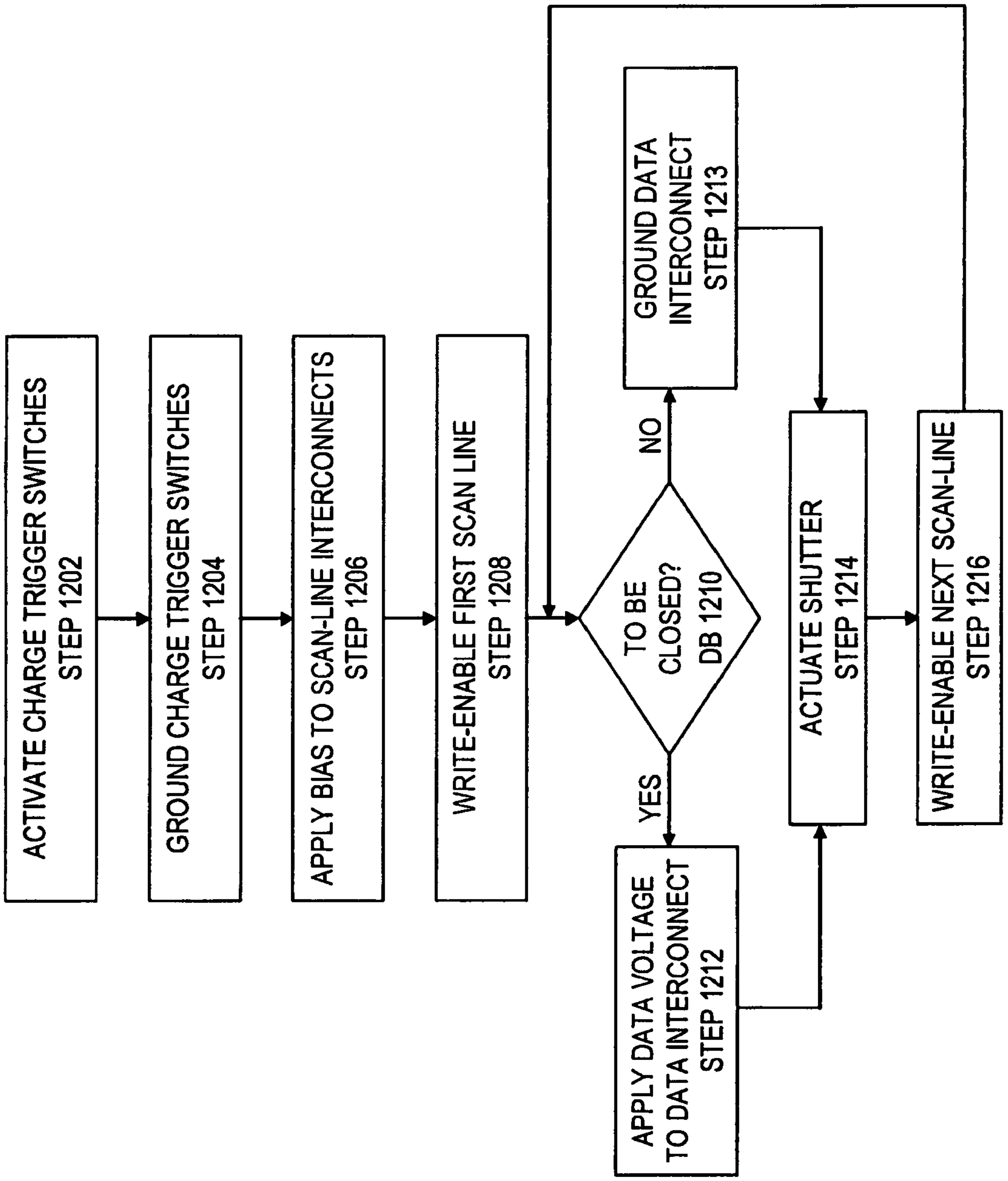
FIG. 12 is a flow chart of a method of addressing the pixels of the control matrix of FIG. 11, according to an illustrative embodiment of the invention.

FIG. 12 is a flow chart of a method 1200 of addressing the pixels incorporated into a control matrix, such as control matrix 1100, according to an illustrative embodiment of the invention. At the beginning of a frame addressing cycle, control matrix 1100 actuates all unactuated actuators of the shutter assemblies 1108 incorporated into the control matrix 1100, such that all shutter assemblies 1108 are set to the same position (open or closed) (steps 1202-1204). To do so, the control matrix 1100 applies a charge trigger voltage, e.g., 45V, to the charge trigger interconnect 1112, activating the charge trigger switch transistors 1114 of the pixels (step 1202). The electrodes of the actuators incorporated into the shutter assemblies 1108 of the pixels 1108 serve as capacitors for storing the voltage $V_{at}$ supplied over the charge interconnect 1110, e.g, 40V. The control matrix 1100 continues to apply the charge trigger voltage (step 1202) for a period of time sufficient for all actuators to actuate, and then the control matrix 1100 grounds the charge trigger switch transistor 1114 (step 1204). The control matrix 1100 applies a bias voltage $V_b$, e.g., 10V with respect to ground, to all scan-line interconnects 1104 in the control matrix 1100 (step 1206).

The control matrix 1100 then proceeds with the addressing of each pixel 1102 in the control matrix, one row at a time (steps 1208-1212). To address a particular row, the control matrix 1100 write-enables a first scan line by grounding the corresponding scan-line interconnect 1104 (step 1208). Then, at decision block 1210, the control matrix 1100 determines for each pixel 1102 in the write-enabled row whether the pixel 1102 needs to be switched out of its initial frame position. For example, if at step 1202, all shutters are opened, then at decision block 1210, it is determined whether each pixel 1102 in the write-enabled row is to be closed. If a pixel 1102 is to be closed, the control matrix 1100 applies a data voltage, for example 5V, to the data interconnect 1106 corresponding to the column in which that pixel 1102 is located (step 1212). As the scan-line interconnect 1104 for the write-enabled row is grounded (step 1208), the application of the data voltage $V_d$ to the data interconnect 1106 of the column results in a potential difference between the gate and the source of the discharge switch transistor 1116 of the correct sign and magnitude to open the channel of the transistor 1116. Once the channel of transistor 1116 is opened the charge stored in the shutter assembly actuator can be discharged to ground through the scan line interconnect 1104. As the voltage stored in the actuator of the shutter assembly 1108 dissipates, the restoring force or spring in the shutter assembly 1108 forces the shutter into its relaxed position, closing the shutter. If at decision block 1210, it is determined that no state change is necessary for a pixel 1102, the corresponding data interconnect 1106 is grounded. Although the relaxed position in this example is defined as the shutter-closed position, alternative shutter assemblies can be provided in which the relaxed state is a shutter-open position. In these alternative cases, the application of data voltage $V_d$, at step 1212, would result in the opening of the shutter.

In other implementations it is possible to apply the method 1200 of FIG. 12 to a selected portion of the whole array of pixels, since it may be advantageous to update different areas or groupings of rows and columns in series. In this case a number of different charge trigger interconnects 1112 could be routed to selected portions of the array for selectively updating and actuating different portions of the array.

As described above, to address the pixels 1102 in the control matrix 1100, the data voltage $V_d$ can be significantly less than the actuation voltage $V_{at}$ (e.g., 5V vs. 40V). Since the actuation voltage $V_{at}$ is applied once a frame, whereas the data voltage $V_d$ may be applied to each data interconnect 1106 as may times per frame as there are rows in the control matrix 1100, control matrices such as control matrix 1100 may save a substantial amount of power in comparison to control matrices which require a data voltage to be high enough to also serve as the actuation voltage.

For pixels 1102 in non-write-enabled rows, the bias voltage $V_b$ applied to their corresponding scan-line interconnects 1104 keeps the potential at their discharge transistor 1116 sources greater than the potentials at their discharge transistor 1116 gate terminals, even when a data voltage $V_d$ is applied to the data interconnect 1106 of their corresponding columns. It will be understood that the embodiment of FIG. 11 assumes the use of n-channel MOS transistors. Other embodiments are possible that employ p-channel transistors, in which case the relative signs of the bias potentials $V_b$ and $V_d$ would be reversed.

In other embodiments the discharge switch transistor 1116 can be replaced by a set of two or more transistors, for instance if the control matrix 1100 were to be built using standard CMOS technology the discharge switch transistor could be comprised of a complementary pair of nMOS and pMOS transistors.

The method 1200 assumes digital information is written into an image frame, i.e. where the shutters are intended to be either open or closed. Using the circuit of control matrix 1100, however, it is also possible to write analog information into the shutter assemblies 1108. In this case, the grounding of the scan line interconnects is provided for only a short and fixed amount of time and only partial voltages are applied through the data line interconnects 1106. The application of partial voltages to the discharge switch transistor 1116, when operated in a linear amplification mode, allows for only the partial discharge of the electrode of the shutter assembly 1108 and therefore a partial opening of the shutter.

The control matrix 1100 selectively applies the data voltage to the remaining columns of the control matrix 1100 at the same time. After all pixels have achieved their intended states (step 1214), the control matrix 1100 reapplies $V_b$ to the selected scan-line interconnect and selects a subsequent scan-line interconnect (step 1216). After all scan-lines have been addressed, the process begins again. As with the previously described control matrices, the activity of an attached backlight can be synchronized with the addressing of each frame.

Figure 13:
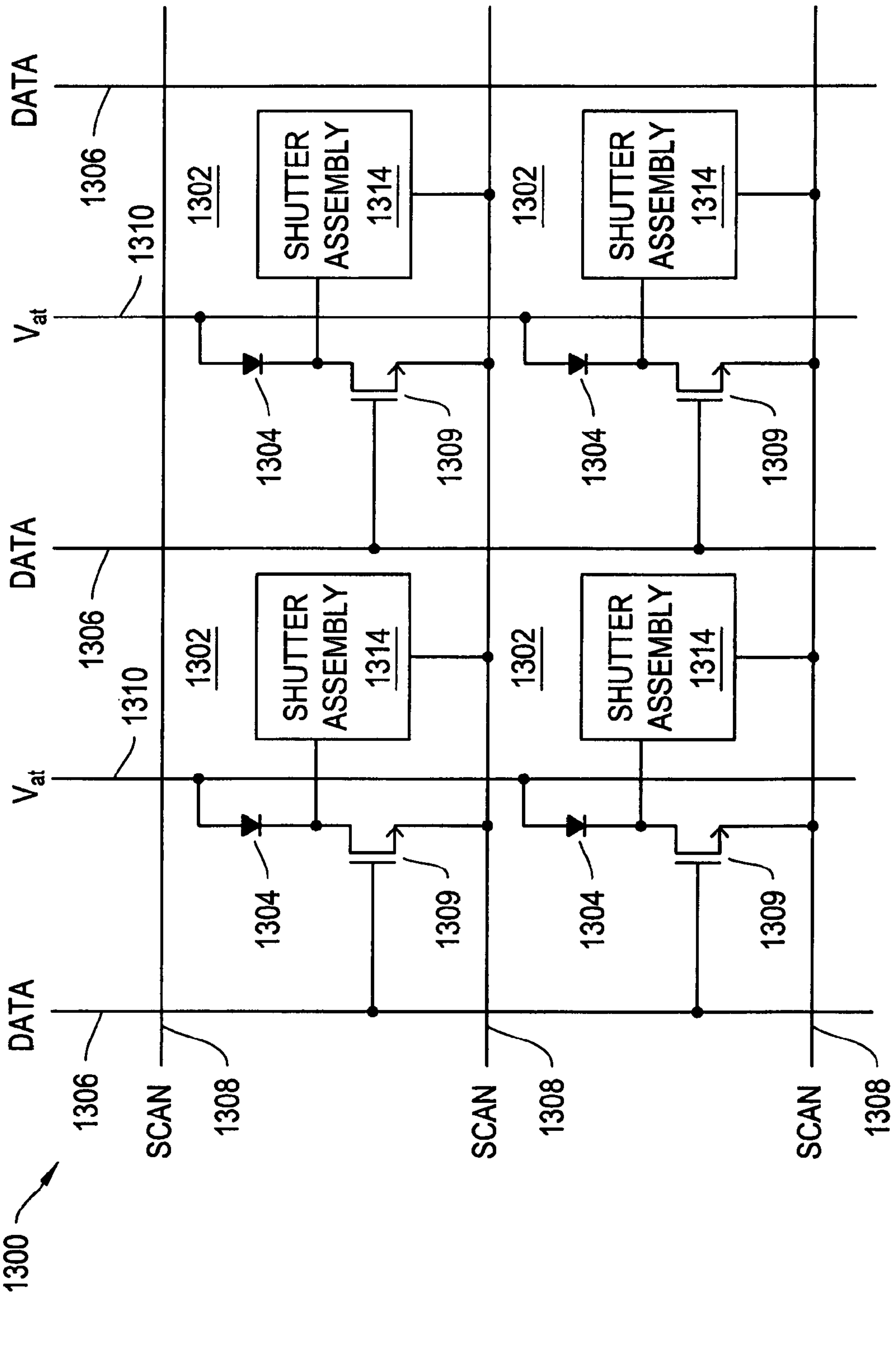
FIG. 13 is a diagram of a sixth control matrix suitable for controlling the shutter assemblies of the display apparatus of FIG. 1, according to an illustrative embodiment of the invention.

FIG. 13 is a diagram of another control matrix 1300 suitable for inclusion in the display apparatus 100, according to an illustrative embodiment of the invention. The control matrix 1300 is similar to control matrix 1100, though pixels 1302 in the control matrix 1300 include charge diodes 1304 as opposed to charge trigger switch transistors 1114, and the control matrix 1300 lacks a charge trigger interconnect 1112. More particularly, the control matrix 1300 includes one data interconnect 1306 for each column in the control matrix 1300 and one scan-line interconnect 1308 for each row in the control matrix 1300, and a discharge transistor 1309. The control matrix 1300 also includes a charge interconnect 1310 (also labeled as V(at)) similar to that incorporated into control matrix 1100.

The control matrix 1300 includes a actuation voltage source electrically connected to the charge interconnect 1310. The actuation voltage source supplies pulses of voltage at the beginning of each frame addressing cycle, allowing current to flow into the shutter assemblies 1314 of the pixels 1302 in the control matrix 1300 and thereby actuating any unactuated actuators in the shutter assemblies 1314. As a result, after the voltage pulse, all of the pixels 1302 in the control matrix 1300 are in the same state, open or closed. After the voltage pulse, when the potential of the charge interconnect 1310 has been reset to zero, the charge diode 1304 prevents the voltage stored in the shutter assemblies 1314 to be dissipated via the charge interconnect 1310. The control matrix 1300 can be controlled using a method similar to the pixel addressing method 1200. Instead of applying a voltage to the charge trigger interconnect 1112 at step 1202, the actuation voltage source supplies a voltage pulse having duration and magnitude sufficient to open any closed shutter assemblies.

It is preferable that the higher-capacitance electrode of shutter assemblies 1108 and 1314 be connected to the scan line interconnects 1104 and 1308, while the lower-capacitance electrode be connected through transistor 1114 or through diode 1304 to the charge interconnects 1112 or 1310. The voltage changes driven onto the shutter electrodes through the charge interconnects will generally be higher in magnitude than those experienced through the scan line interconnects.

Figure 14:
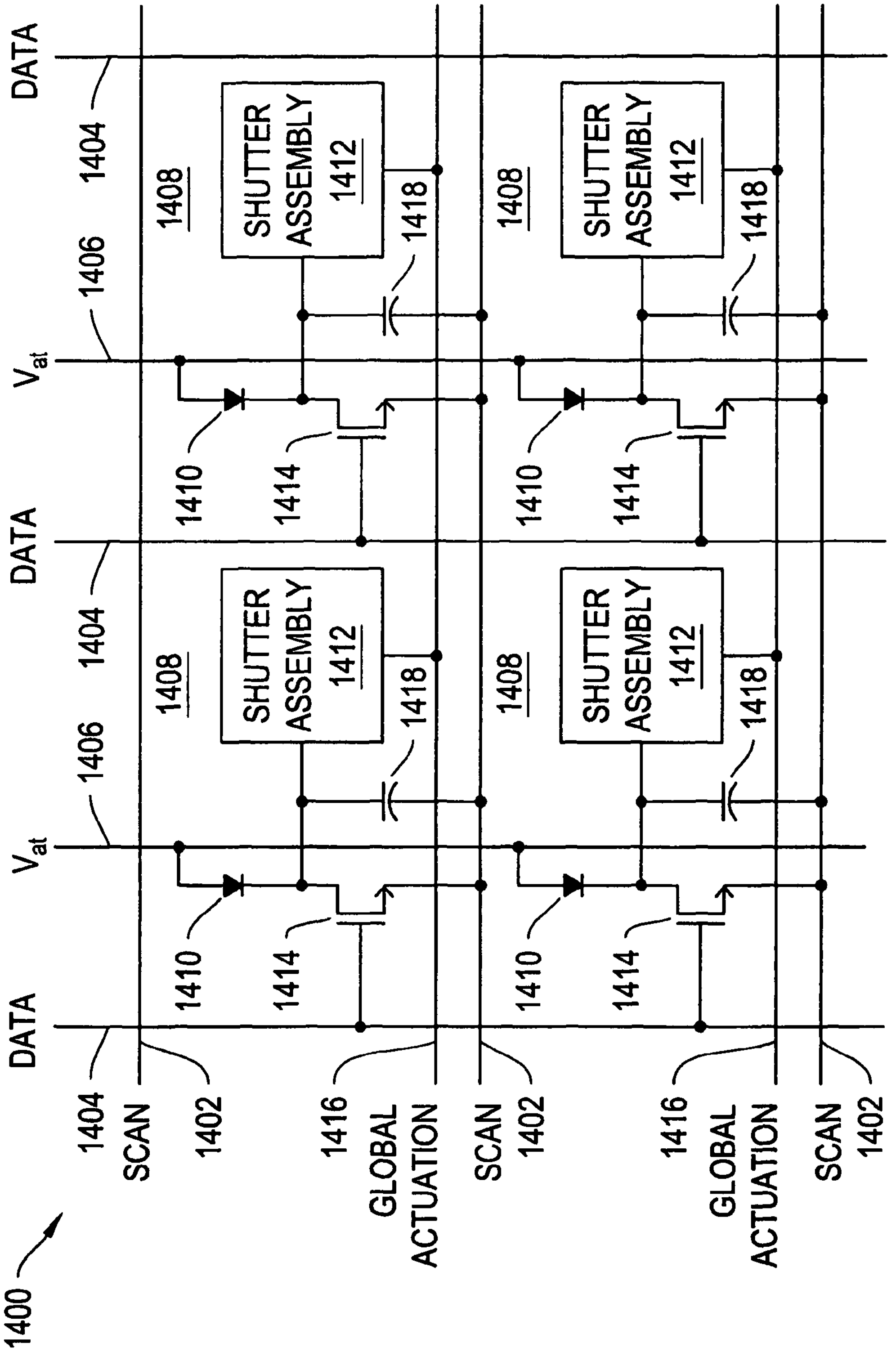
FIG. 14 is a diagram of a seventh control matrix suitable for controlling the shutter assemblies of the display apparatus of FIG. 1, according to an illustrative embodiment of the invention.

FIG. 14 is a diagram of a control matrix 1400 suitable for inclusion in the display apparatus 100. The control matrix 1400 includes the components of control matrix 1300, i.e., scan-line interconnects 1402, data-interconnects 1404, and a charge interconnect 1406. The pixels 1408 in the control matrix 1400 include a charge diode 1410, a shutter assembly 1412, and discharge transistor 1414. Control matrix 1400 also includes a global actuation interconnect 1416 for providing global actuation of the pixels 1408 in the control matrix 1400, using a method similar to that described in relation to FIGS. 9 and 10. The control matrix also includes an optional capacitor 1418, which is connected in parallel with the source and drain of the discharge transistor 1414. The capacitor helps maintain a stable voltage at one electrode of shutter assembly 1412 despite voltage changes which might be applied on the other electrode through the global actuation interconnect 1416 The interconnect 1416 is shared among pixels 1408 in multiple rows and multiple columns in the array.

The global actuation interconnect, if used in a mode similar to polarity reversal method 2 of Table 1, may be employed to ensure a 0V DC average mode of operation in addition to providing an actuation threshold voltage. To achieve 0V DC averaging, the control matrix alternates between control logics. In the first control logic, similar to that employed in the pixel addressing method 1000 and 1200, at the beginning of a frame addressing cycle, the control matrix 1400 opens the shutter assemblies 1412 of all pixels in the control matrix 1400 by storing $V_{at}$ across the electrodes of the shutter assembly 1412 actuator. The control matrix 1400 then applies a bias voltage to lock the shutter assemblies 1412 in the open state. Control matrix 1400 applies a bias voltage, e.g., ½ $V_{at}$, which is greater than $V_m$, via the global actuation interconnect 1416. Then, to change the state of a shutter assembly 1412, when the row of pixels 1408 in which the shutter assembly 1412 is located is write-enabled, the control matrix 1400 discharges the stored $V_{at}$ in the shutter assembly 1412. The maintenance voltage keeps the shutter assembly 1412 open until the global actuation interconnect 1416 is grounded.

In the second control logic, which is similar to the polarity reversal method 2 of Table 1, instead of the control matrix changing the voltage applied to the global actuation interconnect 1416 from ½ $V_{at}$ to ground, the control matrix changes the voltage applied to the global actuation interconnect 1416 from ½ $V_{at}$ to $V_{at}$. Thus, to release a shutter in a shutter assembly 1412 to its relaxed state, the voltage applied via the charge diode 1410 must be maintained, as opposed to discharged. Therefore, in the second control logic, the control matrix 1400 discharges the stored $V_{at}$ from shutter assemblies that are to remain open, as opposed to those that are closed. The control matrix 1400 can alternate between the control logics every frame or on some other periodic basis. Over time, the net potentials applied across the actuators of the shutter assemblies 1408 by the charge interconnect 1406 and the global actuation interconnect 1416 average out to 0V.

Figure 15:
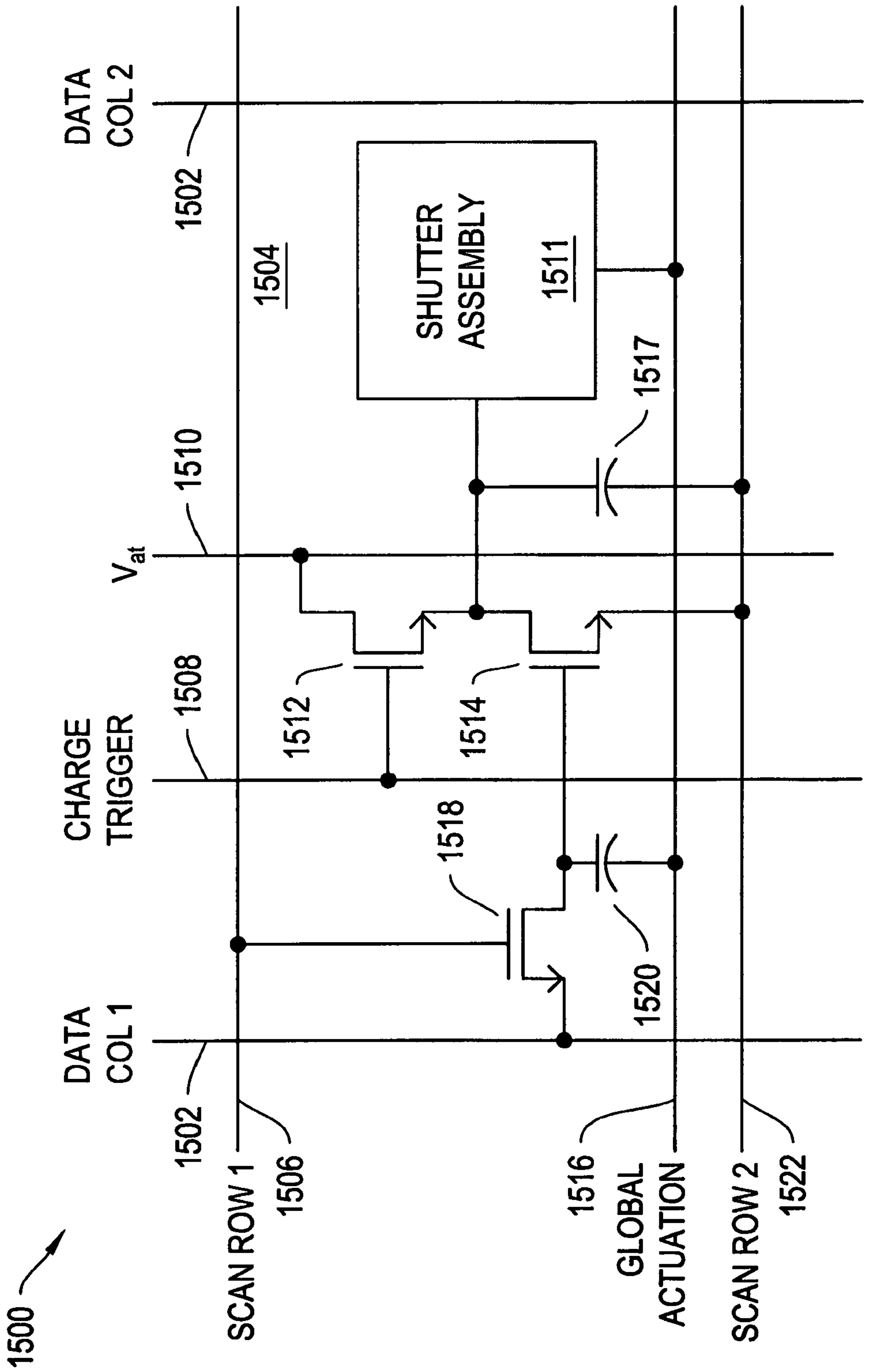
FIG. 15 is a diagram of an eighth control matrix suitable for controlling the shutter assemblies of the display apparatus of FIG. 1, according to an illustrative embodiment of the invention.

FIG. 15 is a diagram of still another suitable control matrix 1500 for inclusion in the display apparatus 100, according to an illustrative embodiment of the invention. The control matrix 1500 is similar to the control matrix 1100 of FIG. 11. Control matrix 1500 includes a data interconnect 1502 for each column of pixels 1504 in the control matrix 1500 and a scan-line interconnect 1506 for each row of pixels 1504 in the control matrix 1500. The control matrix 1500 includes a common charge trigger interconnect 1508 and a common charge interconnect 1510. The pixels 1504 in the control matrix 1500 each include an elastic shutter assembly 1511, a charge trigger switch transistor 1512 and a discharge switch transistor 1514, as described in FIG. 11. Control matrix 1500 also incorporates a global actuation interconnect 1516 and its corresponding functionality described in FIG. 9 in relation to control matrix 900. Control matrix 1500 also incorporates an optional voltage stabilizing capacitor 1517 which is connected in parallel with the source and drain of discharge switch transistor 1514.

Each pixel 1504 of control matrix 1500, also includes a third transistor, a write-enable transistor 1518, and a data store capacitor 1520. The scan-line interconnect 1506 for a row of pixels 1504 connects to the gates of the write-enable transistor 1518 incorporated into each pixel 1504 in the row. The data interconnects 1502 for the columns of the control matrix 1500 electrically connect to the source terminals of the write-enable transistors 1518 of the pixels 1504 in the column. The drain of the write-enable transistors 1518 in each pixel 1504 electrically connect in parallel to the data store capacitor 1520 and the gate terminal of the discharge trigger transistor 1514 of the respective pixels 1504.

The operation of the control matrix 1500 includes elements in common with each of the methods 1000 and 1200. At the beginning of an frame addressing cycle, a voltage is applied to the charge trigger interconnect 1508 and the charge interconnect 1510 of the control matrix 1500 to build up a potential, $V_{at}$, on one shutter assembly 1511 actuator electrode of each pixel 1504 in the control matrix 1500 to open any closed shutter assemblies 1511. These steps are similar to those performed in steps 1202 and 1204 of FIG. 12. Each row is then write-enabled in sequence, except instead of performing the write-enable as a grounding of corresponding scan-line interconnects as was done with respect to FIGS. 11, 13, and 14, the control matrix 1500 applies a write-enabling voltage $V_{we}$ to the scan-line interconnect 1506 corresponding to each row. While a particular row of pixels 1504 is write-enabled, the control matrix 1500 applies a data voltage to each data interconnect 1508 of the control matrix 1500 corresponding to a column that incorporates a pixel 1502 in the write-enabled row that is to be closed. The application of $V_{we}$ to the scan-line interconnect 1506 for the write-enabled row turns on the write-enable transistors 1518 of the pixels 1504 in the corresponding scan line. The voltages applied to the data interconnects 1502 are thereby allowed to be stored on the data store capacitors 1520 of the respective pixels 1504.

If the voltage stored on the data store capacitor 1520 of a pixel 1504 is sufficiently greater than ground, e.g., 5V, the discharge switch transistor 1514 is activated, allowing the charge applied to the corresponding shutter assembly 1511 via the charge trigger switch transistor 1514 to discharge. The discharge of the larger voltage, $V_{at}$, stored in the shutter assembly 1511, however, can take more time than is needed to store the relatively small data voltage on the data store capacitor 1520. By storing the data voltage on the data store capacitor 1520, the discharge and the mechanical actuation process can continue even after the control matrix 1500 grounds the scan-line interconnect 1506, thereby isolating the charge stored on the capacitor 1520 from its corresponding data interconnect 1502. In contrast to the discharge process presented by the control matrices in FIGS. 11, 13, and 14, therefore, the control matrix 1500 regulates the discharge switch 1514 (for controlling application of the actuation voltage $V_{at}$ on shutter assembly 1511) by means of data voltage which is stored on the capacitor 1520, instead of requiring real time communication with signals on the data interconnect 1502.

In alternative implementations, the storage capacitor 1520 and write-enable transistor 1518 can be replaced with alternative data memory circuits, such as a DRAM or SRAM circuits known in the art.

In contrast to the circuits shown in FIGS. 11, 13, and 14, the charge on the electrodes of shutter assembly 1511, when discharged, does not flow to ground by means of the scan line interconnect that corresponds to pixel 1504. Instead the source of the discharge switch transistor 1514 is connected to the scan line interconnect 1522 of the pixel in the row below it. When not write-enabled the scan line interconnects 1522 in control matrix 1500 are held at or near to the ground potential; they can thereby function as effective sinks for discharge currents in neighboring rows.

The control matrix 1500 also includes the capability for global actuation, the process or method of which is similar to that described in FIG. 10. The shutters in discharged pixels 1504 are kept in position due to the application of a maintenance voltage $V_m$, e.g., ½ $V_{at}$, to the global actuation interconnect 1516. After all rows have been addressed, the control matrix 1500 grounds the global actuation interconnect 1516, thereby releasing the shutters of all discharged shutter assemblies 1511 substantially in unison.

Figure 16A:
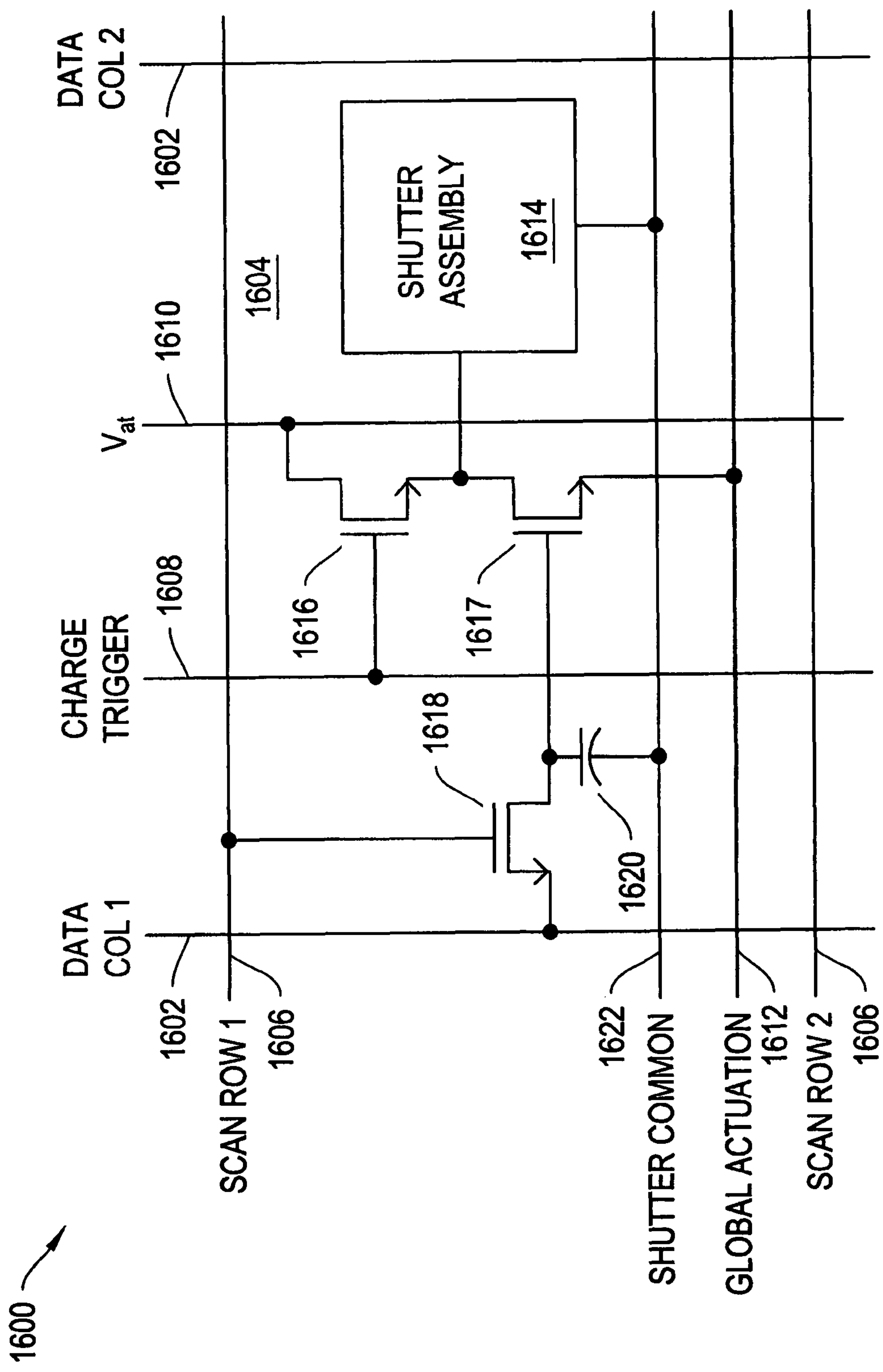
FIG. 16A is a diagram of a ninth control matrix suitable for controlling the shutter assemblies of the display apparatus of FIG. 1, according to an illustrative embodiment of the invention.

FIG. 16A is a diagram of still another suitable control matrix 1600 for inclusion in the display apparatus 100, according to an illustrative embodiment of the invention. The control matrix 1600 is similar to the control matrix 1500 of FIG. 15. Control matrix 1600 includes a data interconnect 1602 for each column of pixels 1604 in the control matrix 1600, a scan-line interconnect 1606 for each row of pixels 1604 in the control matrix 1600. The control matrix 1600 includes a common charge trigger interconnect 1608, a common charge interconnect 1610, and a global actuation interconnect 1612. The pixels 1604 in the control matrix 1600 each include an elastic shutter assembly 1614, a charge trigger switch transistor 1616, a discharge switch transistor 1617, a write-enable transistor 1618, and a data store capacitor 1620 as described in FIG. 15. The control matrix 1600 also includes a shutter common interconnect 1622 which is distinct from the global actuation interconnect 1612. These interconnects 1612 and 1622 are shared among pixels 1604 in multiple rows and multiple columns in the array.

In operation the control matrix 1600 performs the same functions as those of control matrix 1500, but by different means or methods. Most particularly, the method for accomplishing global actuation in control matrix 1600 is unique from that performed in control matrices 900, 1400, or 1500. In the previous methods, the global actuation interconnect was connected to one electrode of the shutter assembly, and applying a maintenance voltage $V_m$ to it prevented shutter actuation. In control matrix 1600, however, the global actuation interconnect 1612 is connected to the source of the discharge switch transistor 1617. Maintaining the global actuation interconnect 1612 at a potential significantly above that of the shutter common interconnect 1622 prevents the turn-on of any of the discharge switch transistors 1617, regardless of what charge is stored on capacitor 1620. Global actuation in control matrix 1600 is achieved by bringing the potential on the global actuation interconnect 1612 to the same potential as the shutter common interconnect 1622, making it possible for those discharge switch transistors 1617*s* to turn-on in accordance to the whether a data voltage has been stored on capacitor 1620 or not. Control matrix 1600, therefore, does not depend on electrical bi-stability in the shutter assembly 1614 in order to achieve global actuation.

Applying partial voltages to the data store capacitor 1620 allows partial turn-on of the discharge switch transistor 1617 during the time that the global actuation interconnect 1612 is brought to its actuation potential. In this fashion, an analog voltage is created on the shutter assembly 1614, for providing analog gray scale.

In the control matrix 1600, in contrast to control matrix 1500, the higher-capacitance electrode of the actuators in the shutter assemblies 1614 electrically connect to the shutter common interconnect 1622, instead of the global actuation interconnect 1612. In operation, the control matrix alternates between two control logics as described in relation to control matrix 1400 of FIG. 14. For control matrix 1600, however, when the control matrix switches between the control logics, the control matrix 1600 switches the voltage applied to the shutter common interconnect 1622 to either ground or $V_{at}$, depending on the selected control logic, instead of switching the global actuation voltage applied to the global actuation interconnect, as is done by control matrix 1400.

As in the control matrix 1300 of FIG. 13, a simple diode and/or an MIM diode can be substituted for the charge trigger transistor 1616 to perform the switching or charge loading function for each pixel in the array.

Figure 16B:
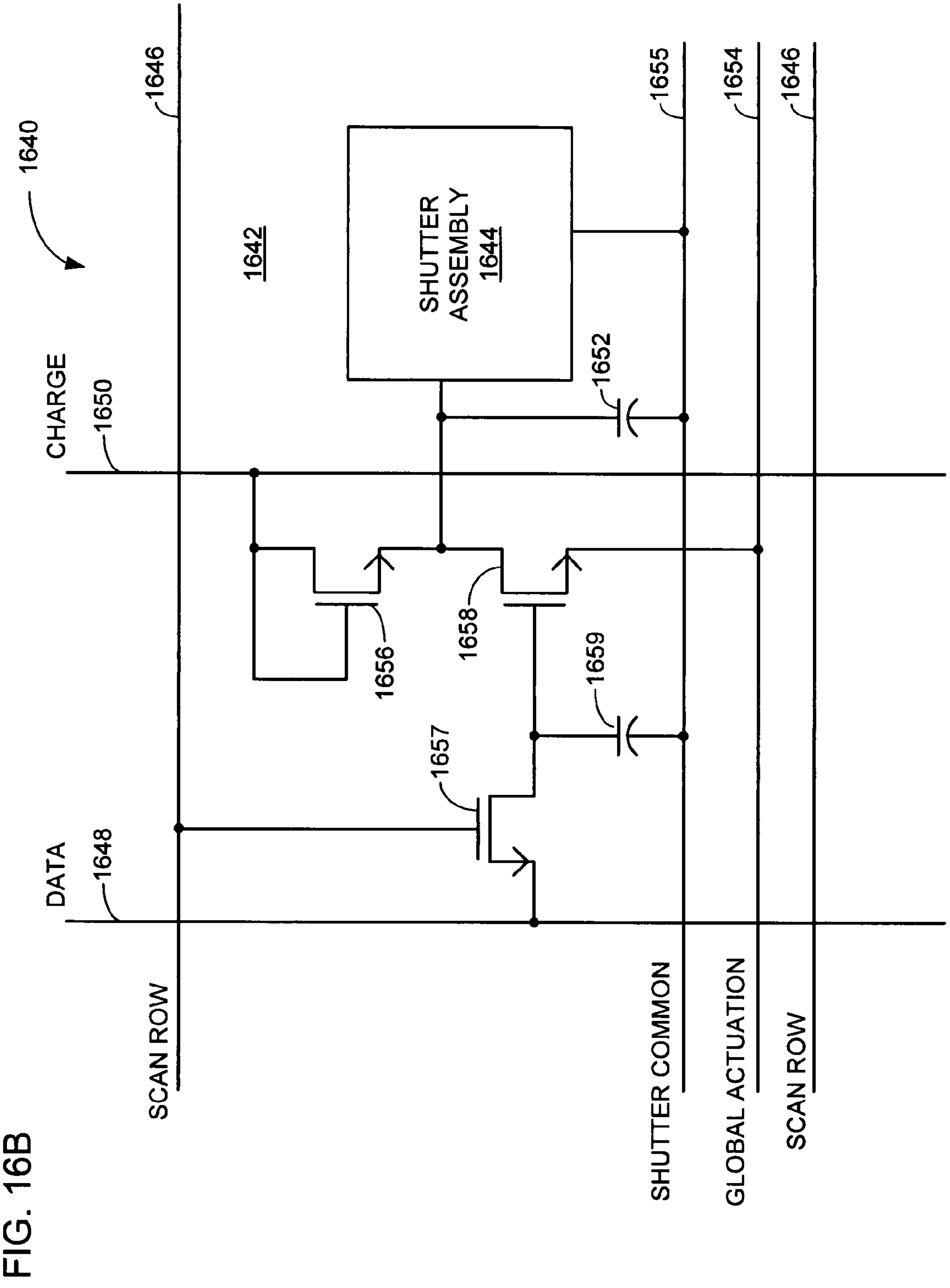
FIG. 16B is a diagram of a tenth control matrix suitable for controlling the shutter assemblies of the display apparatus of FIG. 1, according to an illustrative embodiment of the invention.

FIG. 16B is yet another suitable control matrix 1640 for inclusion in the display apparatus 100, according to an illustrative embodiment of the invention. Control matrix 1640 controls an array of pixels 1642 that include elastic shutter assemblies. The control matrix 1640 includes a single data interconnect 1648 for each column of pixels 1642 in the control matrix. As such, the control matrix 1640 is suitable for controlling elastic shutter assemblies 1644, such as shutter assembly 200. The actuators in the shutter assemblies 1644 can be made either electrically bi-stable or mechanically bi-stable.

The control matrix 1640 includes a scan-line interconnect 1646 for each row of pixels 1642 in the control matrix 1640. The control matrix 1640 further includes a charge interconnect 1650, and a global actuation interconnect 1654, and a shutter common interconnect 1655. These interconnects 1650, 1654 and 1655 are shared among pixels 1642 in multiple rows and multiple columns in the array. In one implementation (the one described in more detail below), the interconnects 1650, 1654, and 1655 are shared among all pixels 1642 in the control matrix 1640.

Figure 19:
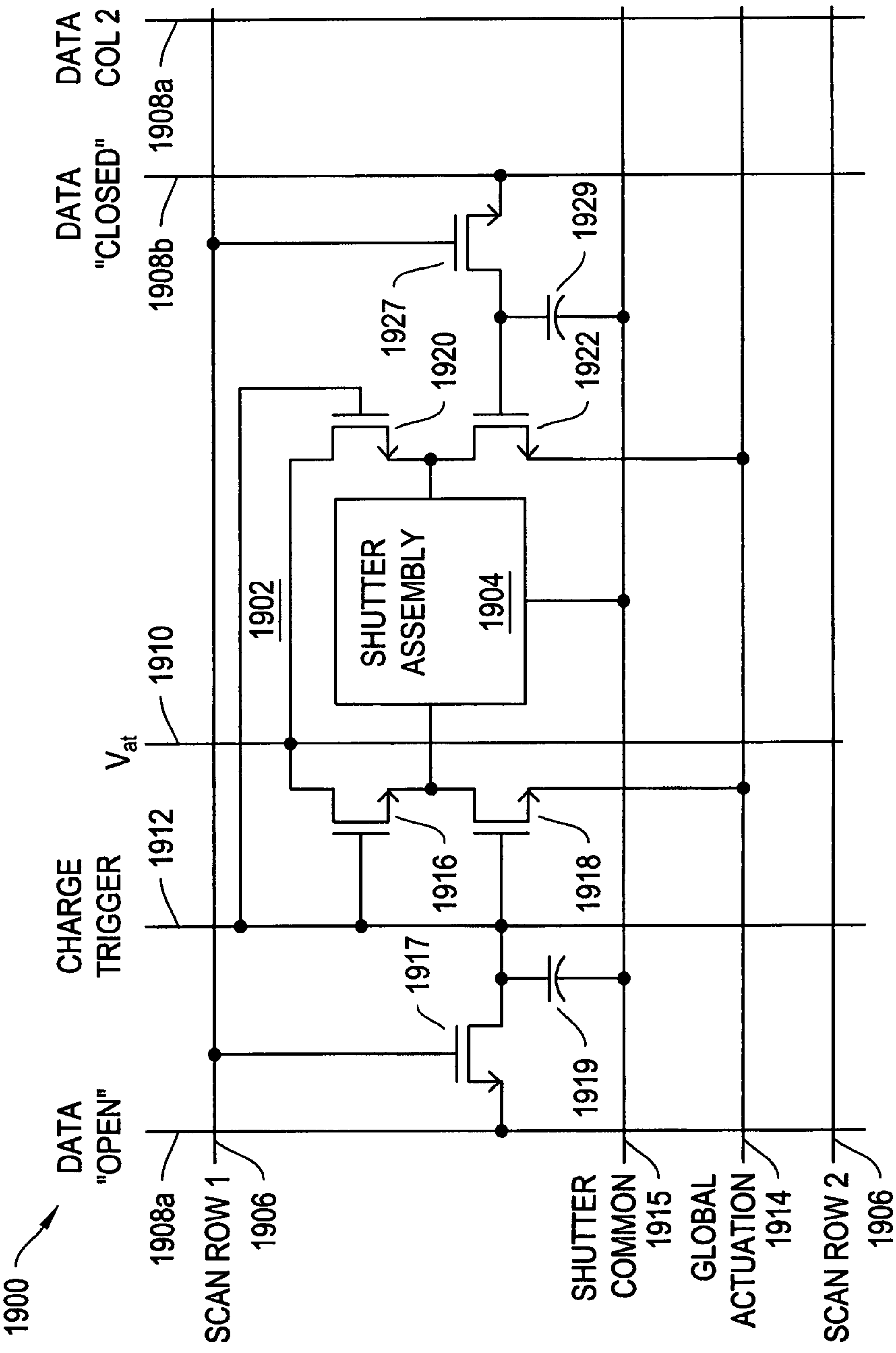
FIG. 19 is a diagram of a thirteenth control matrix suitable for controlling the shutter assemblies of the display apparatus of FIG. 1, according to an illustrative embodiment of the invention

Each pixel 1642 in the control matrix includes a shutter charge transistor 1656, a shutter discharge transistor 1658, a shutter write-enable transistor 1657, and a data store capacitor 1659, as described in FIGS. 16A and 19. Control matrix 1640 also incorporates an optional voltage stabilizing capacitor 1652 which is connected in parallel with the source and drain of discharge switch transistor 1658.

By comparison to control matrix 1600, the charging transistor 1656 is wired with a different circuit connection to the charge interconnect 1650. Control matrix 1640 does not include a charge trigger interconnect which is shared among pixels. Instead, the gate terminals of the charging transistor 1656 are connected directly to the charge interconnect 1650, along with the drain terminal of transistor 1656. In operation, the charging transistors 1656 operate essentially as diodes, they can pass a current in only 1 direction. Their function in the charging circuit becomes equivalent to that of diode 1410 in control circuit 1400 of FIG. 14.

At the beginning of each frame addressing cycle the control matrix 1640 applies a voltage pulse to the charge interconnect 1650, allowing current to flow through charging transistor 1656 and into the shutter assemblies 1644 of the pixels 1642. After this charging pulse, each of the shutter electrodes of shutter assemblies 1644 will be in the same voltage state. After the voltage pulse, the potential of charge interconnect 1650 is reset to zero, and the charging transistors 1656 will prevent the charge stored in the shutter assemblies 1644 from being dissipated through charge interconnect 1650. The charge interconnect 1650, in one implementation, transmits a pulsed voltage equal to or greater than $V_{at}$, e.g., 40V.

Each row is then write-enabled in sequence, as was described with respect to control matrix 1500 of FIG. 15. While a particular row of pixels 1642 is write-enabled, the control matrix 1640 applies a data voltage to the data interconnect 1648 corresponding to each column of pixels 1642 in the control matrix 1640. The application of $V_{we}$ to the scan-line interconnect 1646 for the write-enabled row turns on the write-enable transistor 1657 of the pixels 1642 in the corresponding scan line. The voltages applied to the data interconnect 1648 is thereby caused to be stored on the data store capacitor 1659 of the respective pixels 1642.

In control matrix 1640 the global actuation interconnect 1654 is connected to the source of the shutter discharge switch transistor 1658. Maintaining the global actuation interconnect 1654 at a potential significantly above that of the shutter common interconnect 1655 prevents the turn-on of the discharge switch transistor 1658, regardless of what charge is stored on the capacitor 1659. Global actuation in control matrix 1640 is achieved by bringing the potential on the global actuation interconnect 1654 to ground or to substantially the same potential as the shutter common interconnect 1655, enabling the discharge switch transistor 1658 to turn-on in accordance to the whether a data voltage has been stored on capacitor 1659. Control matrix 1640, therefore, does not depend on electrical bi-stability in the shutter assembly 1644 in order to achieve global actuation.

Applying partial voltages to the data store capacitor 1659 allows partial turn-on of the discharge switch transistor 1658 during the time that the global actuation interconnect 1654 is brought to its actuation potential. In this fashion, an analog voltage is created on the shutter assembly 1644, for providing analog gray scale.

Figure 16C:
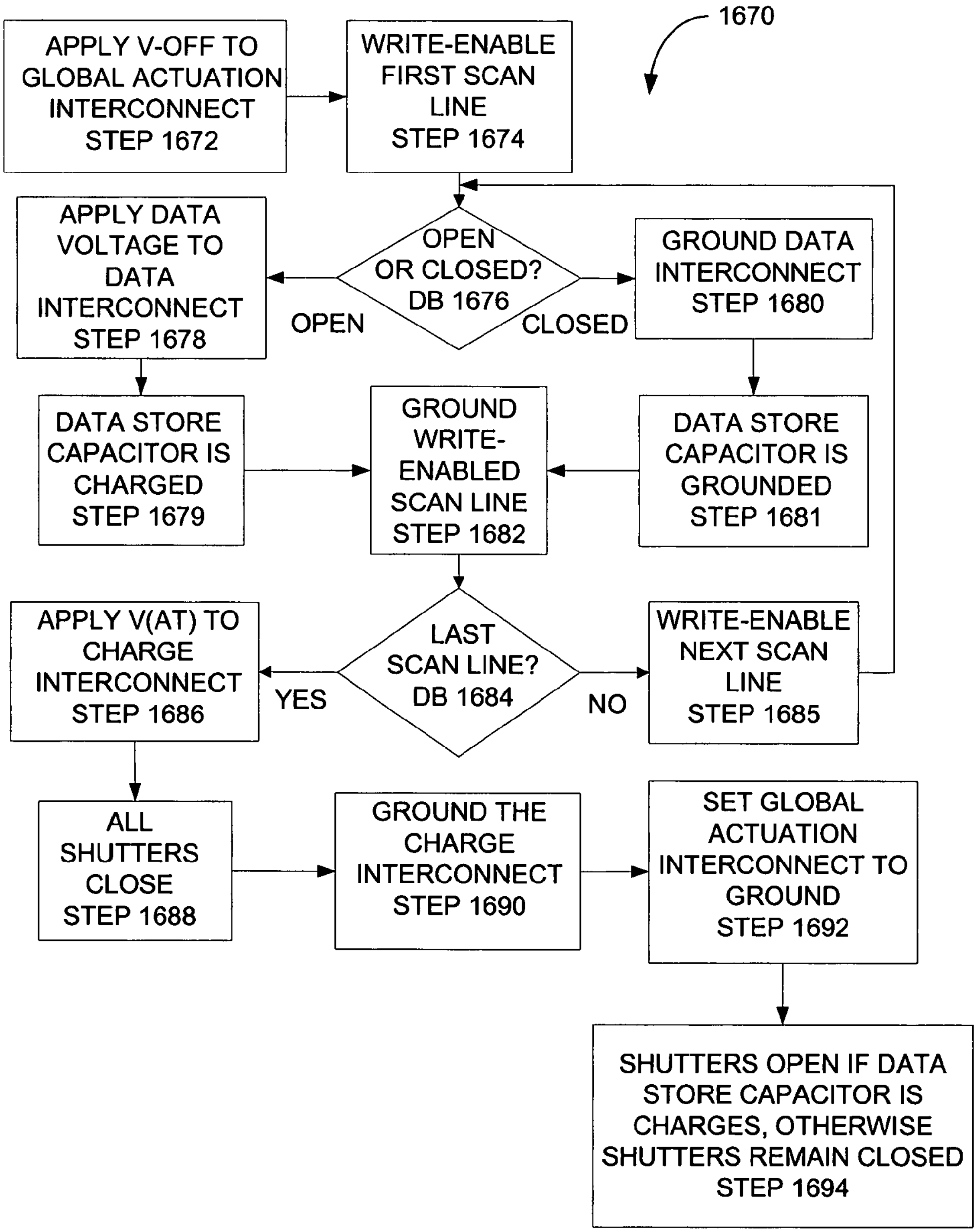
FIG. 16C is a flow chart of a method of addressing the pixels of the control matrix of FIG. 16B, according to an illustrative embodiment of the invention.

An alternative method of addressing pixels in control matrix 1640 is illustrated by the method 1670 shown in FIG. 16C. The method 1670 proceeds in three general steps. First the matrix is addressed row by row by storing data into the data store capacitors 1659. Next all actuators are actuated (or reset) simultaneously (step 1688) be applying a voltage $V_{at}$ to the charge interconnect 1650. And finally the image is set in a global actuation step 1692 by selectively activating transistors 1658 by means of the global actuation interconnect 1654.

In more detail, the frame addressing cycle of method 1670 begins when a voltage $V_{off}$ is applied to the global actuation interconnect 1654 (step 1672). The voltage $V_{off}$ on interconnect 1654 is designed to ensure that the discharge transistor 1658 will not turn on regardless of whether a voltage has been stored on capacitor 1659.

The control matrix 1640 then proceeds with the addressing of each pixel 1642 in the control matrix, one row at a time (steps 1674-1684). To address a particular row, the control matrix 1640 write-enables a first scan line by applying a voltage $V_{we}$ to the corresponding scan-line interconnect 1646 (step 1674). Then, at decision block 1676, the control matrix 1640 determines for each pixel 1642 in the write-enabled row whether the pixel 1642 needs to be open or closed. For example, if at the reset step 1688 all shutters are to be (temporarily) closed, then at decision block 1676 it is determined for each pixel 1642 in the write-enabled row whether or not the pixel is to be (subsequently) opened. If a pixel 1642 is to be opened, the control matrix 1640 applies a data voltage $V_d$, for example 5V, to the data interconnect 1648 corresponding to the column in which that pixel 1642 is located (step 1678). The voltage $V_d$ applied to the data interconnect 1648 is thereby caused to be stored by means of a charge on the data store capacitor 1659 of the selected pixel 1642 (step 1679). If at decision block 1676, it is determined that a pixel 1642 is to be closed, the corresponding data interconnect 1648 is grounded (step 1680). Although the relaxed position in this example is defined as the shutter-open position, alternative shutter assemblies can be provided in which the relaxed state is a shutter-closed position. In these alternative cases, the application of data voltage $V_d$, at step 1678, would result in the closing of the shutter.

The application of $V_{we}$ to the scan-line interconnect 1646 for the write-enabled row turns on all of the write-enable transistors 1657 for the pixels 1642 in the corresponding scan line. The control matrix 1640 selectively applies the data voltage to all columns of a given row in the control matrix 1640 at the same time while that row has been write-enabled. After all data has been stored on capacitors 1659 in the selected row (steps 1679 and 1681), the control matrix 1640 grounds the selected scan-line interconnect (step 1682) and selects a subsequent scan-line interconnect for writing (step 1685). After the information has been stored in the capacitors for all the rows in control matrix 1640, the decision block 1684 is triggered to begin the global actuation sequence.

The actuation sequence begins at step 1686 of method 1670, with the application of an actuation voltage $V_{at}$, e.g. 40 V, to the charge interconnect 1650. As a consequence of step 1686, the voltage $V_{at}$ is now imposed simultaneously across all the actuators of all the shutter assemblies 1644 in control matrix 1640. The control matrix 1640 continues to apply the voltage $V_{at}$ (step 1686) for a period of time sufficient for all actuators to actuate into an initial state (step 1688). For the example given in method 1670, step 1688 acts to reset and close all actuators. Alternatives to the method 1670 are possible, however, in which the reset step 1688 acts to open all shutters. At the next step 1690 the control matrix grounds the charge interconnect 1650. A voltage, at least greater than a maintenance voltage $V_m$, remains stored across the capacitor 1652, thereby holding the shutters in position. The electrodes on the actuators in shutter assembly 1644 provide a capacitance which also stores a charge after the charge interconnect 1650 has been grounded, useful for those embodiments in which capacitor 1652 is not included.

After all actuators have been actuated and held in their closed position by voltage in excess of $V_m$, the data stored in capacitors 1659 can now be utilized to set an image in control matrix 1640 by selectively opening the specified shutter assemblies (steps 1692 and 1694). First, the potential on the global actuation interconnect 1654 is set to substantially the same potential as the shutter common interconnect 1655 (step 1692). Step 1692 makes it possible for the discharge switch transistor 1658 to turn-on in accordance to whether a data voltage has been stored on capacitor 1659. For those pixels in which a voltage has been stored on capacitor 1659, the charge which was stored on the actuator of shutter assembly 1644 is now allowed to dissipate through the global actuation interconnect 1654. At step 1694, therefore, selected shutters are discharged through transistor 1658 and allowed to return by means of a restoring force or spring into their relaxed position. For the example given in method 1670, a discharge into the relaxed position means that the selected shutter assemblies 1644 are placed in their open position. For pixels where no voltage was stored on capacitor 1659, the transistor 1658 remains closed at step 1694, no discharge will occur and the shutter assembly 1644 remains closed.

To set an image in a subsequent video frame, the process begins again at step 1672.

In the method 1670, all of the shutters are closed simultaneously during the time between step 1688 and step 1694, a time in which no image information can be presented to the viewer. The method 1670, however, is designed to minimize this dead time (or reset time) by making use of data store capacitors 1659 and global actuation interconnect 1654 to provide timing control over the transistors 1658. By the action of step 1672, all of the data for a given image frame can be written to the capacitors 1659 during the addressing sequence (steps 1674-1685), without any immediate actuation effect on the shutter assemblies. The shutter assemblies 1644 remain locked in the positions they were assigned in the previous image frame until addressing is complete and they are uniformly actuated or reset at step 1688. The global actuation step 1692 allows the simultaneous transfer of data out of the data store capacitors 1659 so that all shutter assemblies can be brought into their next addressed image state at the same time.

As with the previously described control matrices, the activity of an attached backlight can be synchronized with the addressing of each frame. To take advantage of the minimal dead time offered in the addressing sequence of method 1670, a command to turn the illumination off can be given between step 1684 and step 1686. The illumination can then be turned-on again after step 1694. In a field-sequential color scheme, a lamp with one color can be turned off after step 1684 while a lamp with either the same or a different color is turned on after step 1694.

In other implementations it is possible to apply the method 1670 of FIG. 16C to a selected portion of the whole array of pixels, since it may be advantageous to update different areas or groupings of rows and columns in series. In this case a number of different charge interconnects 1650 and global actuation interconnects 1654 could be routed to selected portions of the array for selectively updating and actuating different portions of the array.

As described above, to address the pixels 1642 in the control matrix 1640, the data voltage $V_d$ can be significantly less than the actuation voltage $V_{at}$ (e.g., 5V vs. 40V). Since the actuation voltage $V_{at}$ is applied once a frame, whereas the data voltage $V_d$ may be applied to each data interconnect 1648 as may times per frame as there are rows in the control matrix 1640, control matrices such as control matrix 1640 may save a substantial amount of power in comparison to control matrices which require a data voltage to be high enough to also serve as the actuation voltage.

It will be understood that the embodiment of FIG. 16B assumes the use of n-channel MOS transistors. Other embodiments are possible that employ p-channel transistors, in which case the relative signs of the bias potentials $V_{at}$ and $V_d$ would be reversed.

The method 1670 assumes digital information is written into an image frame, i.e. where the shutters are intended to be either open or closed. Using the circuit of control matrix 1640, however, it is also possible to write analog information into the shutter assemblies 1644. In this case, the grounding of the scan line interconnects is provided for only a short and fixed amount of time and only partial voltages are applied through the data line interconnects 1648. The application of partial voltages to the discharge switch transistor 1658, when operated in a linear amplification mode, allows for only the partial discharge of the electrode of the shutter assembly 1644 and therefore a partial opening of the shutter.

In operation, in order to periodically reverse the polarity of voltages supplied to the shutter assembly 1644, the control matrix alternates between two control logics, as described in relation to control matrix 1400 of FIG. 14. In the first control logic, at step 1686 in the addressing cycle, the control matrix 1640 closes the shutter assemblies 1644 of all pixels in the control matrix 1640 by storing $V_{at}$ across the electrodes of the shutter assembly 1644 actuator. The potential on the shutter common interconnect 1655 is held at ground.

In the second control logic, which is similar to the polarity reversal method 2 of Table 1 described with respect to FIG. 10, the potential of the shutter common interconnect 1655 is set instead to the actuation voltage $V_{at}$. At steps 1686 and 1688, where the voltage on the charge interconnect 1650 is set to $V_{at}$, all shutters are instead allowed to relax to their open position. Therefore, in the second control logic, the control matrix 1640 discharges the stored $V_{at}$ from shutter assemblies that are to be closed, as opposed to those that are to remain open. At step 1692, global actuation is achieved by setting the global actuation interconnect 1654 to ground.

The control matrix 1640 can alternate between the control logics every frame or on some other periodic basis. Over time, the net potentials applied to the shutter assemblies 1644 by the charge interconnect 1650 and the shutter common interconnect 1655 average out to 0V.

Figure 17:
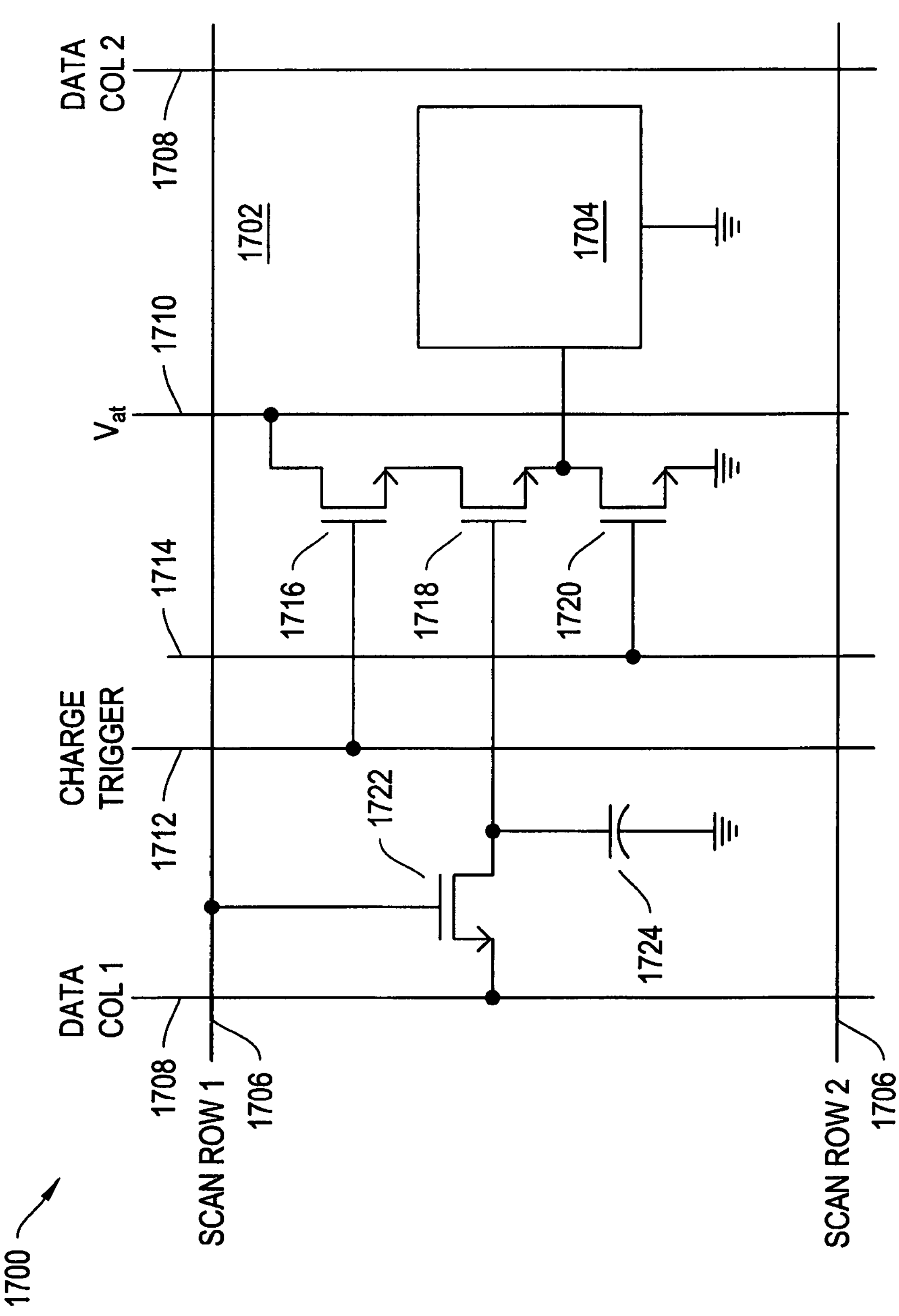
FIG. 17 is a diagram of an eleventh control matrix suitable for controlling the shutter assemblies of the display apparatus of FIG. 1, according to an illustrative embodiment of the invention.

FIG. 17 is still a further suitable control matrix 1700 for inclusion in the display apparatus 100, according to an illustrative embodiment of the invention. Control matrix 1700 controls an array of pixels 1702 that include elastic shutter assemblies 1704. The control matrix 1700 preferably includes shutter assemblies that are not bi-stable, so that the shutter assemblies 1704 are better controlled in an analog fashion. That is, the application of a particular voltage to the actuator of one of the shutter assemblies 1704 results in a known incremental shutter displacement.

Control matrix 1700 includes one scan-line interconnect 1706 for each row of pixels 1702 in the control matrix 1700 and one data interconnect 1708 for each column of pixels 1702 in the control matrix 1700. The control matrix 1700 also includes a charge interconnect 1710, a charge trigger interconnect 1712, and a discharge trigger interconnect 1714. These interconnects 1710, 1712, and 1714 are shared amongst all or a subset of the pixels 1702 in the control matrix 1700. Each pixel 1702 in the control matrix 1700 includes four transistors, a charge trigger transistor 1716, a grayscale transistor 1718, a discharge transistor 1720, and a write-enable transistor 1722. The gate of the charge trigger transistor 1716 electrically connects to the charge trigger interconnect 1712. Its drain electrically connects to the charge interconnect 1710, and its source electrically connects to the grayscale transistor 1718. The gate of the grayscale transistor 1718 electrically connects, in parallel, to a data store capacitor 1724 and the write-enable transistor 1722. The source of the grayscale transistor 1718 electrically connects to the discharge transistor 1720. The gate of the discharge transistor 1720 electrically connects to the discharge interconnect 1714, and its source is grounded. Referring back to the write-enabling transistor 1722, its gate electrically connects to its corresponding scan-line interconnect 1706, and its drain electrically connects to its corresponding data interconnect 1708.

The control matrix 1700 can be utilized to provide analog gray scale to the display apparatus 100. In operation, at the beginning of a frame addressing cycle, the control matrix 1700 applies a voltage to the discharge trigger interconnect 1714, turning on the discharge transistor 1720. Any voltage stored in the actuators of the shutter assemblies 1704 in the pixels 1702 is discharged, releasing the shutters in the shutter assemblies 1704 to their rest positions. The control matrix 1700 then grounds the discharge trigger interconnect 1714. Subsequently, the control matrix 1700, in sequence applies a write-enabling voltage $V_{we}$ to each scan-line interconnect 1706, turning on the write-enabling transistors 1722 of the pixels 1702 in each corresponding row of the control matrix 1700. As the write-enabling transistor 1722 for a given row is turned on, the control matrix 1700 applies voltage pulses to each of the data-interconnects 1708 to indicate the desired brightness of each pixel 1702 in the write-enabled row of pixels 1702. After the addressing sequence is complete, the control matrix then applies a voltage to the charge trigger interconnect 1712 which turns on the charge trigger transistor 1716 so that all electrodes can be charged and all pixels actuated simultaneously.

Brightness of a pixel 1702 is determined by the duration or the magnitude of the voltage pulse applied to its corresponding data interconnect 1708. While the voltage pulse is applied to the data interconnect 1708 of the pixel, current flows through the write-enabling transistor 1722, building up a potential on the data store capacitor 1724. The voltage on the capacitor 1724 is used to control the opening of the conducting channel in the grayscale transistor 1718. This channel remains open so long as the gate-to-source voltage exceeds a certain threshold voltage. Eventually, during the charging cycle, the potential on the electrode of shutter assembly 1704 will rise to match the potential stored on the capacitor 1724, at which point the grayscale transistor will turn off. In this fashion the actuation voltage stored on the shutter assembly can be made to vary in proportion to the analog voltage stored on capacitor 1724. The resulting electrode voltage causes an incremental displacement of the shutter in the shutter assembly 1704 proportional to the resultant voltage. The shutter remains displaced from its rest position until the discharge trigger interconnect 1714 is powered again at the end of the frame addressing cycle.

As in the control matrix 1300 of FIG. 13, a simple diode and/or an MIM diode can be substituted for the charge trigger transistor 1716 to perform the switching or charge loading function for each pixel in the array.

Figure 18:
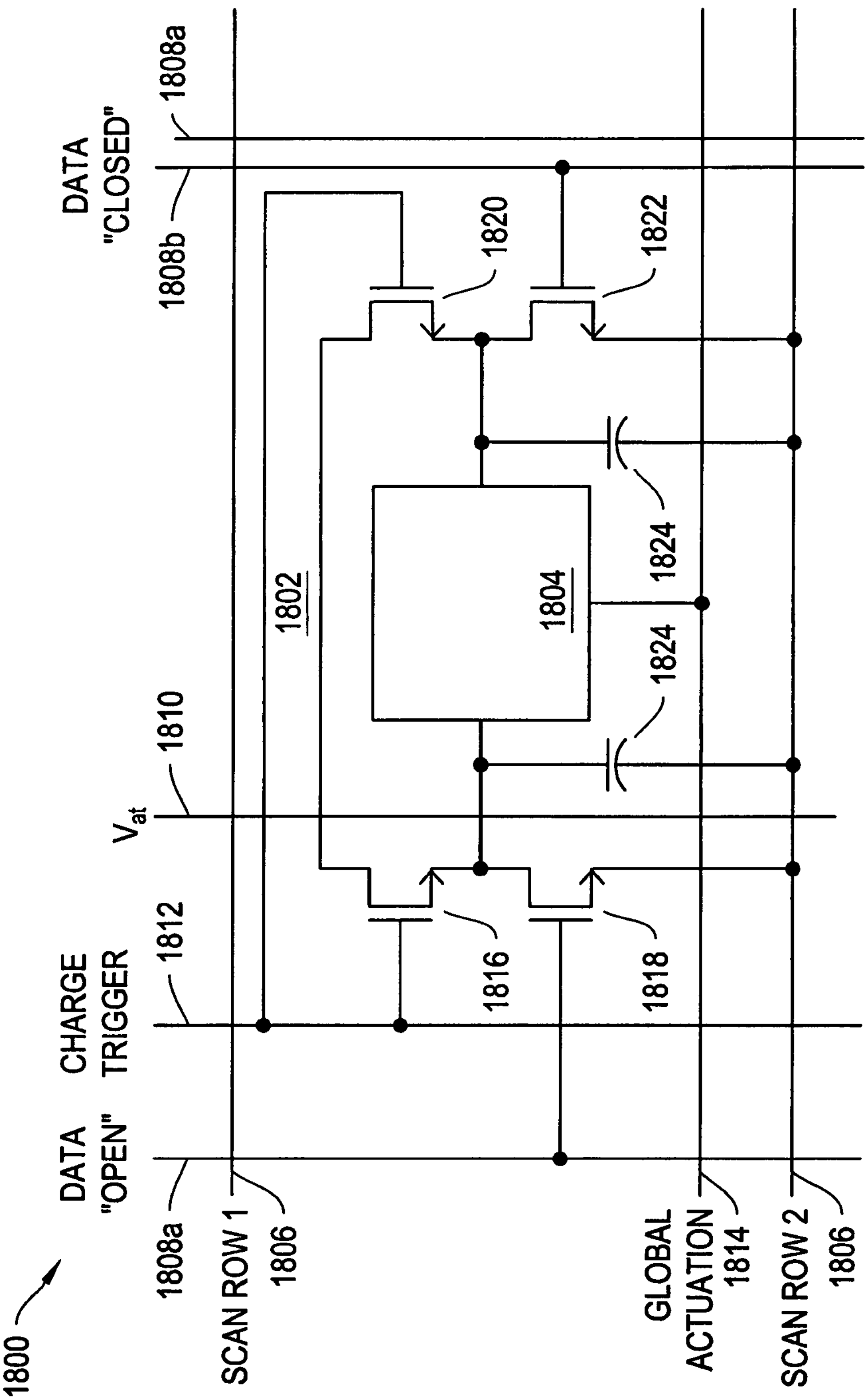
FIG. 18 is a diagram of a twelfth control matrix suitable for controlling the shutter assemblies of the display apparatus of FIG. 1, according to an illustrative embodiment of the invention.

FIG. 18 is yet another suitable control matrix 1800 for inclusion in the display apparatus 100, according to an illustrative embodiment of the invention. Control matrix 1800 controls an array of pixels 1802 that include dual-actuator shutter assemblies 1804 (i.e., shutter assemblies with both shutter-open and shutter-close actuators). The actuators in the shutter assemblies 1804 can be made either electrically bi-stable or mechanically bi-stable.

The control matrix 1800 includes a scan-line interconnect 1806 for each row of pixels 1802 in the control matrix 1800. The control matrix 1800 also includes two data interconnects, a shutter-open interconnect 1808*a* and a shutter-close interconnect 1808*b*, for each column of pixels 1802 in the control matrix 1800. The control matrix 1800 further includes a charge interconnect 1810, a charge trigger interconnect 1812, and a global actuation interconnect 1814. These interconnects 1810, 1812, and 1814 are shared among pixels 1802 in multiple rows and multiple columns in the array. In one implementation (the one described in more detail below), the interconnects 1810, 1812, and 1814 are shared among all pixels 1802 in the control matrix 1800.

Each pixel 1802 in the control matrix includes a shutter-open charge transistor 1816, a shutter-open discharge transistor 1818, a shutter-close charge transistor 1820, and a shutter-close discharge transistor 1822. The control matrix also incorporates two voltage stabilizing capacitors 1824, which are connected, one each, in parallel with the source and drain of the discharge transistors 1818 and 1822. At the beginning of each frame addressing cycle, the control matrix 1800 applies a maintenance voltage, $V_m$, e.g., ½ the voltage needed to actuate the shutter assemblies, $V_{at}$, to the global actuation interconnect 1814. The maintenance voltage locks the shutter assemblies 1804 into their current states until a global actuation is initiated at the end of the frame addressing cycle. The control matrix 1800 then applies a voltage to the charge trigger interconnect 1812, turning on the shutter-open and shutter-close transistors 1816 and 1820 of the pixels 1802 in the control matrix 1800. The charge interconnect 1810, in one implementation, carries a DC voltage equal to or greater than $V_{at}$, e.g., 40V.

As each row of pixels 1802 in the control matrix 1800 is addressed, the control matrix 1800 write-enables a row of pixels 1802 by grounding its corresponding scan-line interconnect 1806. The control matrix 1800 then applies a data voltage, $V_d$, e.g., 5V, to either the shutter-open interconnect 1808*a* or the shutter-close interconnect 1808*b* corresponding to each column of pixels 1802 in the control matrix 1800. If $V_d$ is applied to the shutter-closed interconnect 1808*b* of a column, the voltage stored on the shutter-close actuator of the corresponding shutter assembly 1804 is discharged via the shutter-close discharge transistor 1822. Similarly if $V_d$ is applied to the shutter-open interconnect 1808*a* of a column, the voltage stored on the shutter-open actuator of the corresponding shutter assembly 1804 is discharged via the shutter-open discharge transistor 1818. Generally, to ensure proper actuation, only one of the actuators, either the shutter-closed actuator or the shutter-open actuator, is allowed to be discharged for any given shutter assembly in the array.

After all rows of pixels 1802 are addressed, the control matrix 1800 globally actuates the pixels 1802 by changing the potential on the global actuation interconnect 1814 from $V_m$ to ground. The change in voltage releases the actuators from their locked in state to switch to their next state, if needed. If the global actuation interconnect were to be replaced with a constant voltage ground or common interconnect, i.e. if the global actuation method is not utilized with the control matrix 1800, then the voltage stabilizing capacitors 1824 may not be necessary.

As in the control matrix 1400 of FIG. 14, a simple diode and/or an MIM diode can be substituted for both the shutter-open charge transistor 1816 and the shutter-close charge transistor 1820.

Alternatively, it is possible to take advantage of the bi-stable nature of shutter assembly 1804 and substitute a resistor for both the shutter-open charge transistor 1816 and the shutter-close charge transistor 1820. When operated with a resistor, one relies on the fact that the RC charging time constant associated with the resistor and the capacitance of the actuator in the shutter assembly 1804 can be much greater in magnitude than the time necessary for discharging the actuator through either the shutter-open discharge transistor 1818 or the shutter-close discharge transistor 1822. In the time interval between when the actuator of the shutter assembly 1804 is discharged through one of the discharge transistors and when the actuator is re-charged through the resistor and the charge interconnect 1810, the correct voltage differences can be established across the actuators of the shutter assembly 1804 and the shutter assembly can be caused to actuate. After each of the open and closed actuators of the shutter assembly 1804 have been re-charged through the resistor, the shutter assembly 1804 will not re-actuate since either or both of the actuators now effectively holds the appropriate maintenance voltage, i.e., a voltage greater than $V_m$.

FIG. 19 is yet another suitable control matrix 1900 for inclusion in the display apparatus 100, according to an illustrative embodiment of the invention. Control matrix 1900 controls an array of pixels 1902 that include dual-actuator shutter assemblies 1904 (i.e., shutter assemblies with both shutter-open and shutter-close actuators). The actuators in the shutter assemblies 1904 can be made either electrically bi-stable or mechanically bi-stable.

The control matrix 1900 includes a scan-line interconnect 1906 for each row of pixels 1902 in the control matrix 1900. The control matrix 1900 also includes two data interconnects, a shutter-open interconnect 1908*a* and a shutter-close interconnect 1908*b*, for each column of pixels 1902 in the control matrix 1900. The control matrix 1900 further includes a charge interconnect 1910, a charge trigger interconnect 1912, and a global actuation interconnect 1914, and a shutter common interconnect 1915. These interconnects 1910, 1912, 1914 and 1915 are shared among pixels 1902 in multiple rows and multiple columns in the array. In one implementation (the one described in more detail below), the interconnects 1910, 1912, 1914 and 1915 are shared among all pixels 1902 in the control matrix 1900.

Each pixel 1902 in the control matrix includes a shutter-open charge transistor 1916, a shutter-open discharge transistor 1918, a shutter-open write-enable transistor 1917, and a data store capacitor 1919 as described in FIG. 16A. Each pixel 1902 in the control matrix includes a shutter-close charge transistor 1920, and a shutter-close discharge transistor 1922, a shutter-close write-enable transistor 1927, and a data store capacitor 1929.

At the beginning of each frame addressing cycle the control matrix 1900 applies a voltage to the charge trigger interconnect 1912, turning on the shutter-open and shutter-close transistors 1916 and 1920 of the pixels 1902 in the control matrix 1900. The charge interconnect 1910, in one implementation, carries a DC voltage equal to or greater than $V_{at}$, e.g., 40V.

Each row is then write-enabled in sequence, as was described with respect to control matrix 1500 of FIG. 15. While a particular row of pixels 1902 is write-enabled, the control matrix 1900 applies a data voltage to either the shutter-open interconnect 1908*a* or the shutter-close interconnect 1908*b* corresponding to each column of pixels 1902 in the control matrix 1900. The application of $V_{we}$ to the scan-line interconnect 1906 for the write-enabled row turns on both of the write-enable transistors 1917 and 1927 of the pixels 1902 in the corresponding scan line. The voltages applied to the data interconnects 1908*a* and 1908*b* are thereby allowed to be stored on the data store capacitors 1919 and 1929 of the respective pixels 1902. Generally, to ensure proper actuation, only one of the actuators, either the shutter-closed actuator or the shutter-open actuator, is allowed to be discharged for any given shutter assembly in the array.

In control matrix 1900 the global actuation interconnect 1914 is connected to the source of the both the shutter-open discharge switch transistor 1918 and the shutter-close discharge transistor 1922. Maintaining the global actuation interconnect 1914 at a potential significantly above that of the shutter common interconnect 1915 prevents the turn-on of any of the discharge switch transistors 1918 or 1922, regardless of what charge is stored on the capacitors 1919 and 1929. Global actuation in control matrix 1900 is achieved by bringing the potential on the global actuation interconnect 1914 to the same potential as the shutter common interconnect 1915, making it possible for the discharge switch transistors 1918 or 1922 to turn-on in accordance to the whether a data voltage has been stored on ether capacitor 1919 or 1920. Control matrix 1900, therefore, does not depend on electrical bi-stability in the shutter assembly 1904 in order to achieve global actuation.

Applying partial voltages to the data store capacitors 1919 and 1921 allows partial turn-on of the discharge switch transistors 1918 and 1922 during the time that the global actuation interconnect 1914 is brought to its actuation potential. In this fashion, an analog voltage is created on the shutter assembly 1904, for providing analog gray scale.

In operation, the control matrix alternates between two control logics as described in relation to control matrix 1600 of FIG. 16A.

As in the control matrix 1300 of FIG. 13, simple MIM diodes or varistors can be substituted for the charge trigger transistor 1616 to perform the switching or charge loading function for each pixel in the array. Also, as in control matrix 1800 of FIG. 18 it is possible to substitute a resistor for both the shutter-open charge transistor 1916 and the shutter-close charge transistor 1920.

Figure 20:
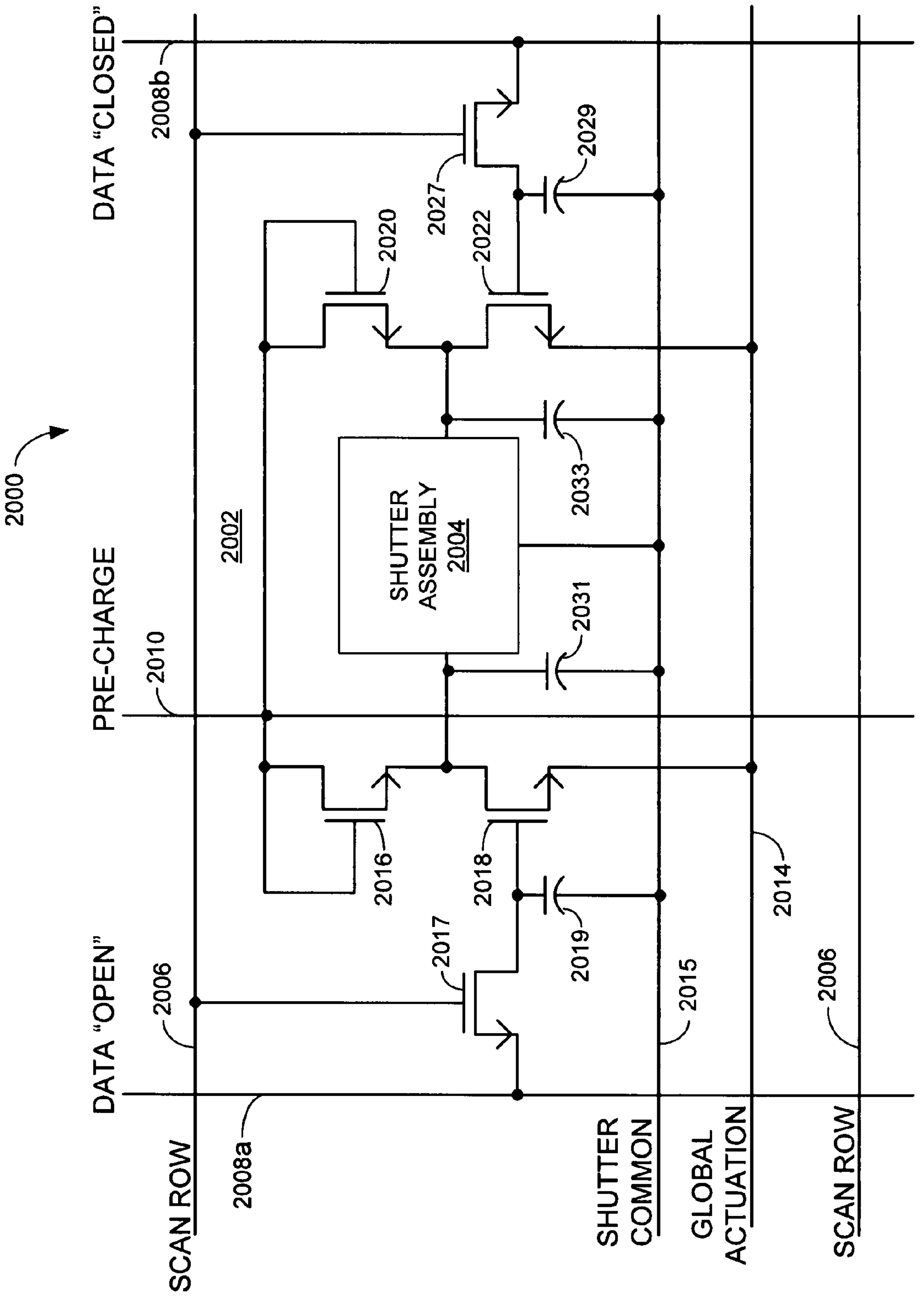
FIG. 20 is a diagram of a fourteenth control matrix suitable for controlling the shutter assemblies of the display apparatus of FIG. 1, according to an illustrative embodiment of the invention.

FIG. 20 is yet another suitable control matrix 2000 for inclusion in the display apparatus 100, according to an illustrative embodiment of the invention. Control matrix 2000 controls an array of pixels 2002 that include dual-actuator shutter assemblies 2004 (i.e., shutter assemblies with both shutter-open and shutter-close actuators). The actuators in the shutter assemblies 2004 can be made either electrically bi-stable or mechanically bi-stable.

The control matrix 2000 includes a scan-line interconnect 2006 for each row of pixels 2002 in the control matrix 2000. The control matrix 2000 also includes two data interconnects, a shutter-open interconnect 2008*a* and a shutter-close interconnect 2008*b*, for each column of pixels 2002 in the control matrix 2000. The control matrix 2000 further includes a charge interconnect 2010, and a global actuation interconnect 2014, and a shutter common interconnect 2015. These interconnects 2010, 2014 and 2015 are shared among pixels 2002 in multiple rows and multiple columns in the array. In one implementation (the one described in more detail below), the interconnects 2010, 2014 and 2015 are shared among all pixels 2002 in the control matrix 2000.

Each pixel 2002 in the control matrix includes a shutter-open charge transistor 2016, a shutter-open discharge transistor 2018, a shutter-open write-enable transistor 2017, and a data store capacitor 2019 as described in FIGS. 16A and 19. Each pixel 2002 in the control matrix includes a shutter-close charge transistor 2020, and a shutter-close discharge transistor 2022, a shutter-close write-enable transistor 2027, and a data store capacitor 2029.

Control matrix 2000 also incorporates two voltage stabilizing capacitors 2031 and 2033 which connect on one side to the sources of the discharge switch transistors 2018 and 2022, respectively, and on the other side to the shutter common interconnect 2015.

By comparison to control matrix 1900, the charging transistors 2016 and 2020 are wired in with a different circuit connection to the charge interconnect 2010. Control matrix 2000 does not include a charge trigger interconnect which is shared among pixels. Instead, the gate terminals of both charging transistors 2016 and 2020 are connected directly to the charge interconnect 2010, along with the drain terminal of transistors 2016 and 2020. In operation, the charging transistors operate essentially as diodes, i.e., they can pass a current in only 1 direction. Their function in the charging circuit becomes equivalent to that of diode 1410 in control circuit 1400 of FIG. 14.

At the beginning of each frame addressing cycle the control matrix 2000 applies a voltage pulse to the charge interconnect 2010, allowing current to flow through charging transistors 2016 and 2020 and into the shutter assemblies 2004 of the pixels 2002. After this charging pulse, each of the shutter open and shutter closed electrodes of shutter assemblies 2004 will be in the same voltage state. After the voltage pulse, the potential of charge interconnect 2010 is reset to zero, and the charging transistors 2016 and 2020 will prevent the charge stored in the shutter assemblies 2004 from being dissipated through charge interconnect 2010. The charge interconnect 2010, in one implementation, transmits a pulsed voltage equal to or greater than $V_{at}$, e.g., 40V.

Each row is then write-enabled in sequence, as was described with respect to control matrix 1500 of FIG. 15. While a particular row of pixels 2002 is write-enabled, the control matrix 2000 applies a data voltage to either the shutter-open interconnect 2008*a* or the shutter-close interconnect 2008*b* corresponding to each column of pixels 2002 in the control matrix 2000. The application of $V_{we}$ to the scan-line interconnect 2006 for the write-enabled row turns on both of the write-enable transistors 2017 and 2027 of the pixels 2002 in the corresponding scan line. The voltages applied to the data interconnects 2008*a* and 2008*b* are thereby caused to be stored on the data store capacitors 2019 and 2029 of the respective pixels 2002. Generally, to ensure proper actuation, only one of the actuators, either the shutter-closed actuator or the shutter-open actuator, is caused to be discharged for any given shutter assembly in the array.

In control matrix 2000 the global actuation interconnect 2014 is connected to the source of the both the shutter-open discharge switch transistor 2018 and the shutter-close discharge transistor 2022. Maintaining the global actuation interconnect 2014 at a potential significantly above that of the shutter common interconnect 2015 prevents the turn-on of any of the discharge switch transistors 2018 or 2022, regardless of what charge is stored on the capacitors 2019 and 2029. Global actuation in control matrix 2000 is achieved by bringing the potential on the global actuation interconnect 2014 to substantially the same potential as the shutter common interconnect 2015, making it possible for the discharge switch transistors 2018 or 2022 to turn-on in accordance to whether a data voltage has been stored on ether capacitor 2019 or 2029. Control matrix 2000, therefore, does not depend on electrical bi-stability in the shutter assembly 2004 in order to achieve global actuation.

Applying partial voltages to the data store capacitors 2019 and 2021 allows partial turn-on of the discharge switch transistors 2018 and 2022 during the time that the global actuation interconnect 2014 is brought to its actuation potential. In this fashion, an analog voltage is created on the shutter assembly 2004, for providing analog gray scale.

In operation, in order to periodically reverse the polarity of voltages supplied to the shutter assembly 2004, the control matrix 2000 alternates between two control logics, as described in relation to control matrix 1600 of FIG. 16A.

Figure 21:
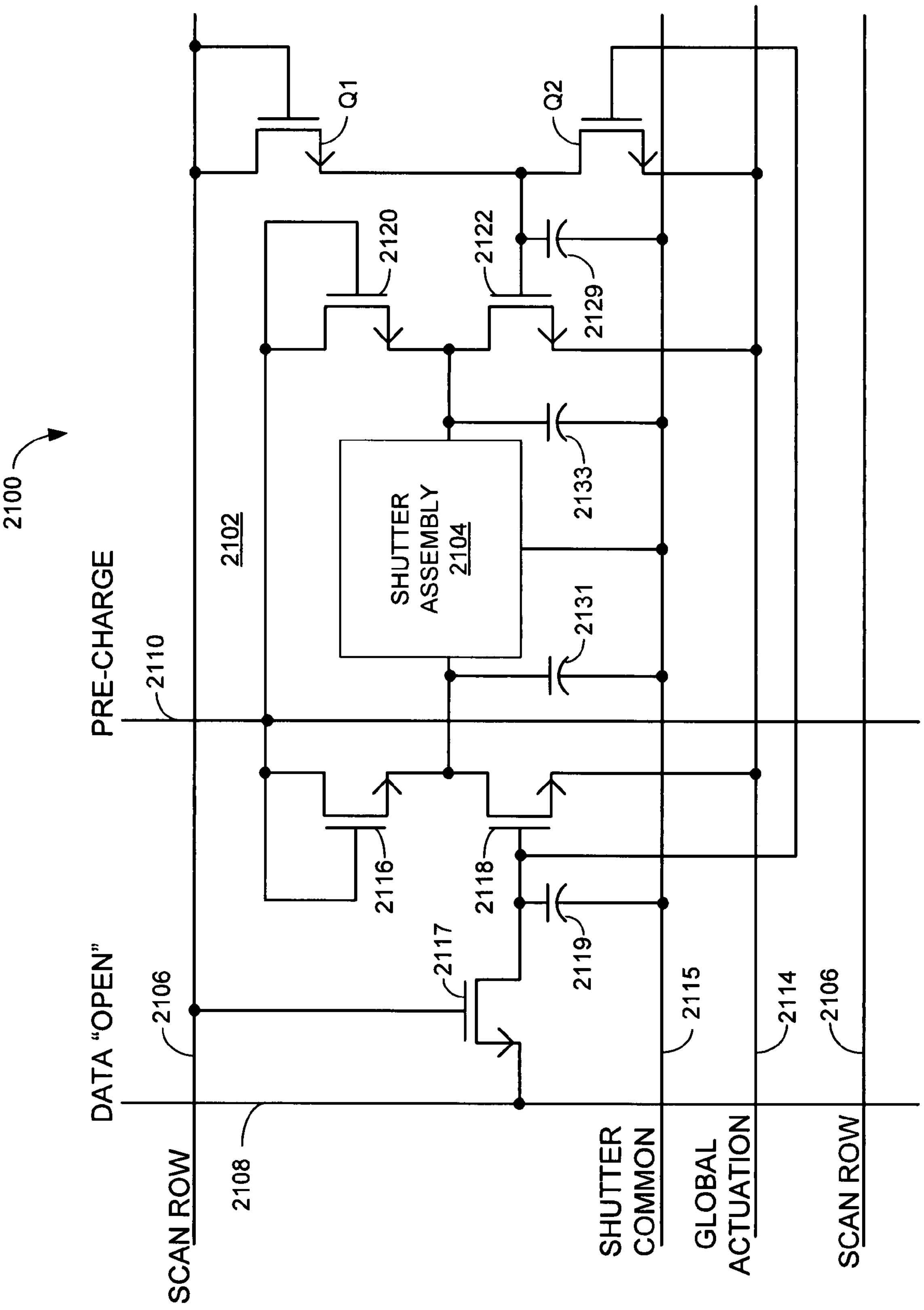
FIG. 21 is a diagram of a fifteenth control matrix suitable for controlling the shutter assemblies of the display apparatus of FIG. 1, according to an illustrative embodiment of the invention.

FIG. 21 is yet another suitable control matrix 2100 for inclusion in the display apparatus 100, according to an illustrative embodiment of the invention. Control matrix 2100 controls an array of pixels 2102 that include dual-actuator shutter assemblies 2104 (i.e., shutter assemblies with both shutter-open and shutter-close actuators). The actuators in the shutter assemblies 2104 can be made either electrically bi-stable or mechanically bi-stable.

The control matrix 2100 includes a scan-line interconnect 2106 for each row of pixels 2102 in the control matrix 2100. Despite the fact that shutter assemblies 2104 are dual-actuator shutter assemblies, the control matrix 2100 only includes a single data interconnect 2108. The control matrix 2100 further includes a charge interconnect 2110, and a global actuation interconnect 2114, and a shutter common interconnect 2115. These interconnects 2110, 2114 and 2115 are shared among pixels 2102 in multiple rows and multiple columns in the array. In one implementation (the one described in more detail below), the interconnects 2110, 2114, and 2115 are shared among all pixels 2102 in the control matrix 2100.

Each pixel 2102 in the control matrix includes a shutter-open charge transistor 2116, a shutter-open discharge transistor 2118, a shutter-open write-enable transistor 2117, and a data store capacitor 2119, as described in FIGS. 16A and 19. Each pixel 2102 in the control matrix includes a shutter-close charge transistor 2120, a shutter-close discharge transistor 2122, and a data store capacitor 2129.

In addition and in contrast to control matrices described until now, the control matrix 2100 includes a data load transistor 2135 and a data discharge transistor 2137. Control matrix 2100 also incorporates two voltage stabilizing capacitors 2131 and 2133 which connect on one side to the sources of the discharge switch transistors 2118 and 2122, respectively, and on the other side to the shutter common interconnect 2115.

The charging transistors 2116 and 2120 are wired similarly to that of the charging transistors in control matrix 2000 of FIG. 20. That is, the gate terminals of both charging transistors 2116 and 2120 are connected directly to the charge interconnect 2110, along with the drain terminal of transistors 2116 and 2120. Their function in the charging circuit becomes equivalent to that of diode 1410 in control circuit 1400 of FIG. 14.

At the beginning of each frame addressing cycle the control matrix 2100 applies a voltage pulse to the charge interconnect 2110, allowing current to flow through charging transistors 2116 and 2120 and into the shutter assemblies 2104 of the pixels 2102. After this charging pulse, each of the shutter open and shutter closed electrodes of shutter assemblies 2104 will be in the same voltage state. After the voltage pulse, the potential of charge interconnect 2110 is reset to zero, and the charging transistors 2116 and 2120 will prevent the charge stored in the shutter assemblies 2104 from being dissipated through charge interconnect 2110. The charge interconnect 2110, in one implementation, transmits a pulsed voltage equal to or greater than $V_{at}$, e.g., 40V.

Each row is then write-enabled in sequence, as was described with respect to control matrix 1500 of FIG. 15. While a particular row of pixels 2102 is write-enabled, the control matrix 2100 applies a data voltage to the data interconnect 2108. The application of $V_{we}$ to the scan-line interconnect 2106 for the write-enabled row turns on the write-enable transistor 2117 of the pixels 2102 in the corresponding scan line. The voltages applied to the data interconnect 2108 is thereby caused to be stored on the data store capacitor 2119 of the respective pixels 2102. The same $V_{we}$ that is applied to the write enable transistor 2117 is applied simultaneously to both the gate and the drain of data load transistor 2135, which allows current to pass through the data load transistor 2135 depending on whatever voltage is stored on capacitor 2129.

The combination of transistors 2135 and 2137 functions essentially as an inverter with respect to the data stored on capacitor 2119. The source of data load transistor 2135 is connected to the drain of data discharge transistor 2137 and simultaneously to an electrode of the data store capacitor 2129. The gate of data discharge transistor 2137 is connected to an electrode of data store capacitor 2119. The voltage stored on capacitor 2129, therefore, becomes the complement or inverse of the voltage stored on data store capacitor 2119. For instance, if the voltage on the data store capacitor 2119 is $V_{on}$, then the data discharge transistor 2137 can switch on and the voltage on the data store capacitor 2129 can become zero. Conversely, if the voltage on data store capacitor 2119 is zero, then the data discharge transistor 2137 will switch off and the voltage on the data store capacitor 2129 will remain at its pre-set voltage $V_{we}$.

In control matrix 2100 the global actuation interconnect 2114 is connected to the source of the shutter-open discharge switch transistor 2118, the shutter-close discharge transistor 2122, and the data discharge transistor 2137. Maintaining the global actuation interconnect 2114 at a potential significantly above that of the shutter common interconnect 2115 prevents the turn-on of any of the discharge switch transistors 2118, 2122 and 2137, regardless of what charge is stored on the capacitors 2119. Global actuation in control matrix 2100 is achieved by bringing the potential on the global actuation interconnect 2114 to substantially the same potential as the shutter common interconnect 2115. During the time that the global actuation is so activated, all three of the transistors 2118, 2122, and 2137 can change their state, depending on what data voltage has been stored on capacitor 2119. Because of the operation of the inverter 2135 and 2137, only one of the discharge transistors 2118 or 2122 can be on at any one time, ensuring proper actuation of shutter assembly 2104. The presence of the inverter 2135 and 2137 helps to obviate the need for a separate shutter-close data interconnect.

Applying partial voltages to the data store capacitors 2119 and 2129 allows partial turn-on of the discharge switch transistors 2118 and 2122 during the time that the global actuation interconnect 2114 is brought to its actuation potential. In this fashion, an analog voltage is created on the shutter assembly 2104, for providing analog gray scale.

In operation, in order to periodically reverse the polarity of voltages supplied to the shutter assembly 2104, the control matrix 2100 alternates between two control logics as described in relation to control matrix 1600 of FIG. 16A.

Figure 22:
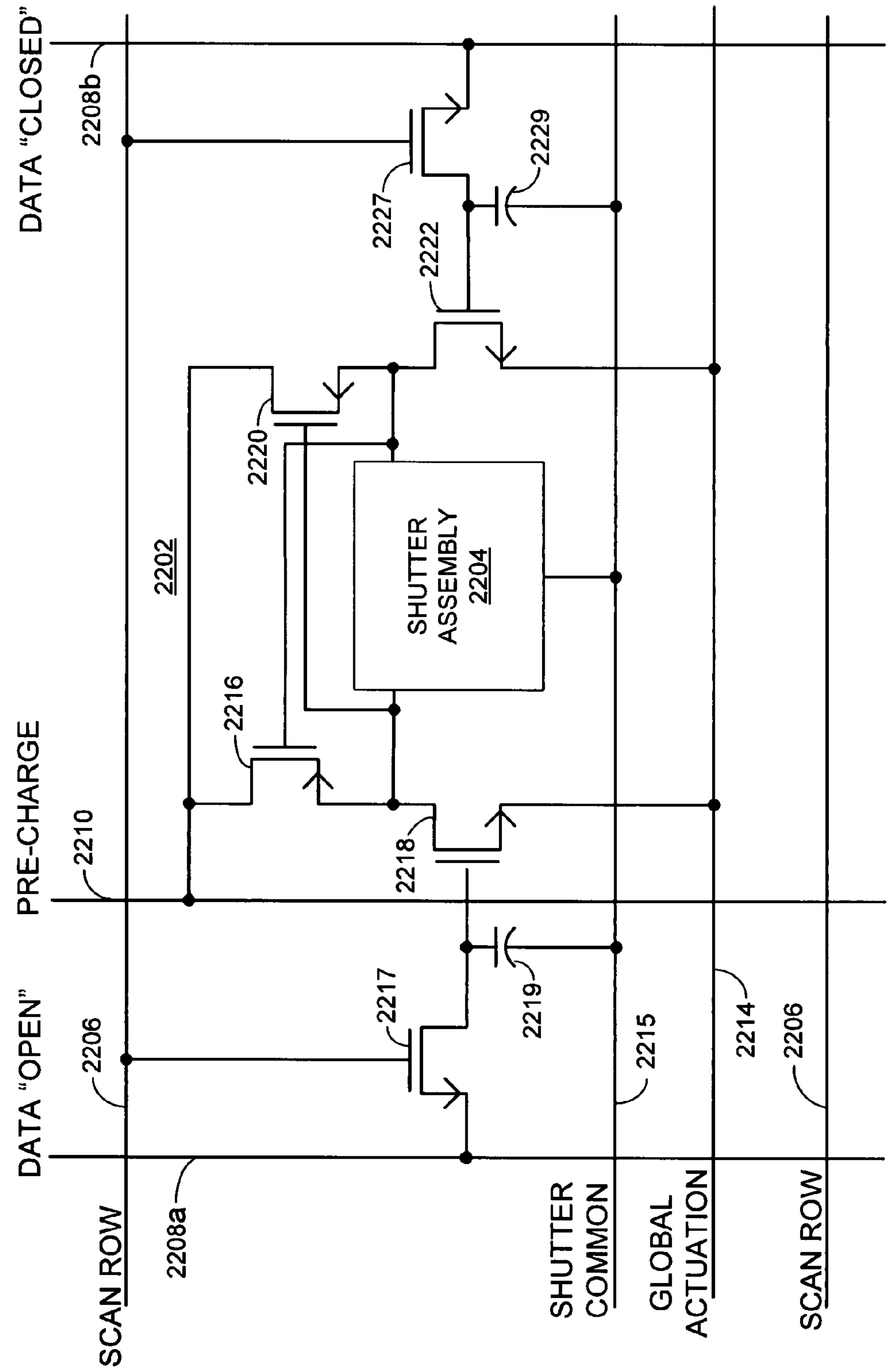
FIG. 22 is a diagram of a sixteenth control matrix suitable for controlling the shutter assemblies of the display apparatus of FIG. 1, according to an illustrative embodiment of the invention.

FIG. 22 is yet another suitable control matrix 2200 for inclusion in the display apparatus 100, according to an illustrative embodiment of the invention. Control matrix 2200 controls an array of pixels 2202 that include dual-actuator shutter assemblies 2204 (i.e., shutter assemblies with both shutter-open and shutter-close actuators). The actuators in the shutter assemblies 2204 can be made either electrically bi-stable or mechanically bi-stable.

The control matrix 2200 includes a scan-line interconnect 2206 for each row of pixels 2202 in the control matrix 2200. The control matrix 2200 also includes two data interconnects, a shutter-open interconnect 2208*a* and a shutter-close interconnect 2208*b*, for each column of pixels 2202 in the control matrix 2200. The control matrix 2200 further includes a charge interconnect 2210, a global actuation interconnect 2214, and a shutter common interconnect 2215. These interconnects 2210, 2214 and 2215 are shared among pixels 2202 in multiple rows and multiple columns in the array. In one implementation (the one described in more detail below), the interconnects 2210, 2214 and 2215 are shared among all pixels 2202 in the control matrix 2200.

Each pixel 2202 in the control matrix includes a shutter-open charge transistor 2216, a shutter-open discharge transistor 2218, a shutter-open write-enable transistor 2217, and a data store capacitor 2219 as described in FIGS. 16A and 19. Each pixel 2202 in the control matrix includes a shutter-close charge transistor 2220, and a shutter-close discharge transistor 2222, a shutter-close write-enable transistor 2227, and a data store capacitor 2229.

The control matrix 2200 makes use of two complementary types of transistors, both p-channel and n-channel transistors. It is therefore referred to as a complementary MOS control matrix or a CMOS control matrix. The charging transistors 2216 and 2220 are of the pMOS type while the discharge transistors 2218 and 2222 are of the nMOS type. In other implementations, the types of transistors can be reversed, for example nMOS transistors can be used for the charging transistors and pMOS transistors can be used for the discharge transistors. (The symbol for a pMOS transistor includes an arrow that points into the channel region, the symbol for an nMOS transistor includes an arrow that points away from the channel region.)

The CMOS control matrix 2200 does not incorporate and does not require any voltage stabilizing capacitors, such as 2031 and 2033 from control matrix 2000 of FIG. 20. Control matrix 2200 does not include a charge trigger interconnect (such as charge trigger interconnect 1912 in control matrix 1900 of FIG. 19). By comparison to control matrices 1900 and 2000, the charging transistors 2216 and 2220 are wired with different circuit connections between the charge interconnect 2210 and the shutter assembly 2204. The source of each of transistors 2216 and 2220 are connected to the charge interconnect 2210. The gate of shutter-close charge transistor 2220 is connected to the drain of a shutter-open discharge transistor 2218 and simultaneously to the shutter-open actuator of the corresponding shutter assembly 2204. The gate of shutter-open charge transistor 2216 is connected to the drain of a shutter-close discharge transistor 2222 and simultaneously to the shutter-close actuator of the corresponding shutter assembly 2204. The drain of shutter-close charge transistor 2220 is connected to the drain of a shutter-close discharge transistor 2222 and simultaneously to the shutter-close actuator of the corresponding shutter assembly 2204. The drain of shutter-open charge transistor 2216 is connected to the drain of a shutter-open discharge transistor 2218 and simultaneously to the shutter-open actuator of the corresponding shutter assembly 2204.

The operation of control matrix 2200 is distinct from that of the circuits already discussed, in particular from control matrices 1800, 1900, and 2000 of FIGS. 18, 19 and 20, respectively, which have generally employed the charging sequence described in control method 1200 of FIG. 12. In control method 1200, as applied to control matrix 1900, an actuation voltage is first applied to each side of the shutter assembly 1902, or applied simultaneously to the shutter-open actuator and the shutter-closed actuators of shutter assembly 1902. Later, as part of the global actuation sequence, either one actuator or the other in shutter assembly 1902 is caused to discharge in accordance to whether a data voltage was stored on ether capacitor 1919 or 1929. By contrast, the operation of control matrix 2200 does not require a distinct or initializing charging sequence. The charge interconnect 2210 is maintained at a steady DC voltage equal to the actuation voltage $V_{at}$, e.g. at 40 volts.

The control matrix 2200 operates as a logical flip-flop, which has only two stable states. In the first stable state the shutter-open discharge transistor 2218 is on, the shutter-closed discharge transistor 2222 is off, the shutter-open charge transistor 2216 is off, and the shutter-close charge transistor 2220 is on. In this first stable state the shutter-open actuator is discharged or set to the same potential as the global actuation interconnect 2214, while the shutter-closed actuator is held at the actuation voltage $V_{at}$. In the second stable state the shutter-open discharge transistor 2218 is off, the shutter-closed discharge transistor 2222 is on, the shutter-open charge transistor 2216 is on, and the shutter-close charge transistor 2220 is off. In this second stable state the shutter-closed actuator is discharged or set to the same potential as the global actuation interconnect 2214, while the shutter-closed actuator is held at the actuation voltage $V_{at}$. The cross-coupling of transistors 2216, 2218, 2220, and 2222 helps to ensure that if any one of these 4 transistors is on—then only the two states described above can result as a stable state. In various embodiments, the flip-flop can also be used to store pixel addressing data.

Those skilled in the art will recognize that both the shutter-open and shutter-close actuators of shutter assembly 2204 are connected to the output stage of a corresponding CMOS inverter. These inverters can be labeled as the shutter open inverter which comprises transistors 2216 and 2218 and the shutter close inverter which comprises transistors 2220 and 2222. The flip-flop operation of the switching circuit is formed from the cross-coupling of the two inverters. These inverters are also known as level shifting inverters since the input voltages, from data store capacitors 2219 and 2229, are lower than the output voltages, i.e. the $V_{at}$ which is supplied to the actuators.

The two stable actuation states of control matrix 2200 are associated with substantially zero current flow between the charge interconnect 2210 and the global actuation interconnect 2214, an important power savings. This is achieved because the shutter-open charge transistor 2216 and the shutter-close discharge transistor 2218 are made from different transistor types, pMOS or nMOS, while the shutter-close charge transistor 2220 and the shutter-close discharge transistor 2222 are also made from the different transistor types, pMOS and nMOS.

The flip-flop operation of control matrix 2200 allows for a constant voltage actuation of the shutter assembly 2204, without the need for voltage stabilizing capacitors, such as capacitor 2031 or 2033 in control matrix 2000 of FIG. 20. This is because one of the charging transistors 2216 or 2220 remains on throughout the actuation event, allowing the corresponding actuator to maintain a low impedance connection to the DC supply of the interconnect 2210 throughout the actuation event.

At the beginning of each frame addressing cycle the control matrix 2200 applies a write enable voltage to each scan-line interconnect 2206 in sequence. While a particular row of pixels 2202 is write-enabled, the control matrix 2200 applies a data voltage to either the shutter-open interconnect 2208*a* or the shutter-close interconnect 2208*b* corresponding to each column of pixels 2202 in the control matrix 2200. The application of $V_{we}$ to the scan-line interconnect 2206 for the write-enabled row turns on both of the write-enable transistors 2217 and 2227 of the pixels 2202 in the corresponding scan line. The voltages applied to the data interconnects 2208*a* and 2208*b* are thereby caused to be stored on the data store capacitors 2219 and 2229 of the respective pixels 2202. Generally, to ensure proper actuation, only one of the actuators, either the shutter-closed actuator or the shutter-open actuator, is caused to be discharged for any given shutter assembly in the array.

In control matrix 2200 the global actuation interconnect 2214 is connected to the source of the both the shutter-open discharge switch transistor 2218 and the shutter-close discharge transistor 2222. Maintaining the global actuation interconnect 2214 at a potential significantly above that of the shutter common interconnect 2215 prevents the turn-on of any of the discharge switch transistors 2218 or 2222, regardless of what charge is stored on the capacitors 2219 and 2229. Global actuation in control matrix 2200 is achieved by bringing the potential on the global actuation interconnect 2214 to substantially the same potential as the shutter common interconnect 2215, making it possible for the discharge switch transistors 2218 or 2222 to turn-on in accordance to whether a data voltage has been stored on either capacitor 2219 or 2222. Upon setting the global actuation interconnect to the same potential as the shutter common interconnect, the state of the transistors will either remain unchanged from its stable state as it was set at the last actuation event, or it will switch to the alternate stable state, in accordance to whether a data voltage has been stored on either capacitor 2219 or 2222.

The voltage stored on capacitors 2219 or 2229 is not necessarily the same as the actuation voltage as applied to the charge interconnect 2210. Therefore some optional specifications on the transistors can help to reduce any transient switching currents in control matrix 2200. For instance, it may be preferable to increase the ratio of width to length in the discharge transistors 2218 and 2222 as compared to the charge transistors 2216 and 2220. The ratio of width to length for the discharge transistors may vary between 1 to 10 while the ratio of length to width for the charge transistors may vary between 0.1 and 1.

In operation, in order to periodically reverse the polarity of voltages supplied to the shutter assembly 2204, the control matrix 2200 alternates between two control logics as described in relation to control matrix 1600 of FIG. 16A.

Figure 23:
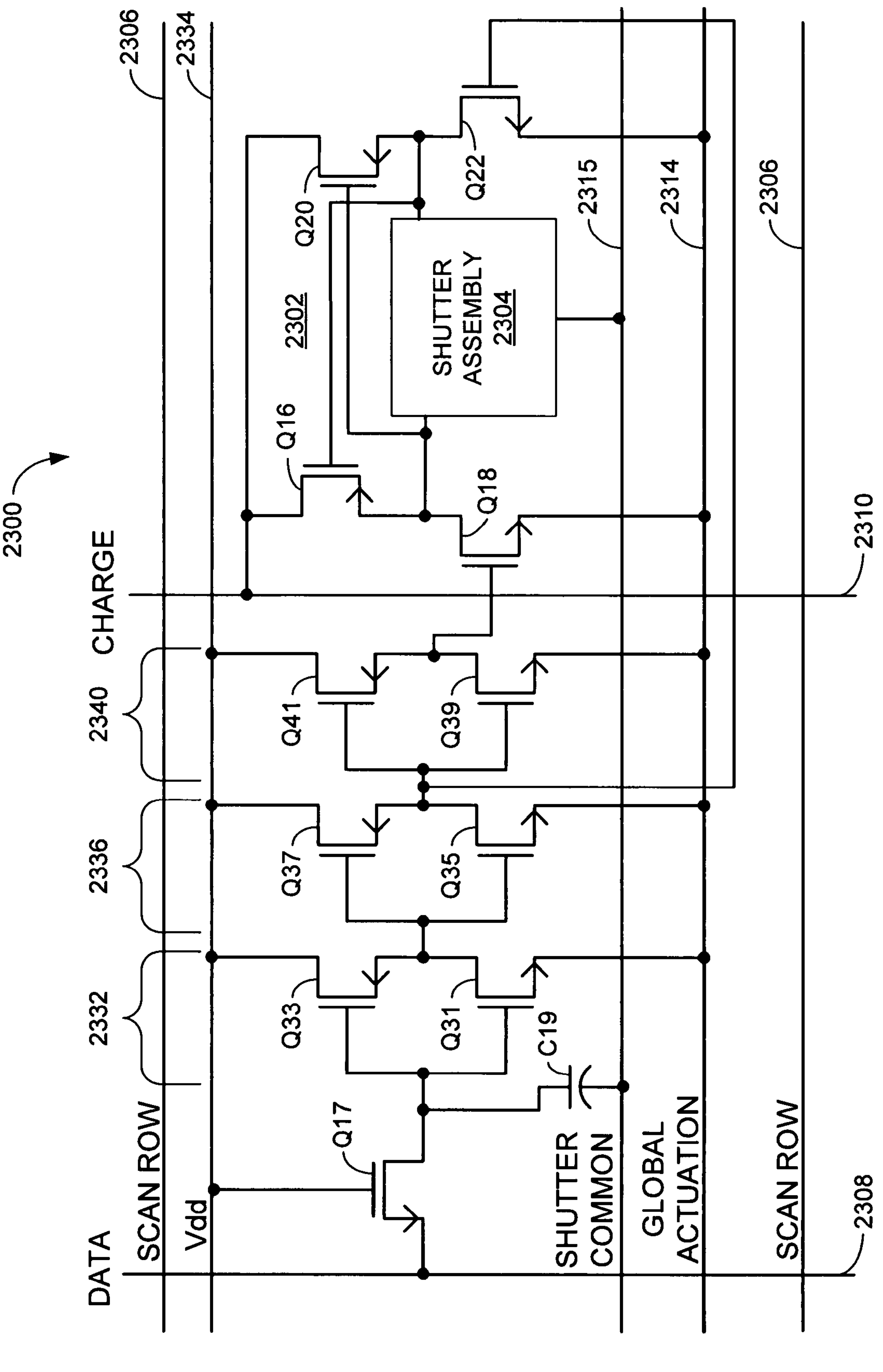
FIG. 23 is a diagram of a seventeenth control matrix suitable for controlling the shutter assemblies of the display apparatus of FIG. 1, according to an illustrative embodiment of the invention.

FIG. 23 is yet another suitable control matrix 2300 for inclusion in the display apparatus 100, according to an illustrative embodiment of the invention. Control matrix 2300 controls an array of pixels 2302 that include dual-actuator shutter assemblies 2304 (i.e., shutter assemblies with both shutter-open and shutter-close actuators). The actuators in the shutter assemblies 2304 can be made either electrically bi-stable or mechanically bi-stable.

The control matrix 2300 includes a scan-line interconnect 2306 for each row of pixels 2302 in the control matrix 2300. Despite the fact that shutter assemblies 2304 are dual-actuator shutter assemblies, the control matrix 2300 only includes a single data interconnect 2308. The control matrix 2300 further includes a charge interconnect 2310, and a global actuation interconnect 2314, and a shutter common interconnect 2315. These interconnects 2310, 2314 and 2315 are shared among pixels 2302 in multiple rows and multiple columns in the array. In one implementation (the one described in more detail below), the interconnects 2310, 2314 and 2315 are shared among all pixels 2302 in the control matrix 2300.

Each pixel 2302 in the control matrix includes a shutter-open charge transistor Q16, a shutter-open discharge transistor Q18, a shutter-open write-enable transistor Q17, and a data store capacitor C19, as described in FIGS. 16A and 19. Each pixel 2302 in the control matrix includes a shutter-close charge transistor Q20, and a shutter-close discharge transistor Q22, and a shutter-close write-enable transistor Q27.

The control matrix 2300 makes use of two complementary types of transistors, both p-channel and n-channel transistors. It is therefore referred to as a complementary MOS control matrix or a CMOS control matrix. The charging transistors Q16 and Q20, for instance, are of the pMOS type, while the discharge transistors Q18 and Q22 are of the nMOS type. In other implementations, the types of transistors employed in control matrix 2300 can be reversed, for example nMOS transistors can be used for the charging transistors and pMOS transistors can be used for the discharge transistors.

In addition to the transistors identified above, the control matrix 2300 includes a level shifting inverter 2332, comprised of transistors Q31 and Q33; it includes a transition-sharpening inverter 2336, comprised of transistors Q35 and Q37; and it includes a switching inverter 2340, comprised of transistors Q39 and Q41. Each of these inverters is comprised of complementary pairs of transistors (i.e., nMOS coupled with pMOS). The sources of transistors Q33, Q37, and Q41 are connected to a $V_{dd}$ supply interconnect 2334. The sources of transistors Q31, Q35, and Q39 are connected to the global actuation interconnect 2314.

The CMOS control matrix 2300 does not incorporate and does not require any voltage stabilizing capacitors, such as 2031 and 2033 from control matrix 2000 of FIG. 20. Control matrix 2300 does not include a charge trigger interconnect (such as charge trigger interconnect 1912 of FIG. 19).

In a wiring similar to control matrix 2200, the transistors Q16, Q18, Q20, and Q22 are cross connected and operate as a flip flop. The sources of both transistors Q16 and Q20 are connected directly to charge interconnect 2310, which is held at a DC potential equal to the actuation voltage $V_{at}$, e.g. at 40 volts. The sources of both transistors Q18 and Q22 are connected to the global actuation interconnect 2314. The cross coupling of transistors Q16, Q18, Q20, and Q22 ensures that there are only two stable states—in which only one of the actuators in shutter assembly 2304 is held at the actuation voltage $V_{at}$, while the other actuator (after global actuation) is held at a voltage near to zero. By contrast to the operation of control matrices 1800, 1900, or 2000 of FIGS. 18, 19, and 20, respectively, the control matrix 2300 does not require a distinct charging sequence or any variation or pulsing of the voltage from charge interconnect 2310.

As was the case in control matrix 2200 of FIG. 22, the flip-flop switching circuit can be recognized as the cross coupling of two inverters, namely a shutter open inverter (transistors Q16 and Q18) and a shutter close inverter (transistors Q20 and Q22).

In either of its stable states, the flip-flop circuit formed by transistors Q16, Q18, Q20, and Q22 is associated with substantially zero DC current flow, and therefore forms a low power voltage switching circuit. This is achieved because of the use of complementary (CMOS) transistor types.

The flip-flop operation of control matrix 2300 allows for a constant voltage actuation of the shutter assembly 2304, without the need for voltage stabilizing capacitors, such as capacitor 2031 or 2033 in control matrix 2000 of FIG. 20. This is because one of the charging transistors Q16 or Q20 remains on throughout the actuation event, allowing the corresponding actuator to maintain a low impedance connection to the DC supply of the interconnect 2210 throughout the actuation event.

At the beginning of each frame addressing cycle the control matrix 2300 applies a write enable voltage to each scan-line interconnect 2306 in sequence. While a particular row of pixels 2302 is write-enabled, the control matrix 2300 applies a data voltage to the data interconnect 2308. The application of $V_{we}$ to the scan-line interconnect 2306 for the write-enabled row turns on the write-enable transistor Q17 of the pixels 2302 in the corresponding scan line. The voltages applied to the data interconnect 2308 is thereby caused to be stored on the data store capacitor 2319 of the respective pixels 2302.

The functions of the inverters with transistors Q31 through Q41 will now be explained. The level shifting inverter 2332 outputs a voltage $V_{dd}$ (derived from supply interconnect 2334), e.g. 8 volts, which is provisionally supplied to the input of the transition sharpening inverter 2336, depending on the voltage state of capacitor C19. The transition-sharpening inverter 2336 outputs the inverse or complement of its input from the voltage leveling inverter 2332, and supplies that complement voltage to both the switching inverter 2340, as well as to the gate of transistor Q22. (By complement we mean that if the output of the voltage leveling inverter is $V_{dd}$, then the output of the transition sharpening inverter will be near to zero, and vice versa.) The output of the switching inverter 2340 supplies a voltage to the gate of transistor Q18, which is again the complement of the voltage supplied from the transition-sharpening inverter 2336.

In a manner similar to the function of transistors 2135 and 2137 from control matrix 2100 of FIG. 21, the switching inverter 2340 ensures that only one of the discharge transistors Q18 or Q22 can be on at any one time, thereby ensuring proper actuation of shutter assembly 2304. The presence of the switching inverter 2340 obviates the need for a separate shutter-close data interconnect.

The level shifting inverter 2332 requires only a low voltage input (e.g. 3 volts) and outputs a complement which is shifted to the higher voltage of $V_{dd}$ (e.g. 8 volts). For instance, if the voltage on capacitor C19 is 3 volts, then the output voltage from inverter 2332 will be close to zero, while if the voltage on capacitor C19 is close to zero, then the output from the inverter 2332 will be at $V_{dd}$ (e.g. 8 volts). The presence of the level shifting inverter, therefore, provides several advantages. A higher voltage (e.g. 8 volts) is supplied as a switch voltage to discharge transistors Q18 and Q22. But the 8 volts required for such switching is derived from a power supply, interconnect 2334, which is a DC supply and which only needs to provide enough current to charge the gate capacitance on various transistors in the pixel. The power required to drive the supply interconnect 2334 will, therefore, be only a minor contributor to the power required to drive shutter assembly 2304. At the same time the data voltage, supplied by data interconnect 2308 and stored on capacitor C19, can be less than 5 volts (e.g. 3 volts) and the power associated with AC voltage variations on interconnect 2308 will be substantially reduced.

The transition-sharpening inverter 2336 helps to reduce the switching time or latency between voltage states as output to the discharge transistor Q22 and to the switching inverter 2340. Any reduction in switching time on the inputs to the CMOS switching circuit (Q16 through Q22) helps to reduce the transient switching currents experienced by that circuit.

The combination of the CMOS switching circuit, with transistors Q16 through Q22, the CMOS switching inverter 2340, and the CMOS level shifting inverter 2332 makes the control matrix 2300 an attractive low power method for driving an array of shutter assemblies 2304. Reliable actuation of even dual-actuator shutter assemblies, such as shutter assembly 2304, is achieved with the use of only a single storage capacitor, C19, in each pixel.

In control matrix 2300 the global actuation interconnect 2314 is connected to the source of transistors Q31, Q35, Q39, Q18, and Q22. Maintaining the global actuation interconnect 2314 at a potential significantly above that of the shutter common interconnect 2315 prevents the turn-on of any of the transistors Q31, Q35, Q39, Q18, and Q22, regardless of what charge is stored on the capacitor C19. Global actuation in control matrix 2300 is achieved by bringing the potential on the global actuation interconnect 2314 to substantially the same potential as the shutter common interconnect 2315. During the time that the global actuation is so activated, all of the transistors Q31, Q35, Q39, Q18, and Q22 have the opportunity to change their state, depending on what data voltage has been stored on capacitor C19.

The voltage supplied by supply interconnect 2334, $V_{dd}$, is not necessarily the same as the actuation voltage $V_{at}$, as supplied by the charge interconnect 2310. Therefore, some optional specifications on transistors Q16 through Q22 can help to reduce the transient switching currents in control matrix 2300. For instance it may be preferable to increase the width to length ratio in the discharge transistors Q18 and Q22 as compared to the charge transistors Q16 and Q20. The ratio of width to length for the discharge transistors may vary between 1 and 10 while the ratio of length to width for the charge transistors may vary between 0.1 and 1. Similarly the width to length ratio between level shifting transistors Q31 and Q33 should be similarly differentiated. For instance, the ratio of width to length for transistor Q31 may vary between 1 and 10 while the ratio of width to length for transistor Q33 may vary between 0.1 and 1.

In operation, in order to periodically reverse the polarity of voltages supplied to the shutter assembly 2304, the control matrix 2300 alternates between two control logics as described in relation to control matrix 1600 of FIG. 16A.

Alternative embodiments to control matrix 2300 are also possible. For instance, the level shifting inverters 2332 and the transition sharpening inverter 2336 can be removed from the circuit as long as the voltage supplied by the data interconnect 2308 is high enough to switch the flip-flop circuit reliably. As this required switching voltage may be as high as 8 volts, the power dissipation for such a simplified circuit is expected to increase by comparison to control matrix 2300. The simplified circuit would, however, require less real estate and could therefore be packed to higher pixel densities.

In another alternative to control matrix 2300, the precharge circuit from control matrices 2000 and 2100 of FIGS. 20 and 21, respectively, can be substituted into control matrix 2300, in place of transistors Q16, Q18, Q20, and Q22. For such a control matrix the transition sharpening inverter 2336 would no longer be necessary. To the extent that both pMOS and nMOS remain available to this CMOS circuit, both types of transistors would still be beneficial in the level shifting inverter 2332 and in the switching inverter 2340. This circuit would thereby exhibit power dissipation advantages by comparison to control matrix 2100 of FIG. 21.

Figure 24:
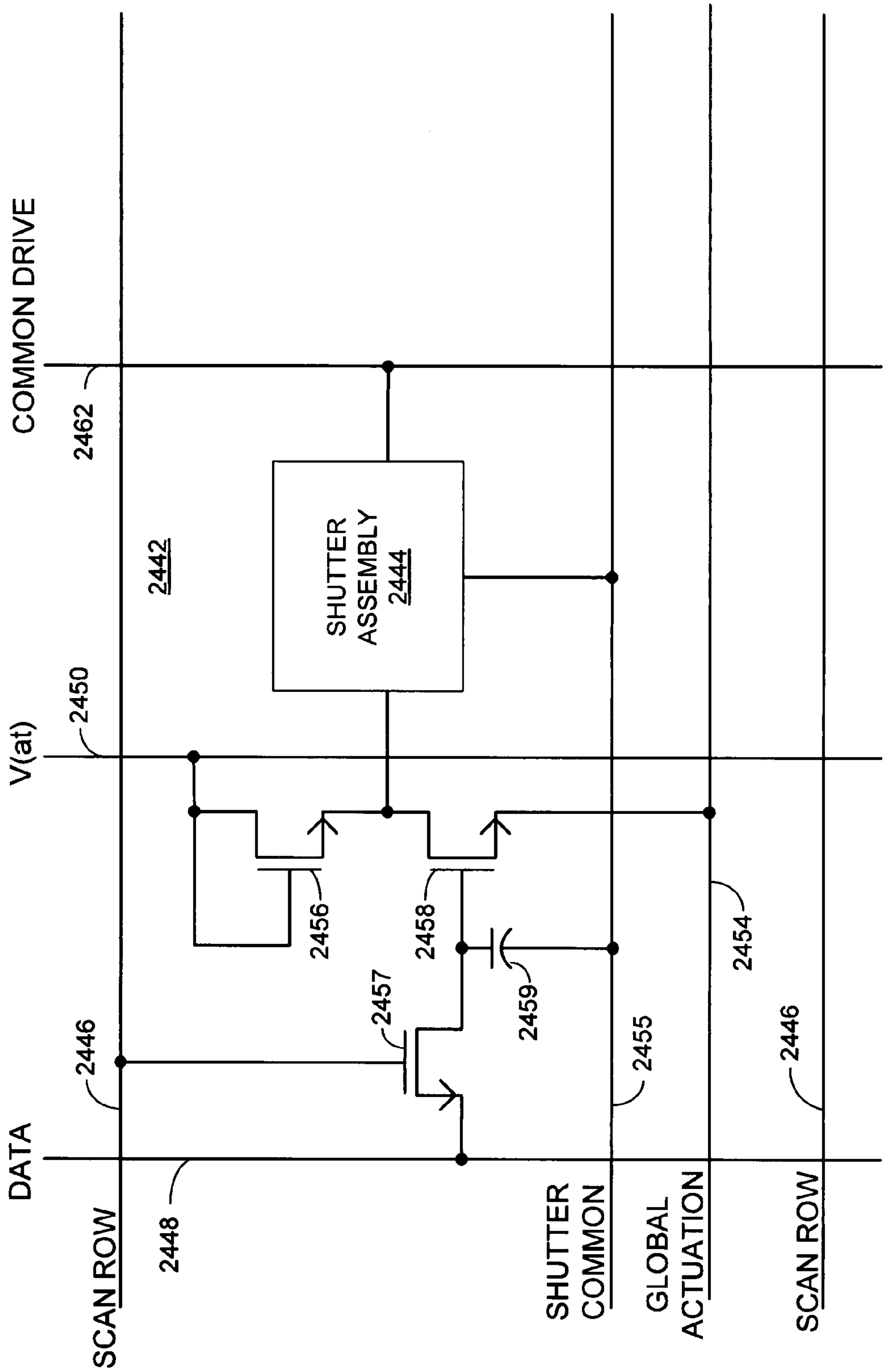
FIG. 24 is a diagram of an eighteenth control matrix suitable for controlling the shutter assemblies of the display apparatus of FIG. 1, according to an illustrative embodiment of the invention.

FIG. 24 is yet another suitable control matrix 2440 for inclusion in the display apparatus 100, according to an illustrative embodiment of the invention. Control matrix 2440 controls an array of pixels 2442 that include dual-actuator shutter assemblies 2444 (i.e., shutter assemblies with both shutter-open and shutter-close actuators). The actuators in the shutter assemblies 2444 can be made either electrically bi-stable or mechanically bi-stable.

Control matrix 2440 is substantially the same as control matrix 1640 of FIG. 16B, except for three changes. A dual-actuator shutter assembly 2444 is utilized instead of the elastic shutter assembly 1644, a new common drive interconnect 2462 is added, and there is no voltage stabilizing capacitor, such as capacitor 1652, in control matrix 2440. For the example given in control matrix 2440, the common drive interconnect 2462 is electrically connected to the shutter-open actuator of the shutter assembly 2444.

Despite the presence of a dual-actuator shutter assembly 2444, the control matrix 2440 includes only a single data interconnect 2448 for each column of pixels 2442 in the control matrix. The actuators in the shutter assemblies 2444 can be made either electrically bi-stable or mechanically bi-stable.

The control matrix 2440 includes a scan-line interconnect 2446 for each row of pixels 2442 in the control matrix 2440. The control matrix 2440 further includes a charge interconnect 2450, a global actuation interconnect 2454, and a shutter common interconnect 2455. The interconnects 2450, 2454, 2455, and 2462 are shared among pixels 2442 in multiple rows and multiple columns in the array. In one implementation (the one described in more detail below), the interconnects 2450, 2454, 2455, and 2462 are shared among all pixels 2442 in the control matrix 2440.

Each pixel 2442 in the control matrix includes a shutter charge transistor 2456, a shutter discharge transistor 2458, a shutter write-enable transistor 2457, and a data store capacitor 2459 as described in FIGS. 16A and 19. For the example given in control matrix 2440 the drain of the shutter discharge transistor is connected to the shutter-close actuator of the shutter assembly 2444.

By comparison to control matrix 1600 of FIG. 16A, the charging transistor 2456 is wired with a different circuit connection to the charge interconnect 2450. Control matrix 2440 does not include a charge trigger interconnect which is shared among pixels. Instead, the gate terminals of the charging transistor 2456 are connected directly to the charge interconnect 2450, along with the drain terminal of transistor 2456. In operation, the charging transistors operate essentially as diodes, i.e., they can pass a current in only 1 direction. Their function in the charging circuit becomes equivalent to that of diode 1410 in control circuit 1400 of FIG. 14.

Figure 25:
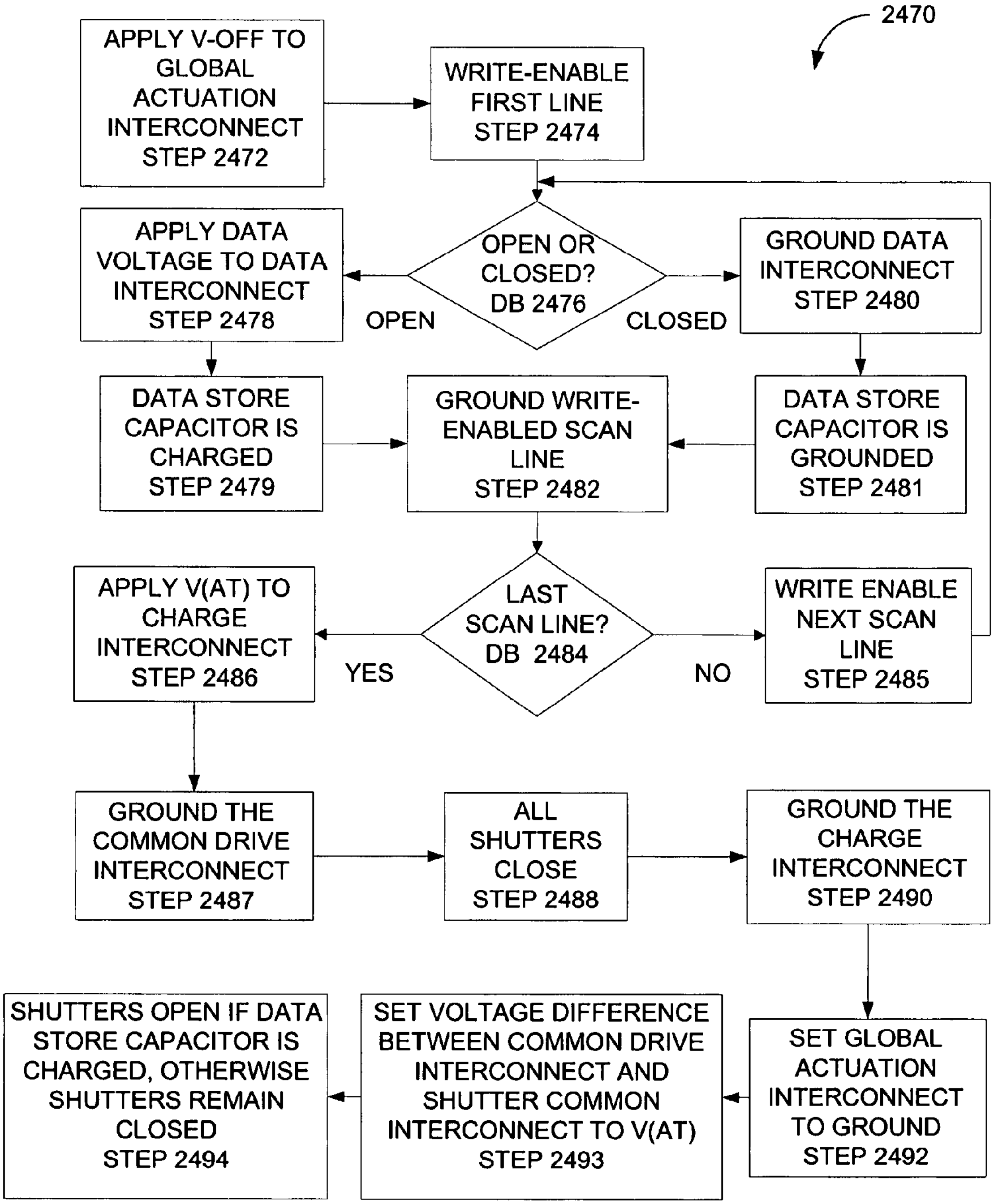
FIG. 25 is a flow chart of a method of addressing the pixels of the control matrix of FIG. 24, according to an illustrative embodiment of the invention.

A method of addressing and actuating the pixels in control matrix 2440 is illustrated by the method 2470 shown in FIG. 25. The method 2470 proceeds in three general steps. First the matrix is addressed row by row by storing data into the data store capacitors 2459. Next all actuators are actuated (or reset) simultaneously (step 2488) in part by applying a voltage $V_{at}$ to the charge interconnect 2450. And finally the image is set in steps 2492-2494 by a) selectively activating transistors 2458 by means of the global actuation interconnect 2454 and b) changing the potential difference between the common drive interconnect 2462 and the shutter common interconnect 2455 so as to be greater than an actuation voltage $V_{at}$.

As described with respect to control method 1000 of FIG. 10, or with respect to control matrix 1400 of FIG. 14, the control matrix 2440 can operate between two control logics—which provide a periodic polarity reversal and thereby ensure a 0V DC average operation across the shutter assemblies 2442. For reasons of clarity the details for control method 2470 are described next with respect to only the first control logic. In this first control logic the potential of the shutter common interconnect 2455 is maintained at all times near to the ground potential. A shutter will be held in either the open or closed states by applying a voltage $V_{at}$ directly across either or both of the charge interconnect 2450 or the common drive interconnect 2462. (In the second control logic, to be described after we complete the discussion of FIG. 25, the shutter common interconnect is held at the voltage $V_{at}$, and an actuated state will be maintained by maintaining either or both of the charge interconnect 2450 or the common drive interconnect 2462 at ground.)

More specifically for the first control logic of method 2470, the frame addressing cycle of method 2470 begins when a voltage $V_{off}$ is applied to the global actuation interconnect 2454 (step 2472). The voltage $V_{off}$ on interconnect 2454 is designed to ensure that the discharge transistor 2458 will not turn on regardless of whether a voltage has been stored on capacitor 2459.

The control matrix 2440 then proceeds with the addressing of each pixel 2442 in the control matrix, one row at a time (steps 2474-2484). To address a particular row, the control matrix 2440 write-enables a first scan line by applying a voltage $V_{we}$ to the corresponding scan-line interconnect 2446 (step 2474). Then, at decision block 2476, the control matrix 2440 determines for each pixel 2442 in the write-enabled row whether the pixel 2442 needs to be open or closed. For example, if at the reset step 2488 all shutters are to be (temporarily) closed, then at decision block 2476 it is determined for each pixel 2442 in the write-enabled row whether or not the pixel is to be (subsequently) opened. If a pixel 2442 is to be opened, the control matrix 2440 applies a data voltage $V_d$, for example 5V, to the data interconnect 2448 corresponding to the column in which that pixel 2442 is located (step 2478). The voltage $V_d$ applied to the data interconnect 2448 is thereby caused to be stored by means of a charge on the data store capacitor 2459 of the selected pixel 2442 (step 2479). If at decision block 2476, it is determined that a pixel 2442 is to be closed, the corresponding data interconnect 2448 is grounded (step 2480). Although the temporary (or reset) position after step 2488 in this example is defined as the shutter-close position, alternative shutter assemblies can be provided in which the reset position after 2488 is a shutter-open position. In these alternative cases, the application of data voltage $V_d$, at step 2478, would result in the opening of the shutter.

The application of $V_{we}$ to the scan-line interconnect 2446 for the write-enabled row turns on all of the write-enable transistors 2457 for the pixels 2442 in the corresponding scan line. The control matrix 2440 selectively applies the data voltage to all columns of a given row in the control matrix 2440 at the same time while that row has been write-enabled. After all data has been stored on capacitors 2459 in the selected row (steps 2479 and 2481), the control matrix 2440 grounds the selected scan-line interconnect (step 2482) and selects a subsequent scan-line interconnect for writing (step 2485). After the information has been stored in the capacitors for all the rows in control matrix 2440, the decision block 2484 is triggered to begin the global actuation sequence.

The actuation sequence begins at step 2486 of method 2470, with the application of an actuation voltage $V_{at}$, e.g. 40 V, to the charge interconnect 2450. As a consequence of step 2486, the voltage $V_{at}$ is now imposed simultaneously across all of the shutter-close actuators of all the shutter assemblies 2444 in control matrix 2440. Next, at step 2487, the potential on the common drive interconnect 2462 is grounded. In this first control logic (with the shutter common potential 2455 held near to ground) a grounded common drive interconnect 2462 reduces the voltage drop across all of the shutter-open actuators of all shutter assemblies 2444 to a value substantially below the maintenance voltage $V_m$. The control matrix 2440 then continues to maintain these actuator voltages (from steps 2486 and 2487) for a period of time sufficient for all actuators to actuate (step 2488). For the example given in method 2470, step 2488 acts to reset and close all actuators into an initial state. Alternatives to the method 2470 are possible, however, in which the reset step 2488 acts to open all shutters. For this case the common drive interconnect 2462 would be electrically connected to the shutter-closed actuator of all shutter assemblies 2444.

At the next step 2490 the control matrix grounds the charge interconnect 2450. The electrodes on the shutter-close actuators in shutter assembly 2444 provide a capacitance which stores a charge after the charge interconnect 2450 has been grounded and the charging transistor 2456 has been turned off. The stored charge acts to maintain a voltage in excess of the maintenance voltage $V_m$ across the shutter-close actuator.

After all actuators have been actuated and held in their closed position by a voltage in excess of $V_m$, the data stored in capacitors 2459 can now be utilized to set an image in control matrix 2440 by selectively opening the specified shutter assemblies (steps 2492-2494). First, the potential on the global actuation interconnect 2454 is set to ground (step 2492). Step 2492 makes it possible for the discharge switch transistor 2458 to turn-on in accordance to whether a data voltage has been stored on capacitor 2459. For those pixels in which a voltage has been stored on capacitor 2459, the charge which was stored on the shutter-close actuator of shutter assembly 2444 is now allowed to dissipate through the global actuation interconnect 2454.

Next, at step 2493, the voltage on the common drive interconnect 2462 is returned to the actuation voltage $V_{at}$, or is set such that the potential difference between the common drive interconnect 2462 and the shutter common interconnect 2455 is greater than an actuation voltage $V_{at}$. The conditions for selective actuation of the pixels have now been set. For those pixels in which a charge (or voltage $V_d$) has been stored on capacitor 2459, the voltage difference across the shutter-close actuator will now be less than the maintenance voltage $V_m$ while the voltage across the shutter-open actuator (which is tied to the common drive 2462) will at $V_{at}$. These selected shutters will now be caused to open at step 2494. For those pixels in which no charge has been stored on capacitor 2459, the transistor 2458 remains off and the voltage difference across the shutter-close actuator will be maintained above the maintenance voltage $V_m$. Even though a voltage $V_{at}$ has been imposed across the shutter-open actuator, the shutter assembly 2444 will not actuate at step 2494 and will remain closed. The control matrix 2440 continues to maintain the voltages set after steps 2492 and 2493 for a period of time sufficient for all selected actuators to actuate during step 2494. After step 2494, each shutter is in its addressed state, i.e., the position dictated by the data voltages applied during the addressing and actuating method 2470.

To set an image in a subsequent video frame, the process begins again at step 2472.

In alternate embodiments, the positions of the steps 2486 and 2487 in the sequence can be switched, so that step 2487 occurs before step 2486.

In the method 2470, all of the shutters are closed simultaneously during the time between step 2488 and step 2494, a time in which no image information can be presented to the viewer. The method 2470, however, is designed to minimize this dead time (or reset time), by making use of data store capacitors 2459 and global actuation interconnect 2454 to provide timing control over the transistors 2458. By the action of step 2472, all of the data for a given image frame can be written to the capacitors 2459 during the addressing sequence (steps 2474-2485), without any immediate actuation effect on the shutter assemblies. The shutter assemblies 2444 remain locked in the positions they were assigned in the previous image frame until addressing is complete and they are uniformly actuated or reset at step 2488. The global actuation step 2492 allows the simultaneous transfer of data out of the data store capacitors 2459 so that all shutter assemblies can be brought into their next image state at the same time.

As with the previously described control matrices, the activity of an attached backlight can be synchronized with the addressing of each frame. To take advantage of the minimal dead time offered in the addressing sequence of method 2470, a command to turn the illumination off can be given between step 2484 and step 2486. The illumination can then be turned-on again after step 2494. In a field-sequential color scheme, a lamp with one color can be turned off after step 2484 while a lamp with either the same or a different color is turned on after step 2494.

In other implementations, it is possible to apply the method 2470 of FIG. 25 to a selected portion of the whole array of pixels, since it may be advantageous to update different areas or groupings of rows and columns in series. In this case a number of different charge interconnects 2450, global actuation interconnects 2454, and common drive interconnects 2462 could be routed to selected portions of the array for selectively updating and actuating different portions of the array.

As described above, to address the pixels 2442 in the control matrix 2440, the data voltage $V_d$ can be significantly less than the actuation voltage $V_{at}$ (e.g., 5V vs. 40V). Since the actuation voltage $V_{at}$ is applied once a frame, whereas the data voltage $V_d$ may be applied to each data interconnect 2448 as may times per frame as there are rows in the control matrix 2440, control matrices such as control matrix 2440 may save a substantial amount of power in comparison to control matrices which require a data voltage to be high enough to also serve as the actuation voltage.

It will be understood that the embodiment of FIG. 24 assumes the use of n-channel MOS transistors. Other embodiments are possible that employ p-channel transistors, in which case the relative signs of the bias potentials $V_{at}$ and $V_d$ would be reversed.

In operation, the control matrix alternates between two control logics as described with respect to control method 1000 of FIG. 10, or with respect to control matrix 1400 of FIG. 14. The two control logics provide a periodic polarity reversal and thereby ensure a 0V DC average operation across the shutter assemblies 2442. To achieve polarity reversal in the second control logic several of the voltage assignments illustrated and described with respect to method 2470 of FIG. 25 are changed, although the sequencing of the control steps remains the same.

In the second control logic, the potential on the shutter common interconnect 2455 is maintained at a voltage near to $V_{at}$ (instead of near ground as was the case in the first control logic). In the second control logic, at step 2478, where the logic is set for the opening of a shutter assembly, the data interconnect 2448 is grounded instead of taken to $V_d$. At step 2480, where the logic is set for the closing of a shutter assembly, the data interconnect is taken to the voltage $V_d$. Step 2486 remains the same, but at step 2487 the common drive interconnect is set to the actuation voltage $V_{at}$ in the second control logic instead of to ground. At the end of step 2487 in the second control logic, therefore, each of the shutter common interconnect 2455, the common drive interconnect 2462, and the charge interconnect 2450 are set to the same voltage $V_{at}$. The image setting sequence then continues with grounding of the global actuation interconnect 2454 at step 2492—which has the effect in this second logic of closing only those shutters for which a voltage $V_d$ was stored across the capacitor 2459. At step 2493 in the second control logic the common drive interconnect 2462 is grounded. This has the effect of actuating and opening any shutters that were not otherwise actuated at step 2492. The logical state expressed at step 2494, therefore, is reversed in the second control logic, and the polarities are also effectively reversed.

Generally speaking any of the control matrices 1100, 1300, 1400, 1500, or 1700, which were illustrated through the use of single-actuated or elastic shutter assemblies, can be adapted advantageously for use with a dual-actuated shutter assembly such as 1904 by reproducing the control circuit in mirror fashion for each of the open and closed actuators. As shown in method 800 of FIG. 8, the data supplied to the data-open interconnects and the data-closed interconnects will often be complementary, i.e. If a logical “1” is supplied to the data-open interconnect then a logical “0” will typically be supplied to the data closed interconnect. In additional alternative implementations, the control matrices can be modified to replace the transistors with varistors.

In alternative implementations, the control matrix keeps track of the prior position of each pixel and only applies positions to the data interconnects corresponding to a pixel if the state of the pixel for the next image frame is different than the prior position. In another alternative embodiment, the pixels include mechanically bi-stable shutter assemblies instead of just electrically bi-stable shutter assemblies. In such an embodiment, the charge trigger transistors can be replaced with resistors and the charge trigger interconnect can be omitted from the control matrix, as described above in relation to FIG. 18. The dual control logic used by control matrix 1400 may also be utilized in other implementations of control matrix 1800.

Figure 26:
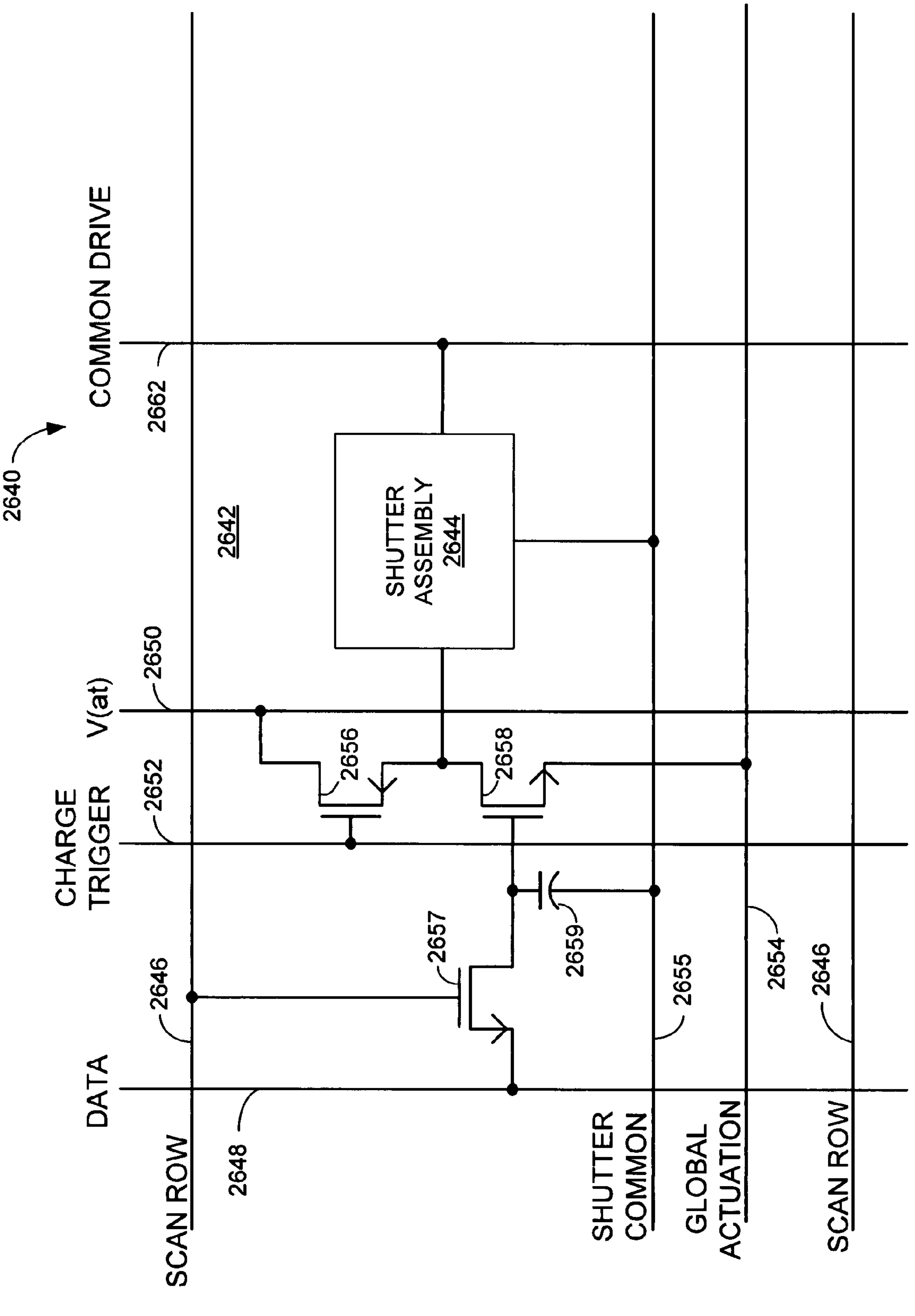
FIG. 26 is a schematic diagram of yet another suitable control matrix for inclusion in the display apparatus, according to an illustrative embodiment of the invention.

FIG. 26 is a schematic diagram of yet another suitable control matrix 2640 for inclusion in the display apparatus 100, according to an illustrative embodiment of the invention. Control matrix 2640 controls an array of pixels 2642 that include dual-actuator shutter assemblies 2644 (i.e., shutter assemblies with both shutter-open and shutter-close actuators). The actuators in the shutter assemblies 2004 can be made either electrically bi-stable or mechanically bi-stable.

Control matrix 2640 is substantially the same as control matrix 2440, with two changes: a charge trigger interconnect 2652 has been added and a pMOS transistor has been substituted for the charging transistor 2656 instead of the nMOS transistor as was indicated at 2456.

The control matrix 2640 utilizes a dual-actuator shutter assembly 2644 along with a common drive interconnect 2662. For the example given in control matrix 2640 the common drive interconnect 2662 is electrically connected to the shutter-open actuator of the shutter assembly 2644. Despite the presence of a dual-actuator shutter assembly 2644, the control matrix 2640 includes only a single data interconnect 2648 for each column of pixels 2642 in the control matrix.

The control matrix 2640 includes a scan-line interconnect 2646 for each row of pixels 2642 in the control matrix 2640. The control matrix 2640 further includes a charge interconnect 2650, a charge trigger interconnect 2652, a global actuation interconnect 2654, and a shutter common interconnect 2655. The interconnects 2650, 2654, 2655, and 2662 are shared among pixels 2642 in multiple rows and multiple columns in the array. In one implementation (the one described in more detail below), the interconnects 2650, 2654, 2655, and 2662 are shared among all pixels 2642 in the control matrix 2640.

Each pixel 2642 in the control matrix includes a shutter charge transistor 2656, a shutter discharge transistor 2658, a shutter write-enable transistor 2657, and a data store capacitor 2659 as described in FIGS. 16 and 18. For the example given in control matrix 2644 the drain of the shutter discharge transistor is connected to the shutter-close actuator of the shutter assembly 2644.

The control matrix 2640 makes use of two complementary types of transistors: both p-channel and n-channel transistors. It is therefore referred to as a complementary MOS control matrix or a CMOS control matrix. While the charging transistor 2656 is made of the pMOS type, the discharge transistor 2658 is made of the nMOS type of transistor. (In other implementations the types of transistors can be reversed, for example nMOS transistors can be used for the charging transistors and pMOS transistors can be used for the discharge transistors.) The use of a charge trigger interconnect along with the CMOS circuit helps to reduce the set of voltage variations required to achieve shutter actuation.

With the use of the charge trigger interconnect 2652, the control circuit 2640 is wired to the charging transistor 2656 in a fashion similar to that of control matrix 1600. Only the source of pMOS transistor 2656 is connected to the charge interconnect 2650 while the gate is connected to the charge trigger interconnect 2652. Throughout operation, the charge interconnect 2650 is maintained at a constant voltage equal to the actuation voltage $V_{at}$. The charge trigger interconnect 2652 is maintained at the same voltage ($V_{at}$) as that of the charge interconnect whenever the charge transistor 2656 is to be held in the off state. In order to turn-on the charge transistor 2656, the voltage on the charge trigger interconnect 2652 is reduced so that the voltage difference between charge interconnect 2650 and interconnect 2652 is greater than the threshold voltage of the transistor 2656. Threshold voltages can vary in a range from 2 to 8 volts. In one implementation where the transistor 2656 is a pMOS transistor, both the charge interconnect 2650 and the charge trigger interconnect 2652 are held at a $V_{at}$ of 40 volts when the transistor 2656 is off. In order to turn transistor 2656 on, the voltage on the charge interconnect 2650 would remain at 40 volts while the voltage on the charge trigger interconnect 2652 is temporarily reduced to 35 volts. (If an nMOS transistor were to be used at the point of transistor 2656, then the $V_{at}$ would be −40 volts and a charge trigger voltage of −35 volts would be sufficient to turn the transistor on.)

A method for addressing and actuating pixels in control matrix 2640 is similar to that of method 2470, with the following changes. At step 2486 the voltage on the charge trigger interconnect is reduced from $V_{at}$ to $V_{at}$ minus a threshold voltage. Similar to the operation of method 2470 all of the shutter-closed actuators then become charged at the same time, and at step 2488 all shutters will close while a constant voltage $V_{at}$ is maintained across the shutter close actuator. In another modification to the method 2470, at step 2490, the charge interconnect 2650 is allowed to remain at $V_{at}$ while the transistor 2656 is turned off by returning the voltage on the charge trigger interconnect 2652 to $V_{at}$. After the transistor 2656 is turned off, the actuation procedure proceeds to the global actuation step 2492.

The actuator charging process at step 2486 in method 2470 can be accomplished as described above for control matrix 2640 with nearly zero voltage change on the charge interconnect 2650 and only a minimal (threshold voltage) change required for the charge trigger interconnect 2652. Therefore the energy required to repeatedly change the voltage from Vat to ground and back is saved in this control matrix. The power required to drive each actuation cycle is considerably reduced in control matrix 2640 as compared to control matrix 2440.

In a similar fashion, the use of complementary nMOS and pMOS transistor types can be applied to the charging transistors in control matrices 1500, 1600, 1700, 1800, 1900, 2000, 2100, 2200, and 2300 to reduce the power required for actuation.

Figure 27:
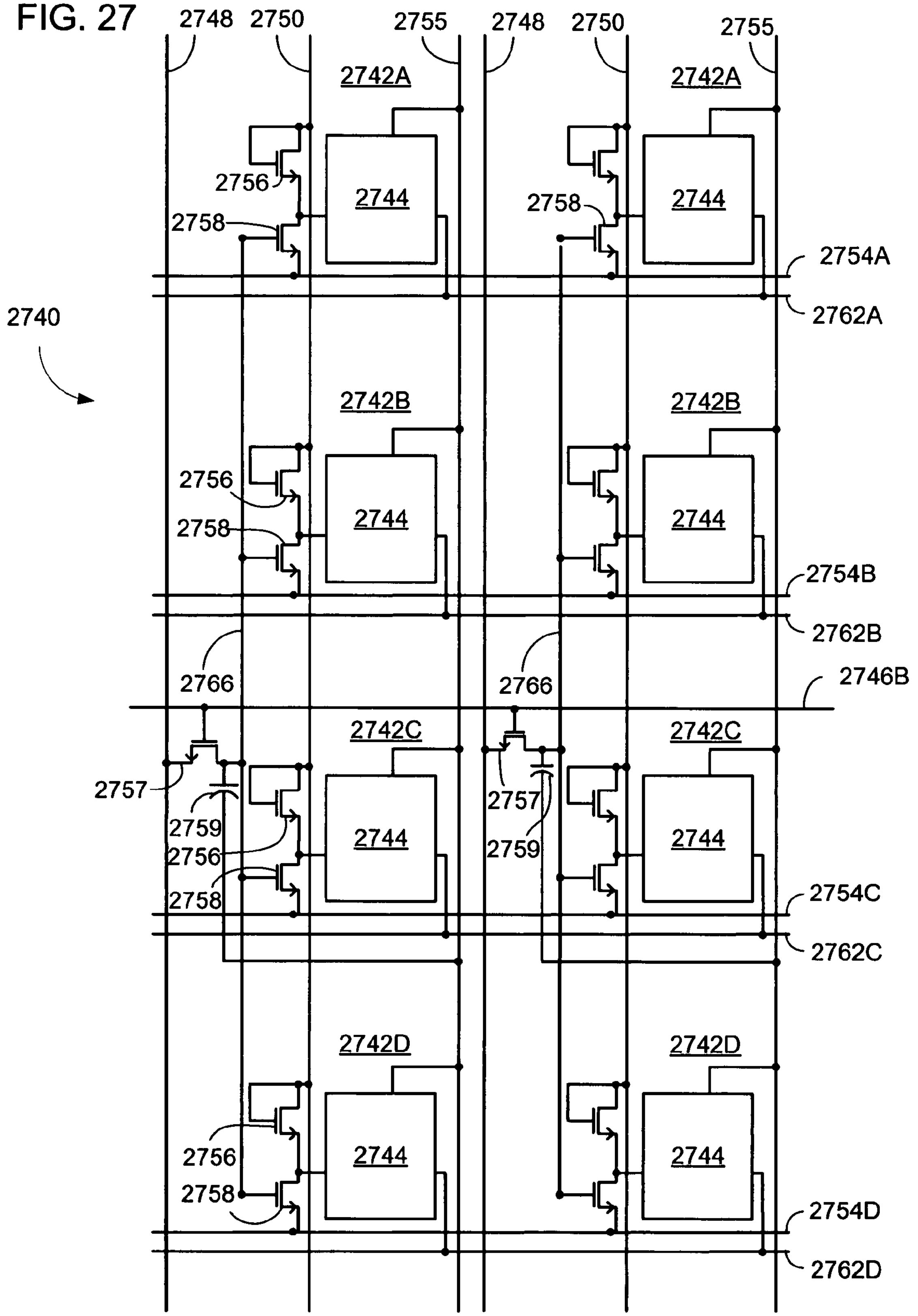
FIG. 27 is a schematic diagram of another control matrix suitable for inclusion in the display apparatus, according to an illustrative embodiment of the invention.

FIG. 27 is a schematic diagram of another control matrix 2740 suitable for inclusion in the display apparatus 100, according to an illustrative embodiment of the invention. Control matrix 2740 operates in a manner substantially similar to that of control matrix 2440, except that some of the circuit elements are now shared between multiple shutter assemblies in the array of shutter assemblies. In addition several of the common interconnects are wired into separate groups, such that each of these common interconnects are shared only amongst the pixels of their particular group.

The control matrix 2740 includes an array of dual-actuator shutter assemblies 2744. Similar to the control matrix 2440, however, the control matrix 2740 includes only a single data interconnect 2748 for each column of pixels 2742 in the control matrix. The actuators in the shutter assemblies 2744 can be made either electrically bi-stable or mechanically bi-stable.

The control matrix 2740 includes one scan-line interconnect 2746 which is shared amongst four consecutive rows of pixels 2742 in the array of pixels. Each pixel in the array is also connected to a global actuation interconnect, a common drive interconnect, a charge interconnect, and a shutter common interconnect. For the embodiment illustrated in FIG. 27, however, the pixels are identified as members of four separate groups which are connected in common only to certain interconnects within their particular group. The pixels 2742A, for instance, are aligned along the first row and are members of the first group in control matrix 2740. Each pixel in the group of pixels that include pixels 2742A is connected to a global actuation interconnect 2754A and a common drive interconnect 2762A. The pixels 2742B are aligned along the second row and are members of the second group in control matrix 2740. Each pixel in the group of pixels 2742B is connected to a global actuation interconnect 2754B and a common drive interconnect 2762B. Similarly the pixels 2742C in the third row are members of the third group of pixels which are connected in common to global actuation interconnect 2754C and common drive interconnect 2762C. Similarly the pixels 2742D in the third row are members of the third group of pixels which are connected in common to global actuation interconnect 2754D and common drive interconnect 2762D. The sequential pattern of rows including pixels 2742A, 2742B, 2742C, and 2742D is repeated for rows that continue both above and below the pixels illustrated in FIG. 27. Each group of four rows includes a single scan line interconnect 2746 which is shared between the four rows.

The global actuation interconnects 2754A, 2754B, 2754C, and 2754D are electrically independent of each other. A global actuation signal applied to the interconnect 2754A may actuate all pixels 2742A within that row of the array, as well as all pixels in similarly connected rows (that occur in every fourth row of the array). A global actuation signal applied to the interconnect 2754A, however, will not actuate any of the pixels in the other groups, e.g. it will not actuate the pixels 2742B, 2742C, or 2742D. In a similar fashion the common drive interconnects 2762A, 2762B, 2762C, and 2762D are electrically independent, connecting to all pixels within their particular group but not to any pixels outside of their group.

The control matrix 2740 further includes a charge interconnect 2750 and a shutter common interconnect 2755. The interconnects 2750 and 2755 are shared among pixels 2742 in multiple rows and multiple columns in the array. In one implementation (the one described FIG. 27), the interconnects 2750 and 2755 are shared among all pixels 2742 in the control matrix 2740.

Each pixel 2742 in the control matrix includes a shutter charge transistor 2756 and a shutter discharge transistor 2758. As described in FIG. 16B and FIG. 24 the charge transistor 2756 is connected between the charge interconnect 2750 and the shutter-closed actuator of shutter assemblies 2744 in each pixel. The shutter discharge transistor 2758 is connected between the shutter assembly 2744 and the particular global actuation interconnect 2754A, 2754B, 2754C, or 2754D assigned to its group. For the example given in control matrix 2740 the common drive interconnects 2762A, 2762B, 2762C, and 2762D are electrically connected to the shutter-open actuators of the shutter assemblies 2744 within their particular groups.

Near to the intersection of each data interconnect 2748 and each scan line interconnect 2746 is a write-enable transistor 2757, and a data store capacitor 2759. The transistors 2757 and capacitor 2759 appear in each column but, like the scan line interconnect 2746, they appear only once in every four rows. The function of these circuit elements is shared between the pixels in each of the four adjacent rows. A fan-out interconnect 2766 is used to connect the charge stored on the capacitor 2759 to the gates on each of the shutter discharge transistors 2758 within the column for the four adjacent rows.

The operation of shutter assemblies 2744 is very similar to that described for control matrix 2440 in method 2470. The difference is that, for control matrix 2740, the addressing and actuating of the pixels is carried out independently and during separate time intervals for each of the four pixel groups 2742A, 2742B, 2742C, and 2742D. For the embodiment of FIG. 27 the addressing for the pixels in group 2742A would proceed by applying Voff to the global actuation interconnect 2754A and applying a write-enable voltage to each of the scan line interconnects 2746 in turn. During the time that a scan line is write-enabled the data corresponding to each of the pixels of group A assigned to a particular scan line is loaded into the capacitor 2759 by means of the data interconnect 2748 in each column. After the addressing of the scan lines in the whole array is complete, the control matrix then proceeds to an actuation sequence as described from step 2486 to step 2494 in the method 2470. Except, for control matrix 2740, the data is loaded for only one group of pixels at a time (e.g. the pixels 2742A in group A) and the actuation proceeds by activating only the global actuation interconnect (2754A) and the common drive interconnect (2762A) for that particular group of pixels.

After actuation of pixels 2742A is complete, the control matrix proceeds with the loading of data into the second group of pixels, e.g. 2742B. The addressing of the second group of pixels (group B) proceeds by use of the same set of scan line interconnects 2746, data interconnects 2748, and data store capacitors 2759 as were employed for group A. The data stored in capacitors 2759 will only affect the actuation of the pixels 2742B in group B, however, since this data can only be transferred to the shutter assemblies of their particular group after actuation by means of the global actuation interconnect for the group, 2754B. The selective actuation of each the four pixel groups is accomplished by means of the independent global actuation interconnects 2754A, 2754B, 2754C, or 2754D and independent common drive interconnects 2762A, 2762B, 2762C, or 2762D.

In order to address and actuate all pixels in the array it is necessary to address and actuate the pixels in each of the four pixel groups 2742A, 2742B, 2742C, and 2742D sequentially. Considerable space savings, however, is accomplished in the array since the write enable transistors 2757 and the data store capacitors 2759 only need to be fabricated once for each adjacent set of four rows.

For the embodiment given in FIG. 27 the pixels in the array have been broken into four groups A, B, C, and D. Other embodiments are possible, however, in which the array can be broken into only 2 groups, into 3 groups, into 6 groups, or into 8 groups. In all of these cases the pixels of a group are connected in common to their own particular global actuation interconnect and common drive interconnect. For the case of 2 groups the scan line interconnect, the write-enable transistor, and the data store capacitor would appear in every other row. For the case of 6 groups the scan line interconnect, the write-enable transistor, and the data store capacitor would appear in every sixth row.

For the embodiment given in FIG. 27 the charge interconnect 2750 and shutter common interconnect 2755 are shared among pixels 2742 in multiple rows and multiple columns in the array. In other embodiments the charge interconnects and shutter common interconnects can also be assigned and shared only among particular groups, such as groups A, B, C, and D.

The sharing of actuation interconnects amongst distinct groups, and the sharing of scan line interconnects, write-enable transistors, and data store capacitors amongst adjacent rows has been described in an implementation particular to the control matrix 2440. Similar sharing of pixel elements, however, can be adopted with respect to a number of other control matrices, such as control matrices 1400, 1500, 1600, 1640, 1700, 1800, 1900, 2000, 2100, 2200, 2300, and 2640.

Voltage vs. Charge Actuation

As described above, in various embodiments of the invention, the MEMS-based light modulators used to form an image utilize electrostatic actuation, in which opposing capacitive members are drawn together during an actuation event. In some actuator implementations, depending on the geometry of the electrostatic members, the force drawing the capacitive members will vary in relation to the voltage applied across the electrostatic members. If the charge stored on the actuator is held constant, then the voltage and thus the force attracting the capacitive members, may decrease as the capacitive beams draw closer together. For such actuators, it is desirable to maintain a substantially constant voltage across the capacitive members to maintain sufficient force to complete actuation. For other actuator geometries (e.g., parallel plate capacitors), force is proportional to the strength of the electric field between the capacitive portions of the actuator, the electric field likewise being proportional to the amount of charge stored on the capacitive members. In such actuators, if an elastic restoring force is present which increases as capacitive members draw together, it may be necessary to increase the stored charge on the members to complete the actuation. An increase in stored charge and therefore the force of actuation can be accomplished by connecting the actuator to a source of charge, i.e. a constant voltage source.

Control matrix 1900 of FIG. 19 operates in conditions in which actuators are electrically isolated from a source of charge during actuation. Prior to actuation of either of the two actuators included in the pixel, charge yielding a voltage sufficient to initiate actuation of both actuators $V_{at}$, absent a maintenance voltage, is stored directly on each actuator. The actuators are then isolated from external voltage sources. At a later date, the charge stored on one of the actuators is discharged. The non-discharged actuator then actuates based solely on the constant charge previously stored on the actuator.

Figure 28:
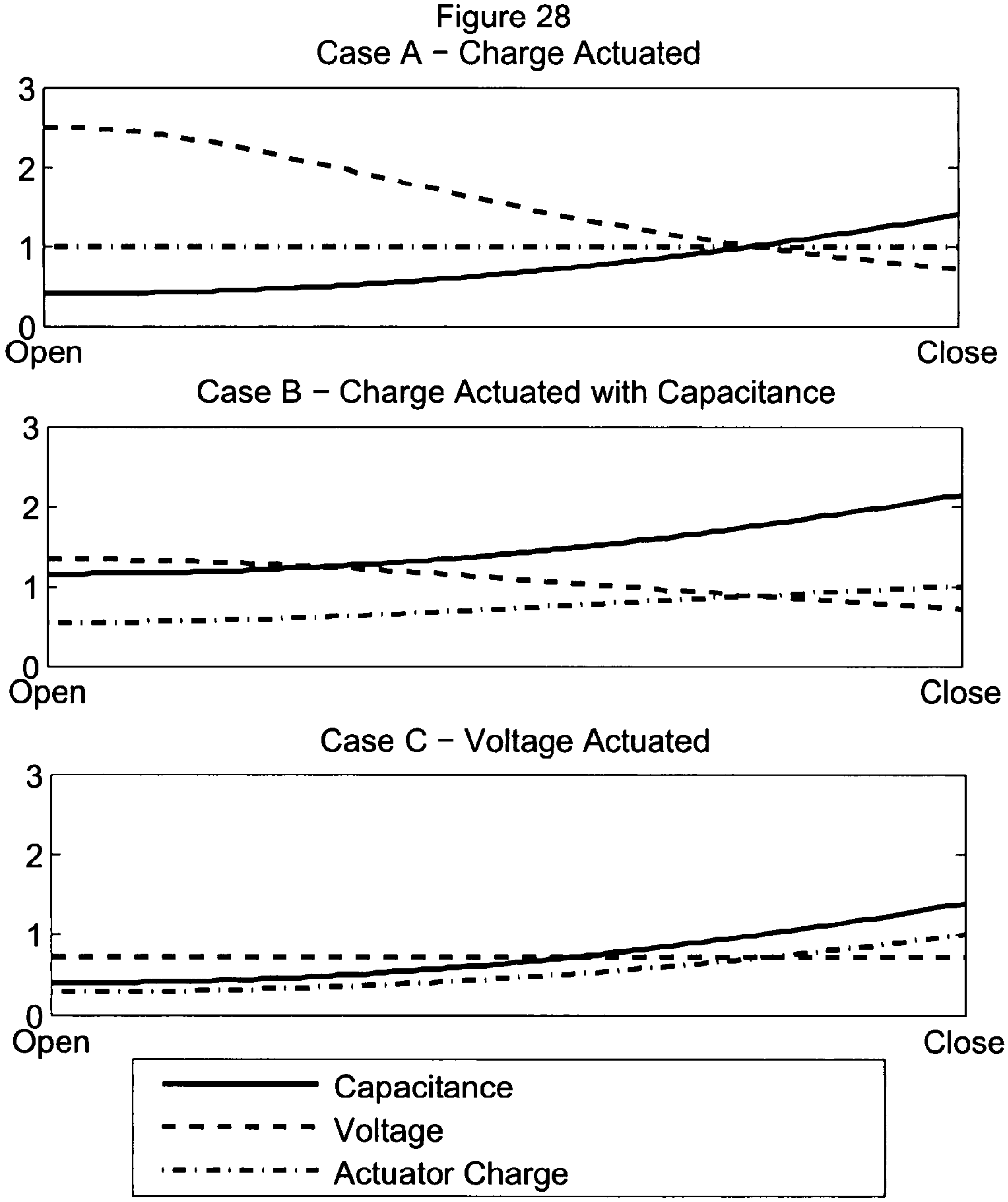
FIG. 28 includes three charts of voltage variations across portions of MEMS actuators that may result during actuation, according to various embodiments of the invention.

FIG. 28 includes three charts that illustrate the variations in electrostatic parameters that result from movement of portions of electrostatic actuators in various implementations of the invention. The chart labeled Case A in FIG. 28 illustrates the variations in parameters associated with the actuation of the actuator of a pixel from control matrix 1900 from an open position to a closed position. During actuation, since the actuator is electrically isolated, the charge remains constant. As the capacitive members draw closer together, the voltage decreases and the capacitance increases. To ensure proper actuation, the initial voltage applied to the actuator is preferably high enough such that as the voltage decreases resulting from motion of portions of the actuator, the resulting voltage is still sufficient to fully actuate the actuator.

To help ensure proper actuation without applying what might otherwise be an unnecessarily high voltage across the capacitive members of an actuator, a control matrix can incorporate a voltage regulator in electrical communication with the actuator during actuation of the actuator. The voltage regulator maintains a substantially constant voltage on the actuator during actuation. As a result, as the capacitance of the actuator increases as the capacitive elements draw closer together, additional charge flows into the capacitive members to maintain the voltage across the capacitive members, thereby maintaining the voltage level, increasing the electric field, and increasing the attractive force between the capacitive members. Thus, the voltage regulator substantially limits variations in voltage that would otherwise be caused by movement of portions of the actuators during actuation.

Voltage regulators can be included in each pixel in a control matrix, for example, as stabilizing capacitors connected to the capacitive members of the actuators. Control matrices 500, 700, 900, 1400, 1500, 1640, 1800, 2000, and 2100 include such stabilizing capacitors. The impact of such a stabilizing capacitor is depicted in the chart labeled as Case B in FIG. 28. In such implementations, as the capacitive members of an actuator draw closer together, charge stored on the stabilizing capacitor flows into the capacitive member maintaining a voltage equilibrium between the stabilizing capacitor and the actuator. Thus, the voltage on the actuator decreases, but less so than in control matrices without a stabilizing capacitor. Preferably, the stabilizing capacitor is selected such that during actuation, the variation in the voltage on the actuator is limited to less than about 20% of $V_{at}$. In other implementations, a higher capacitance capacitor is selected such that during actuation, the variation in the voltage on the actuator is limited to less than about 10% of $V_{at}$. In still other implementations, the stabilizing capacitor is selected such that during actuation, the variation in the voltage on the actuator is limited to less than about 5% of $V_{at}$.

Alternatively, display drivers may serve as voltage regulators. The display drivers output a DC actuation voltage. In some implementations, the voltage may be substantially constant throughout operation of the display apparatus in which it is incorporated. In such implementations, the application of the voltage output by the display drivers is regulated by transistors incorporated into each pixel in the control matrix. In other implementations, the display drivers switch between two substantially constant voltage levels according. In such implementations, no such transistors are needed. In some implementations the pixels are connected to the display drivers by means of a voltage actuation interconnect. In some implementations, such as control matrix 2640, a voltage actuation interconnect such as interconnect 2662, can be a global common interconnect, meaning that it connects to pixels in at least two rows and two columns of the array of pixels.

Control matrices 600, 1100, 1300, 1600, 1700, 1900, 2200, 2300, 2440, 2640, and 2740 include voltage regulators in the form of connections to voltage sources. As illustrated in Case C of FIG. 28, as the capacitive members of an electrostatic actuator connected to a voltage source draw together, the voltage across the capacitive members remains substantially constant. To maintain the constant voltage despite increasing capacitance, additional charge flows into the capacitive members as the capacitance of the actuator increases.

Gray Scale Techniques

Field Sequential Color

The display apparatus 100 provides high-quality video images using relatively low power. The optical throughput efficiency of a shutter-based light valve can be an order of magnitude higher than afforded by liquid crystal displays, because there is no need for polarizers or color filters in the production of the image. As described in U.S. patent application Ser. No. 11/218,690, filed on Sep. 2, 2005, a regenerative light guide can be designed which allows for 75% of the light produced in a backlight to be made available to a viewer.

Without the use of color filters, one method for producing video images in a shutter-based display is the use of field-sequential color. Color filters reduce the optical efficiency by >60% through absorption in the filters. Displays utilizing field sequential color instead use a backlight which produces pure red, green and blue light in an ordered sequence. A separate image is generated for each color. When the separate color images are alternated at frequencies in excess of 50 Hz, the human eye averages the images to produce the perception of a single image with a broad and continuous range of colors. Efficient backlights can now be produced that allow fast switching between pure colors from either light-emitting diode (LED) sources or electroluminescent sources.

The control matrices illustrated in FIGS. 5, 6, 7, 9, 11, 13-19 provide means for generating color-specific images (color sub-frame images), with accurate gray-tones, and the means for switching between color images in rapid fashion.

Formation of accurate images with field-sequential color can be improved by synchronization between the backlight and the pixel addressing process, especially since it requires a finite period of time to switch or reset each pixel between the required states of each color sub-frame. Depending on the control matrix used to address and actuate the pixels, if the option of global actuation is not employed, then the image controller may need to pause at each row or scan line of the display long enough for the mechanical switching or actuation to complete in each row. If the backlight were to broadly illuminate the whole display in a single color while the display controller was switching states, row by row, between 2 color images, then the resulting contrast would be confused.

Consider two examples illustrating the blanking times that can be employed with the backlight during resetting of an image between colors in a synchronized display. If the shutters require 20 microseconds to actuate or move between open and closed states, if the shutters are actuated in a row-by-row fashion, and if there are 100 rows, then it would require 2 milliseconds to complete the addressing. The synchronized backlight might then be turned-off during those 2 milliseconds. Note that if the display runs at a 60 Hz frame rate with 3 colors per frame, then there is only 5.6 msec allowed per color sub-frame and, in this example, the backlight would be off 36% of the time.

Alternately, when using a global actuation scheme for switching between color sub-frames, the same resetting of the image would require only 20 microseconds for the simultaneous movement of all shutters between images. The requirements for shutter speed are now substantially relaxed. If, during the color reset, the backlight were to be off for as much as 100 microseconds, the percentage of illumination time at 60 Hz frame rate is now better than 98%. Assuming a 100 microsecond image refresh time, it is now possible to increase the frame rate to 120 Hz with no substantial loss in illumination time. Using a frame rate of 120 Hz substantially reduces image artifacts induced by field sequential color, such as color breakup in fast moving video images.

Gray Scale

The number of unique colors available in the display is dependant in part on the levels of gray scale that are available within each of the three color images. Four principle methods of producing gray scale and combinations thereof are applicable to the transverse shutter displays.

Analog Gray Scale

The first method of producing gray scale is an analog method, by which the shutters are caused to only partially obstruct an aperture in proportion to the application of a partial actuation voltage. Transverse shutters can be designed such that the percent of transmitted light is proportional to an actuation voltage, for instance through control of the shape of the actuation electrodes as described above in relation to FIG. 2 and in more detail in U.S. patent application Ser. No. 11/251,035 referenced above.

For analog gray scale, the display apparatus is equipped with a digital to analog converter such that the voltage delivered to the pixels is proportional to the intended gray scale level. The proportional voltage on each actuator is maintained throughout the period of an image frame such that the proportional shutter position is maintained throughout the illumination period. The optional use of a capacitor placed in parallel with the actuators in FIGS. 2 and 17 helps to ensure that, even though some charge may leak from the pixel during the time of illumination, the voltage does not change appreciably so as to alter the shutter position during the period of illumination.

The analog gray scale has the advantage of requiring only 1 shutter in motion per pixel and the setting of only 1 image frame during the period of each color illumination. The data rates and addressing speeds for analog gray scale are therefore the least demanding amongst all alternative methods of gray scale.

Time Division Gray Scale

With proper design of the transverse shutter, a low voltage switching can be achieved which is fast. Transversely driven shutter assemblies, as described in U.S. patent application Ser. No. 11/251,035 referenced above, can be built having actuation times in the range of 3 microseconds to 100 microseconds. Such rapid actuation makes possible the implementation of time division gray scale, wherein the contrast is achieved by controlling the relative on-times or duty cycles of the actuated shutters. A time division gray scale can be implemented using digital gray scale coding, in that control matrices incorporating bi-stable shutter assemblies recognize two states of shutter actuation, on or off. Gray scale is achieved by controlling the length of time a shutter is open.

The switching times can be appreciated by assuming the case of a 60 Hz frame rate with field sequential color. Each color sub-frame is allotted 5.6 msec. If the available time interval were to be divided into 63 segments (6-bit gray scale per color), then the smallest increment of on-time for each image, known as the least significant bit time (LSB), would be 88 microseconds. If an image for the LSB time-bit were to be constructed and displayed using a global actuation scheme, then the actuation of all shutters would need to be completed in significantly less than the 88 microsecond LSB time. If the display is addressed in a row-by-row basis then the time available for reset at each row is considerably less. For a display with 100 rows, the available actuation time can be less than 0.5 microseconds per row. A number of controller algorithms are possible for relaxing the time intervals required for addressing shutters in a row-by-row scheme (see for example N. A. Clark et al., Ferroelectrics, v. 46, p. 97 (2000)), but in any case the time required for shutter actuation in the 6-bit gray scale example is considerably less than 20 microseconds.

Achieving multiple bits of gray scale through the use of time division multiplexing requires significant power in the addressing circuitry, since the energy lost in the actuation cycle is $\frac{1}{2}CV^2$ for each pixel through each refresh or addressing cycle in the control scheme (C is the capacitance of the pixel plus control electrodes and V is the actuation voltage). The circuit diagrams of FIGS. 11 and 13-19 reduce power requirements by decoupling and reducing the addressing voltages (the voltages required on the scan lines and data lines) from the actuation voltages (the voltages required to move a shutter).

Area Division Gray Scale

Another method that can reduce the addressing speed and power requirements of the time division gray scale is to allow for multiple shutters and actuators per pixel. A 6 bit binary time-division scheme (63 required time slots) can be reduced to a 5 bit time scheme (31 required time slots) by adding the availability of an additional gray scale bit in the spatial or area domain. The additional spatial bit can be accomplished with 2 shutters and apertures per pixel, especially if the shutters/apertures have unequal area. Similarly, if 4 shutters (with unequal areas) are available per pixel then the number of required time bits can be reduced to 3 with the result still being an effective 64 levels of gray scale per color.

Illumination Gray Scale

Another method that can relax the speed and/or real estate requirements for the above gray scale techniques is use of an illumination gray scale. The contrast achieved through the illumination of the color image can be adjusted or given finer gray levels by means of altered intensity from the backlight. If the backlight is capable of fast response (as in the case of LED backlights), then contrast can be achieved by either altering the brightness of the backlight or the duration of its illumination.

Let us consider one example, wherein it is assumed that the control matrix utilizes a global actuation scheme and that time division gray scale is accomplished through construction and display of distinct time-bit images illuminated for differing lengths of time. Take for example a 4-bit binary time coding scheme accomplished by dividing the color frame into 15 time slots. The image that is constructed for the shortest (LSB) time should be held for 1/15 of the available frame time. In order to expand to a 5-bit coding scheme one could, in the time domain, divide the color frame into 31 time slots, requiring twice the addressing speed. Alternately, one could assign only 16 time slots and assign to one of these time slots an image that is illuminated at only ½ the brightness or by a backlight that is flashed for an on period of only 1/31 of the frame time. As many as 3 additional bits of gray scale can be added on top of a 4 bit time-division coding scheme by adding these short time-duration images accompanied by partial illumination. If the partial illumination bits are assigned to the smallest of the time slices, then a negligible loss of average projected brightness will result.

Hybrid Gray Scale Schemes

The four principle means of gray scale are analog gray scale, time division gray scale, area division gray scale, and illumination gray scale. It should be understood that useful control schemes can be constructed by combinations of any of the above methods, for instance by combining the use of time division, area division and the use of partial illumination. Further divisions of gray scale are also available through interpolation techniques, also known as dither. Time domain dither includes the insertion of LSB time bits only in an alternating series of color frames. Spatial domain dither, also known as half-toning, involves the control or opening of a specified fraction of neighboring pixels to produce localized areas with only partial brightness.

The invention may be embodied in other specific forms without departing from the spirit or essential characteristics thereof. The forgoing embodiments are therefore to be considered in all respects illustrative, rather than limiting of the invention.

What is claimed is:

1. A display apparatus comprising:

a substrate;

an array of pixels formed on the substrate including, for each pixel, a light modulator including a first movable electrostatic actuator; and a voltage regulator that limits variation in a voltage across the first movable electrostatic actuator, wherein the variation in the voltage is caused by a movement of at least a portion of the first movable electrostatic actuator.

2. The display apparatus of claim 1, wherein the voltage regulator includes a display driver including a DC voltage source.

3. The display apparatus of claim 1, wherein the light modulators are controlled by active circuitry.

4. The display apparatus of claim 3, wherein the active circuitry includes at least one TFT.

5. The display of claim 4, wherein the active circuitry includes, for each pixel, a write-enabling interconnect for enabling the pixel to respond to a data voltage and a data voltage interconnect for applying the data voltage to a data switch, thereby controlling the state of the light modulator of the pixel.

6. The display apparatus of claim 5, comprising for a pixel, an actuation voltage interconnect, distinct from the data voltage interconnect, for connecting the first movable electrostatic actuator to the display driver.

7. The display apparatus of claim 6, comprising, for a pixel, a switch, other than the data switch, for controlling the application of the voltage output by the display driver to the first movable electrostatic actuator.

8. The display apparatus of claim 1, wherein each pixel includes a voltage regulator.

9. The display apparatus of claim 8, wherein the voltage regulator includes a capacitor in electrical communication with the first electrostatic actuator.

10. The display apparatus of claim 1, comprising a voltage inverter.

11. The display apparatus of claim 10, wherein the voltage inverter includes a CMOS circuit.

12. The display apparatus of claim 1, wherein each light modulator includes a second electrostatic actuator for applying a force opposing a force applied by the first actuator.

13. The display apparatus of claim 12, comprising, for a pixel, a flip-flop electrically coupling the first movable electrostatic actuator and the second electrostatic actuator.

14. The display apparatus of claim 13, comprising, for a pixel, a cross-coupled inverter electrically coupling the first movable electrostatic actuator and the second electrostatic actuator.

15. The display apparatus of claim 1, wherein the light modulators includes MEMS shutter-based light modulators.

16. A display apparatus comprising:

an array of pixels including for each pixel, a light modulator; and active circuitry formed on a substrate for addressing the light modulators of the array, wherein for each pixel, the active circuitry includes a CMOS circuit comprising a flip-flop for controlling application of an actuation voltage to the light modulator.

17. The display apparatus of claim 16, wherein the active circuitry includes a control matrix having at least one TFT.

18. The display apparatus of claim 16, wherein the CMOS circuit includes at least one of a voltage inverter and a level shifting inverter.

19. The display apparatus of claim 16, wherein the flip-flop electrically couples opposing actuators of the light modulator.

20. The display apparatus of claim 16, wherein the light modulator includes at least one of a shutter-based light modulator, a light tap-based light modulator, and an electrowetting-based light modulator.

* * * * *